(12) United States Patent  
Armstrong

(10) Patent No.: US 10,514,001 B2  
(45) Date of Patent: Dec. 24, 2019

(54) COMBINED WIND AND SOLAR POWER GENERATING SYSTEM

(71) Applicant: SOLAR WIND RELIANCE INITIATIVES (SWRI) LTD., St. George (CA)

(72) Inventor: Ross D. Armstrong, St. George (CA)

(73) Assignee: Solar Wind Reliance Initiatives (SWRI) Ltd., Ontario (CA)

( * ) Notice: Subject to any disclaimer, the term of this patent is extended or adjusted under 35 U.S.C. 154(b) by 91 days.

(21) Appl. No.: 15/515,181

(22) PCT Filed: Oct. 30, 2015

(86) PCT No.: PCT/CA2015/051108  
§ 371 (c)(1),  
(2) Date: Mar. 29, 2017

(87) PCT Pub. No.: WO2016/065480  
PCT Pub. Date: May 6, 2016

(65) Prior Publication Data  
US 2017/0356422 A1 Dec. 14, 2017

Related U.S. Application Data

(60) Provisional application No. 62/073,587, filed on Oct. 31, 2014.

(51) Int. Cl.  
*F02D 25/00* (2006.01)  
*F02G 1/043* (2006.01)  
(Continued)

(52) U.S. Cl.  
CPC .............. *F02G 1/043* (2013.01); *F02G 1/044* (2013.01); *F02G 1/057* (2013.01); *F03D 9/25* (2016.05);  
(Continued)

(58) Field of Classification Search  
CPC . F03D 9/007; F24S 10/00; F24S 20/20; F24S 23/00; F24S 23/71  
See application file for complete search history.

(56) References Cited

U.S. PATENT DOCUMENTS 1,976,428 A * 10/1934 Arthuys ................... F21S 11/00  
353/3  
2,135,997 A * 11/1938 Arthuys ................... F21S 11/00  
126/605  
(Continued)

FOREIGN PATENT DOCUMENTS

CA 2722714 A1 11/2009  
WO 2007106519 A2 9/2007  
(Continued)

*Primary Examiner* — Tulsidas C Patel  
*Assistant Examiner* — Thomas K Quigley  
(74) *Attorney, Agent, or Firm* — Sand, Sebolt & Wernow Co., LPA

(57) ABSTRACT

An integrated wind and solar solution is provided, including a solar energy collection assembly (100) and a vertical axis wind turbine (400), combined to provide an integrated power output. In preferred embodiments, the vertical axis wind turbine is positioned above the solar energy collection assembly. Concentrating solar mirror collectors (116) are used to direct sunlight to a heat engine (250), which converts the collected heat energy into rotary motion. Rotary motion from the heat engine and from the vertical axis wind turbine preferably are on the same rotating axis (600), to facilitate load sharing between these two sources. A dual axis azimuth-altitude solar panel alignment tracking system is used in order to boost the energy conversion capability of the solar energy collectors.

9 Claims, 56 Drawing Sheets

(51) Int. Cl.
| | |
|---|---|
| *F03D 9/25* | (2016.01) |
| *H02S 10/12* | (2014.01) |
| *F02G 1/057* | (2006.01) |
| *F24S 10/90* | (2018.01) |
| *F24S 60/00* | (2018.01) |
| *H02S 20/32* | (2014.01) |
| *F24S 20/20* | (2018.01) |
| *F24S 23/70* | (2018.01) |
| *F24S 30/452* | (2018.01) |
| *F02G 1/044* | (2006.01) |
| *F24S 30/00* | (2018.01) |

(52) U.S. Cl.
CPC ............ *F24S 10/90* (2018.05); *F24S 20/20* (2018.05); *F24S 23/70* (2018.05); *F24S 30/452* (2018.05); *F24S 60/00* (2018.05); *H02S 10/12* (2014.12); *H02S 20/32* (2014.12); *F02G 2244/12* (2013.01); *F02G 2254/30* (2013.01); *F05B 2240/214* (2013.01); *F24S 2023/832* (2018.05); *F24S 2023/837* (2018.05); *F24S 2030/131* (2018.05); *F24S 2030/136* (2018.05); *F24S 2030/137* (2018.05)

(56) References Cited

U.S. PATENT DOCUMENTS

| | | | | |
|---|---|---|---|---|
| 3,972,183 | A * | 8/1976 | Chubb | B01J 19/127 60/641.8 |
| 4,102,326 | A * | 7/1978 | Sommer | G01S 3/7861 126/575 |
| 4,297,000 | A * | 10/1981 | Fries | F21S 11/00 362/557 |
| RE30,960 | E * | 6/1982 | Sommer | G01S 3/7861 126/578 |
| 4,459,972 | A * | 7/1984 | Moore | F24S 30/455 126/600 |
| 5,578,140 | A * | 11/1996 | Yogev | G02B 26/08 136/246 |
| 7,612,285 | B2 * | 11/2009 | Horne | G02B 19/0042 136/246 |
| 8,043,499 | B2 * | 10/2011 | Saeed | F03D 3/005 210/171 |
| 2002/0185124 | A1 * | 12/2002 | Blackmon, Jr. | F24S 23/30 126/680 |
| 2004/0118449 | A1 * | 6/2004 | Murphy | F24S 60/00 136/253 |
| 2005/0046977 | A1 * | 3/2005 | Shifman | G02B 17/061 359/853 |
| 2009/0038608 | A1 * | 2/2009 | Caldwell | F24S 30/48 126/600 |
| 2009/0165780 | A1 * | 7/2009 | Ota | F03G 6/00 126/634 |
| 2009/0277440 | A1 | 11/2009 | Angel | |
| 2009/0320830 | A1 | 12/2009 | Bennett | |
| 2010/0051018 | A1 | 3/2010 | Ammar et al. | |
| 2010/0101988 | A1 * | 4/2010 | Saeed | F03D 3/005 210/171 |
| 2010/0133820 | A1 * | 6/2010 | Tsao | F03D 3/00 290/44 |
| 2010/0319678 | A1 * | 12/2010 | Maemura | F24S 23/70 126/570 |
| 2011/0114082 | A1 * | 5/2011 | Nakamura | F24S 23/70 126/643 |
| 2011/0153087 | A1 * | 6/2011 | Cohen | F03G 6/067 700/275 |
| 2011/0174359 | A1 * | 7/2011 | Goei | F24J 2/07 136/246 |
| 2011/0197584 | A1 * | 8/2011 | Ezawa | F03G 6/065 60/641.11 |
| 2011/0232630 | A1 * | 9/2011 | Tsao | F03D 9/007 126/600 |
| 2012/0137684 | A1 | 6/2012 | Yogev | |
| 2012/0186251 | A1 * | 7/2012 | Epstein | F03G 6/065 60/641.11 |
| 2012/0266940 | A1 * | 10/2012 | Grant | H01L 31/0547 136/246 |
| 2012/0285507 | A1 * | 11/2012 | Rettger | H01L 31/0547 136/246 |
| 2013/0147196 | A1 | 6/2013 | Wieghardt | |
| 2014/0332688 | A1 * | 11/2014 | Cothuru | G01M 11/005 250/353 |
| 2015/0020793 | A1 * | 1/2015 | Llorente Folch | F24S 80/30 126/651 |
| 2015/0301306 | A1 * | 10/2015 | Corrigan | G02B 7/183 359/853 |
| 2016/0352282 | A1 * | 12/2016 | Lasich | H02S 10/00 |
| 2017/0130994 | A1 * | 5/2017 | Henault | G01M 5/005 |
| 2017/0145324 | A1 * | 5/2017 | Kodama | C10B 23/00 |

FOREIGN PATENT DOCUMENTS

| | | |
|---|---|---|
| WO | 2010017422 A2 | 2/2010 |
| WO | 2010080043 | 7/2010 |

\* cited by examiner

DETAIL B

DETAIL A

DETAIL B

SECTION A-A

SECTION D-D

SECTION B-B

DETAIL C

SECTION A-A

DETAIL C

SECTION B-B

DETAIL A

SECTION B-B

SECTION B-B

DETAIL A

DETAIL B

TOP VIEW

BOTTOM VIEW

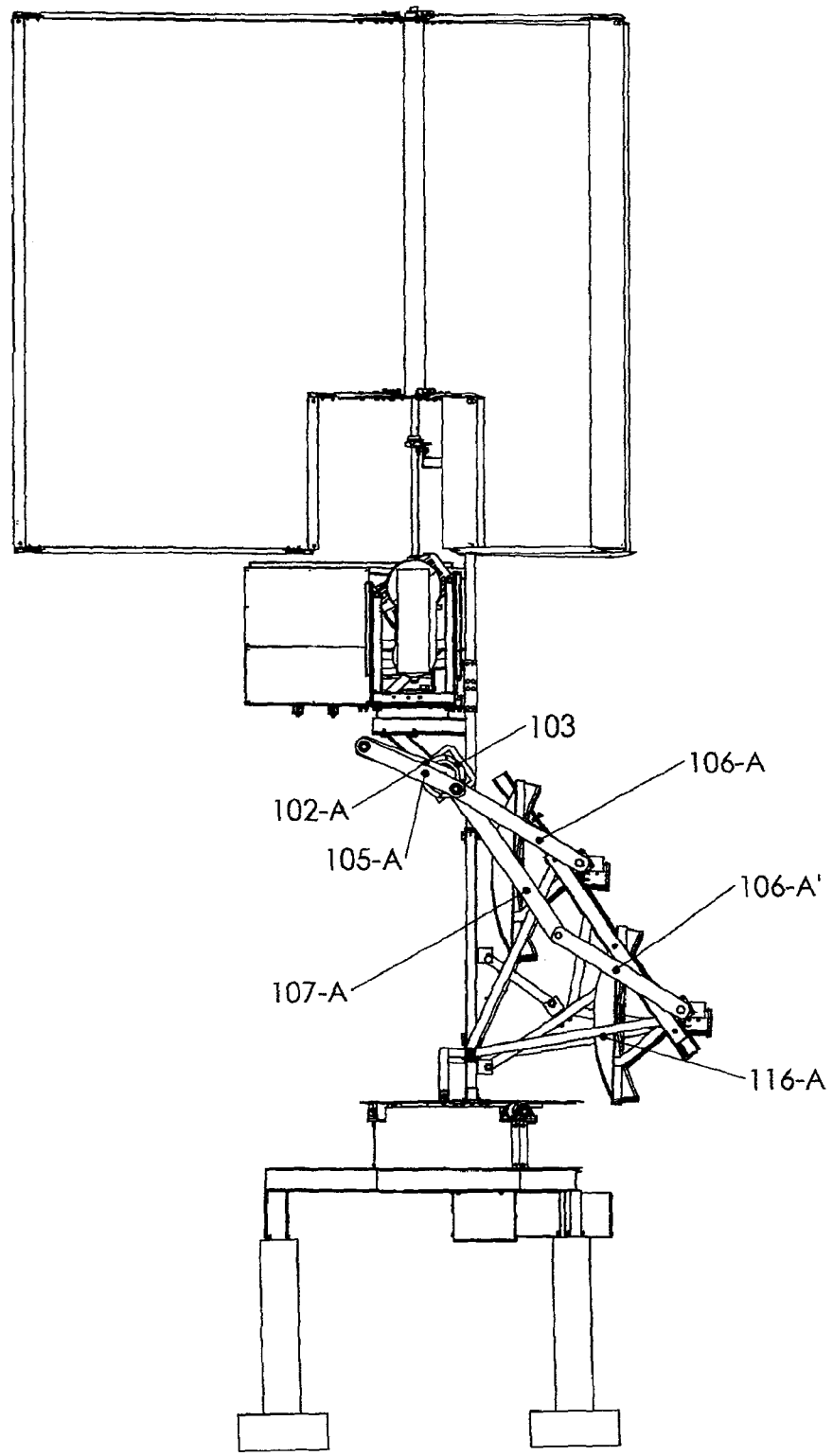

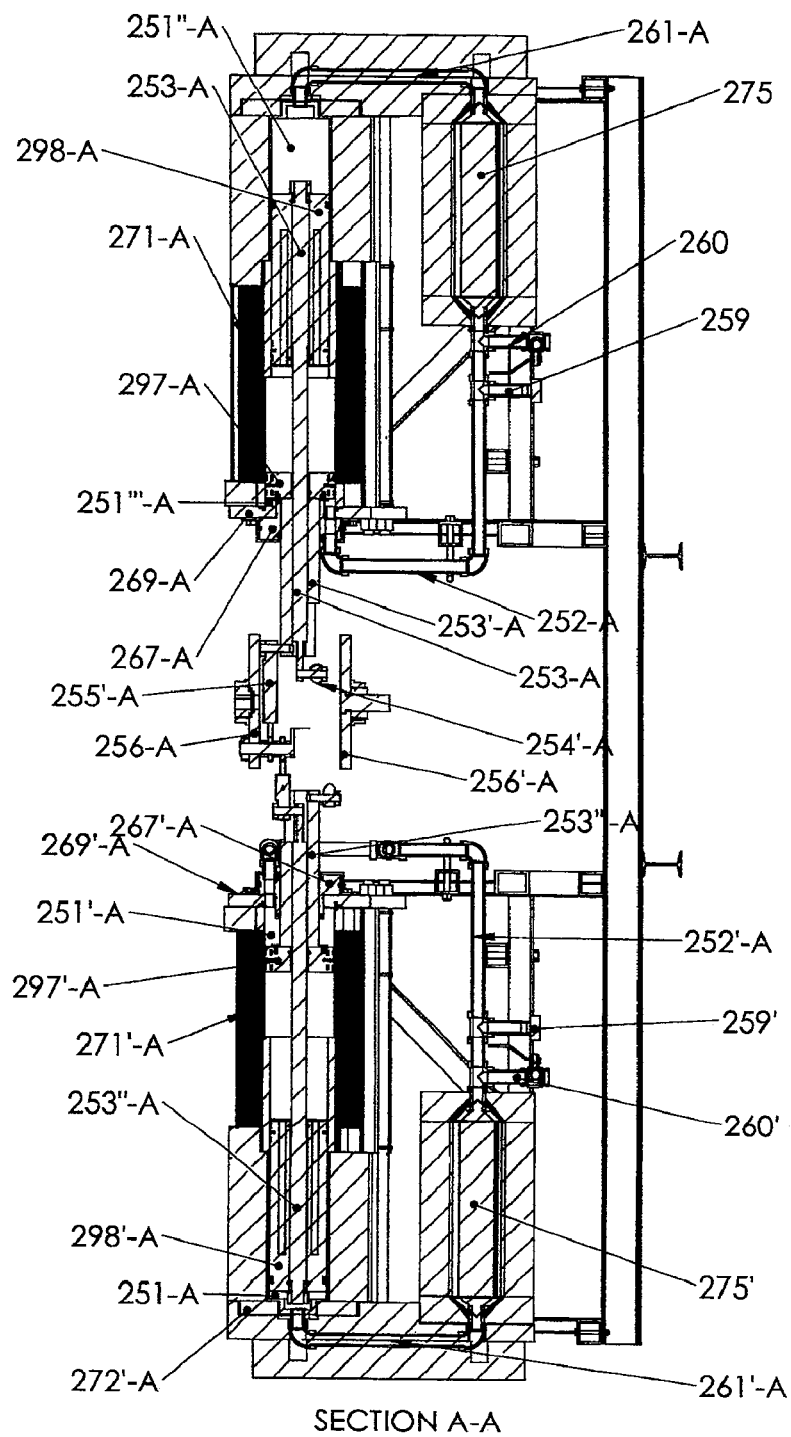

DETAIL A

DETAIL B

SECTION C-C

DETAIL G

COMBINED WIND AND SOLAR POWER GENERATING SYSTEM

BACKGROUND OF THE INVENTION

This invention relates to an electrical generating and storage system which uses both wind and solar energy to produce electricity.

In recent years, as the need for green technology solutions has become more apparent, electricity generating system installations have gone through a dramatic evolution away from carbon-based industrial generating systems towards solar energy and wind energy solutions. While solar energy and wind energy solutions both have well-established benefits in regards to carbon dioxide emission reduction, the variability of electricity generated from these devices has been a problematic concern for governments and other organizations charged with making electricity generation infrastructure decisions to balance electricity demand with the supply availability. An important concept in this context is "dispatchability". Dispatchable energy sources are energy resources that can be ramped up or shut down in a short amount of time in response to demand.

It is well known that a negative statistical correlation exists between wind energy and solar energy on all time scales. For example, on a daily time scale, solar energy is only generated in daylight hours, with a peak generating capability when the sun has reached its peak altitude near the noon hour; whereas wind energy generation is possible throughout the entire day, but tends to peak in the late evening and non-daylight hours. On a monthly time scale, in a northern hemisphere country such as Canada, solar energy production peaks in July and is at its least in January. Wind energy on the other hand is observed to peak in the winter months or coldest climate, when air density is at its highest, and is at its least in the summer months, when temperatures are at their highest, and air density is at its lowest.

It follows that marrying wind and solar into one system could have significant advantages. However, wind energy systems and solar energy systems currently in use tend to be separate. Wind energy systems consist primarily of stand-alone horizontal axis wind turbines (HAWT) solutions, and stand-alone vertical axis wind turbine (VAWT) solutions. Similarly, solar collection systems consist primarily of stand-alone of photovoltaic solutions and concentrated solar power solutions.

There have been some field installations in which stand-alone horizontal axis wind turbine solutions and photovoltaic solutions have been combined, and share real estate area. The inherent benefits of such installations have been publicly cited, fundamentally that greater power is generated per unit of area, and that the impact of windmill shadows on solar collector performance is relatively insignificant when compared with the power generation benefit gain. However, these systems tend not to be well integrated with each other and tend to operate as if they were stand-alone units just sharing the same real estate.

To date, there do not appear to be any effective systems offering a well-integrated approach towards combining the capture of both wind and solar energy.

BRIEF SUMMARY OF THE INVENTION

In the invention, an integrated wind and solar solution is provided. A solar energy collection assembly and a vertical axis wind turbine are combined to provide an integrated power output.

In preferred embodiments, the vertical axis wind turbine is positioned above the solar energy collection assembly in order to take advantage of the direct correlation between wind speed and height above ground level.

The invention preferably uses concentrating solar mirror collectors, and a heat engine used to convert the collected heat energy into rotary motion. The heat engine preferably also has a thermal storage element to store energy and thus enhance dispatchability of the system.

Rotary motion from the heat engine and from the vertical axis wind turbine preferably are on the same rotating axis, to facilitate load sharing between these two sources via a common output driveshaft connected to a generator.

Preferably, a dual-axis azimuth-altitude solar panel alignment tracking system is used in order to boost the energy conversion capability of the solar energy collectors by generally tracking the sun.

Embodiments of the invention may be scaled up or down over a wide range. In one version with circular parabolic mirrors, it is contemplated that the height from the base of the concrete footing to the top of the upper windmill beam will be 11.23 meters, the width across the array of solar collectors will be approximately 10.0 m, and the depth from the back of windmill blade to the front counterbalancing weight of the solar array will be approximately 8.74 m. Currently estimated power production for such an installation could be 3700 kwh/month or 45,000 kwh per year using circular mirrors, or up to 5000 additional kwh per year if rectangular or square parabolic mirrors are used instead.

In another version, with rectangular or square mirrors, it is contemplated that the height from ground level to the top of the upper windmill beam will be approximately 8.43 m, the width across the array of rectangular or square solar collectors will be approximately 5.38 m, and the depth from the back of the windmill blade to the front of the parabolic mirror will be approximately 4.80 m. Current estimates of power production for such an installation would be 15,300 kwH per year.

In a photovoltaic variation, it is contemplated that the height will be approximately 8.20 m, the width across the array of photovoltaic solar panels will be approximately 5.38 m, and the depth from the back of the windmill blade to the front of the photovoltaic panels will be approximately 5.56 m. Current estimates of power production for such an installation would be 16,000 kwH per year. In this variation, the solar energy generated uses separate electrical infrastructure (for example a solar string inverter which converts DC energy generated into AC energy).

Benefits of the invention may include but are not limited to the following:

The generation of electrical energy where wind speeds are less than 5 metres per second. These wind conditions have a probability of occurrence of greater than 50% of the time in many areas, and, while not in use today with stand-alone devices, can be used to generate low-level electrical energy. Stand-alone HAWT and VAWT applications are not normally capable of cost-effective operation at these low wind speeds.

By using a load sharing approach, both wind energy and solar energy yield a common rotary motion interface, and are combined to raise induction generator operating efficiency levels. Flexibility can be further enhanced if the design incorporates a dual induction generator approach, and better decision processes can be made as to when to actuate either a single or dual induction generator.

Greater levels of power generating ability per unit of area are possible through the adoption of careful product sharing integration strategies.

Effective rotating equipment maintenance strategies can be developed by designing in appropriate access to the key equipment requiring ongoing maintenance; and through the development of all appropriate equipment safeguards.

A thermal storage element can be easily incorporated and size scaled to facilitate electrical equipment dispatchability.

BRIEF DESCRIPTION OF DRAWINGS

FIG. 24B is a side view corresponding to FIG. 21, with the C-channel side rail removed to show the linkage operation more clearly. The parabolic mirrors are shown in a low-angle or dawn/dusk position.

FIG. 25C is a cross-section at A-A of FIG. 25B.

DETAILED DESCRIPTION

Overview

Figure 1:
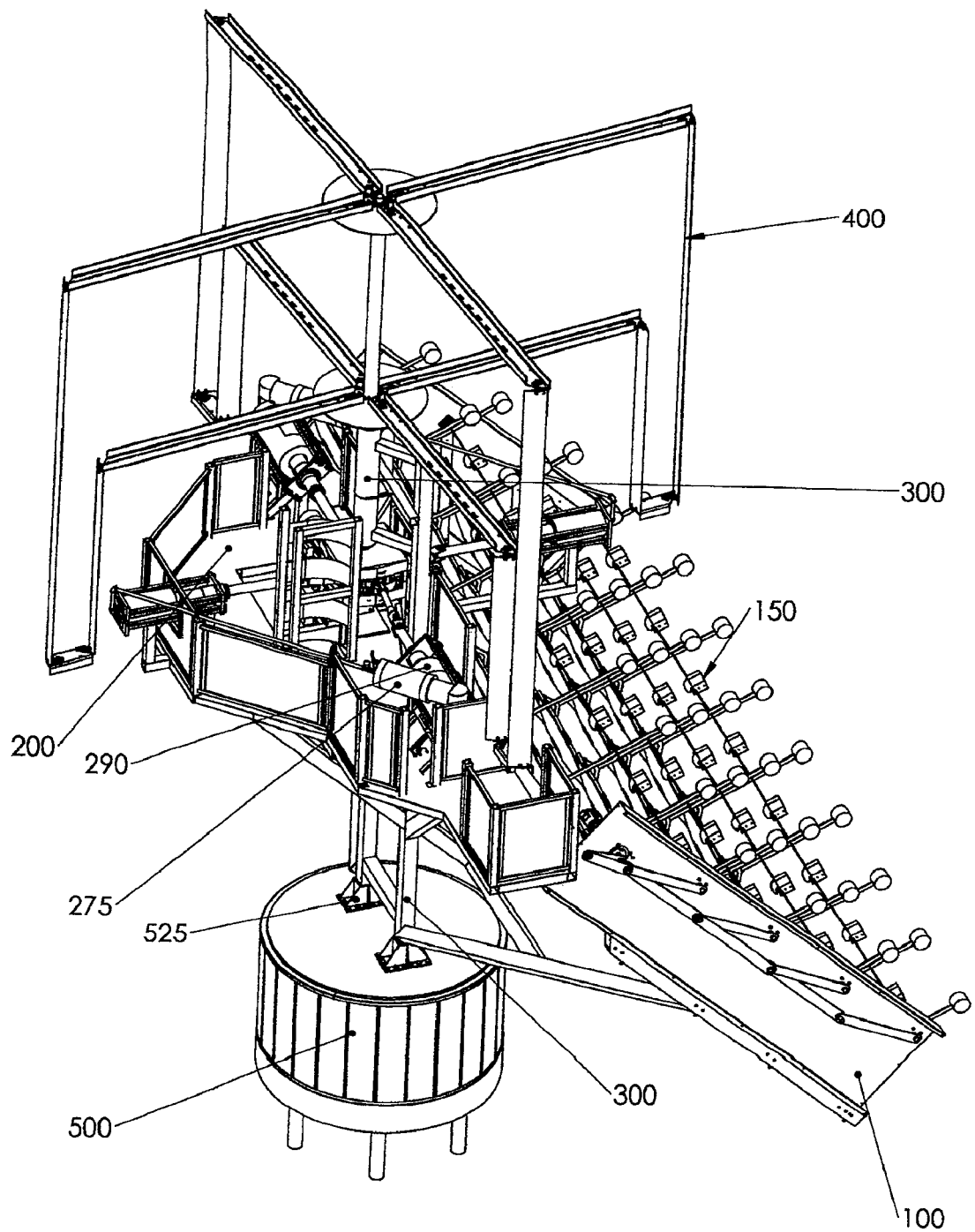
FIG. 1 is a perspective view of a preferred embodiment of the invention, showing a vertical axis windmill positioned above an assembly with circular concentrating solar mirror collectors, and using a heat engine to drive an output shaft.
Figure 2:
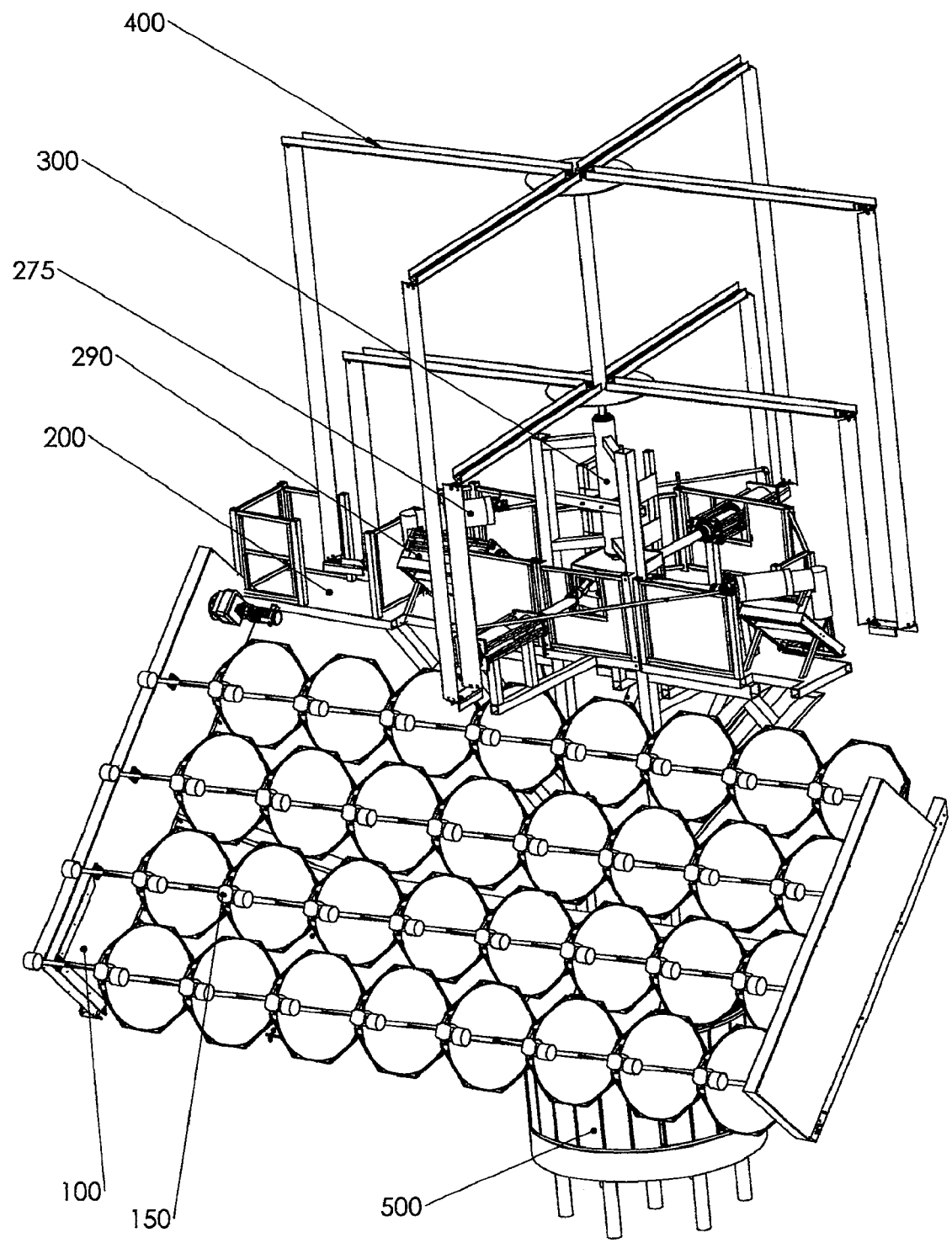
FIG. 2 is another perspective view of the preferred embodiment, from a different angle.

FIGS. 1 to 3E show the overall system. The solar collection array 100 is supported structurally by the main mast and frame assembly 300. Concentrated solar energy is redirected to heat engine storage compartments 290,290', which act as heat sources for the heat engine 250, mounted on the main maintenance platform assembly 200. Efficiency of the heat engine is significantly increased by regenerators 275,275' incorporated into the heat engine design.

The main mast and frame assembly 300 also provides structural support for the vertical axis wind turbine assembly (windmill arm and blade assembly) 400. The windmill arm and blade assembly rotate on the main vertical driveshaft 600. Structural moment and axial support of the main mast and frame assembly is provided by the rotator baseplate 525. Vertical axis or azimuth control for the entire assembly is provided by the base rotator assembly 500 which supports the rotator baseplate 525.

Electricity is produced from an electric induction generator 205 (see FIGS. 14A and 14B) driven by both the heat engine 250 and the wind turbine 400, as will be explained in detail below.

Solar Collection Array

FIGS. 4A to 6 show a solar collection array, namely an array of circular parabolic mirrors 116 mounted within a rigid frame assembly 119 with counterbalance weights 118. The mirrors and rigid frame assembly rotate about a horizontal shaft axis 110. This shaft has a larger diameter, torque-transferring portion at its outer extremities, and a smaller diameter central portion to rotate the optical shaft subassembly 150. This horizontal axis of rotation is the axis of altitude adjustment, and is situated at an appropriate distance away from the parabolic mirrors 116, i.e. at a distance from the mirrors that results in the concentration of the sunlight from the parabolic mirrors onto individual hyperbolic mirrors 180,181, 189 and 194 (see FIGS. 4A and 4B), to an approximate concentration diameter of 7.5 cm. The hyperbolic mirrors are mounted in an off-axis manner, aligned so that the individual hyperbolic mirrors reflect and further concentrate the light energy to one of sixteen 5 cm target zones situated on a copper spreader plate of heat storage compartment 290. The individual hyperbolic mirrors are individually incorporated into the optical shaft subassembly 150, whose function will be further explained later below. The four leftmost hyperbolic mirrors are aimed at the targets on the heat storage front plate 290 on the left side, and the four rightmost hyperbolic mirrors are aimed at the targets on the heat storage front plate 290' on the right side. The heat storage compartments 290,290' act as the heat sources for the heat engine 250, which converts linear motion into rotary motion at a common rotary interface to the windmill arm and blade assembly 400 just below the windmill piloted flange bearing supports 303,303' (see FIG. 15). The common rotary interface 263 (see FIG. 10) drives a speed increaser 203 (see FIGS. 14A and 14B) which in turn drives an induction generator 205 thereby producing electricity. Affixed to the generator is a brake 206 to facilitate stopped rotation conditions. The entire top level assembly is supported by a base rotator assembly 500 which provides vertical axis or azimuth axis control for the entire system.

Horizontal Axis (Solar Collectors Altitude Angle Control)

Figure 4A:
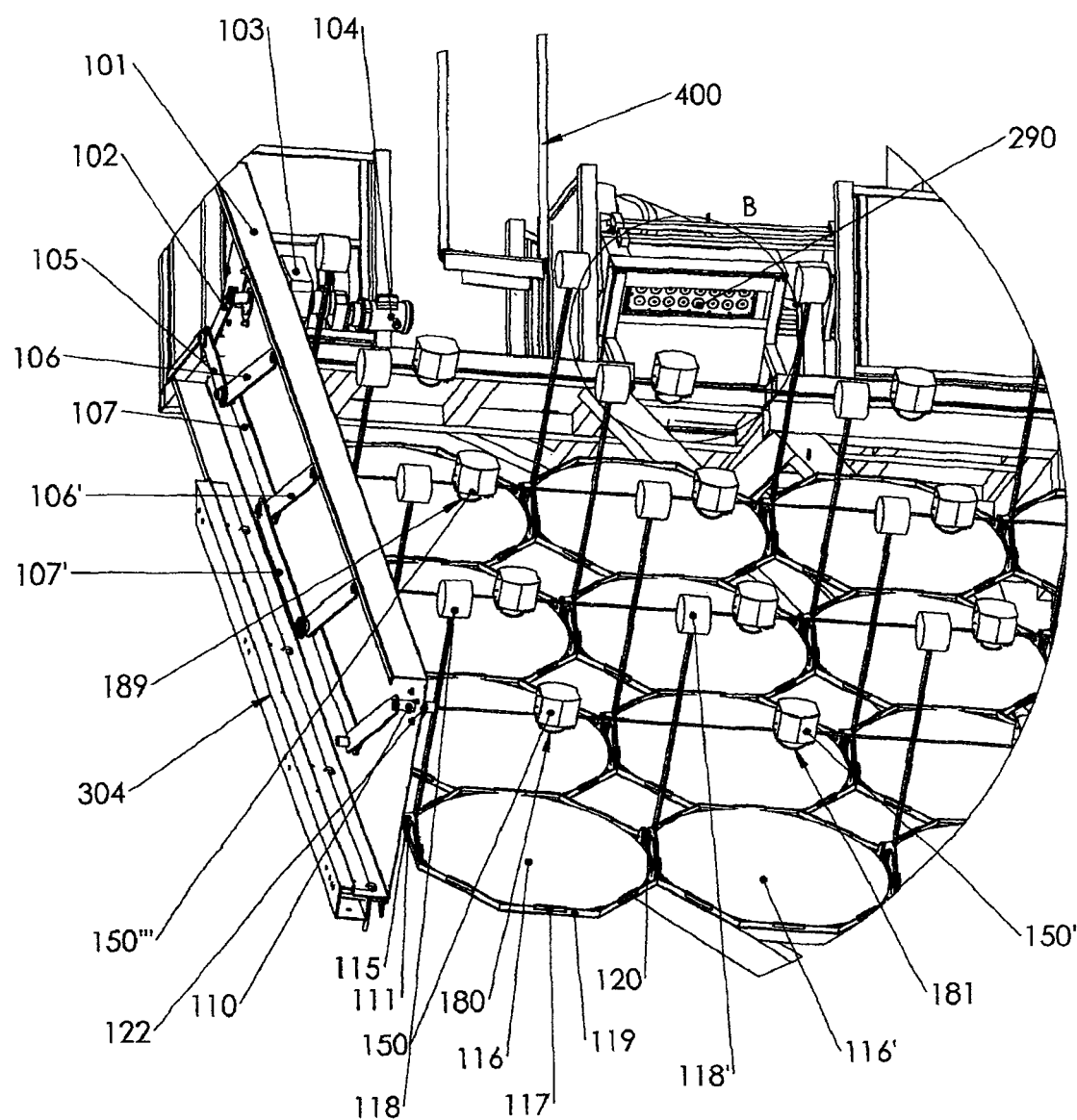
FIG. 4A is a front view of the altitude or horizontal axis linkage adjustment system for the solar mirror collectors, showing the mirrors in their high angle position.
Figure 4B:
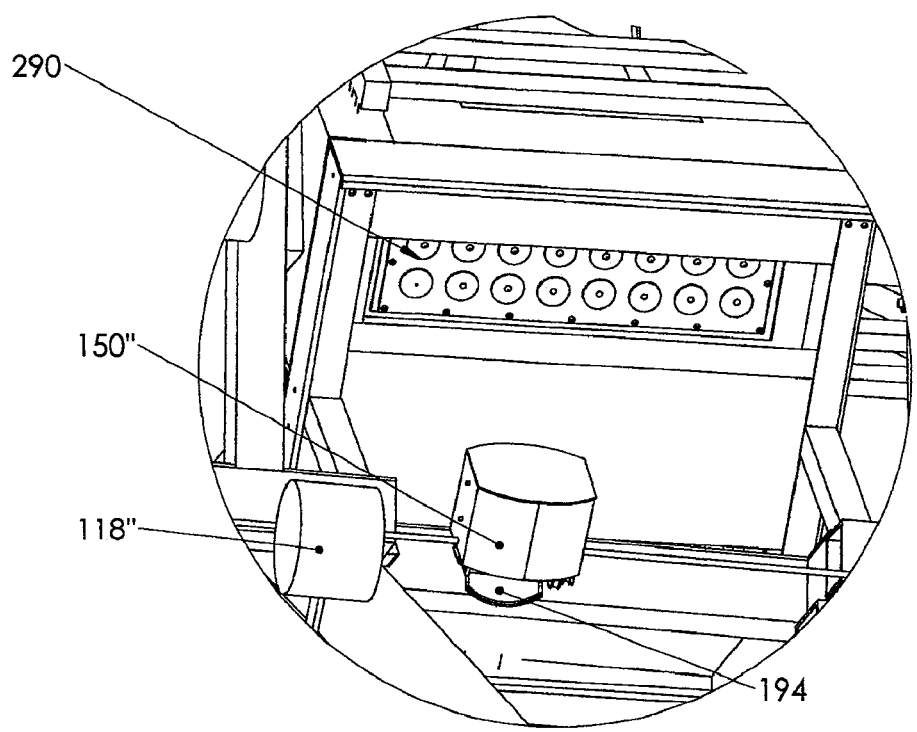
FIG. 4B is a more detailed view of area B of FIG. 4A.

FIG. 4A is a view of a C-channel side rail 101 with the cover removed to expose the linkage system controlling the altitude axis adjustment of the solar collection system. The horizontal shaft axes 110 are supported by flange pillow-block bearings 122 mounted within the C-channel side rail. An electric motor 104 with brake provides rotation to a gear reducer 103 which slows the speed of rotation and increases the motor's output torque as required to rotate the individual horizontal shaft axes. The torque requirement is lessened by the counterbalance weights 118 that are incorporated into the rigid frame assembly 115,119,120.

Figure 3A:
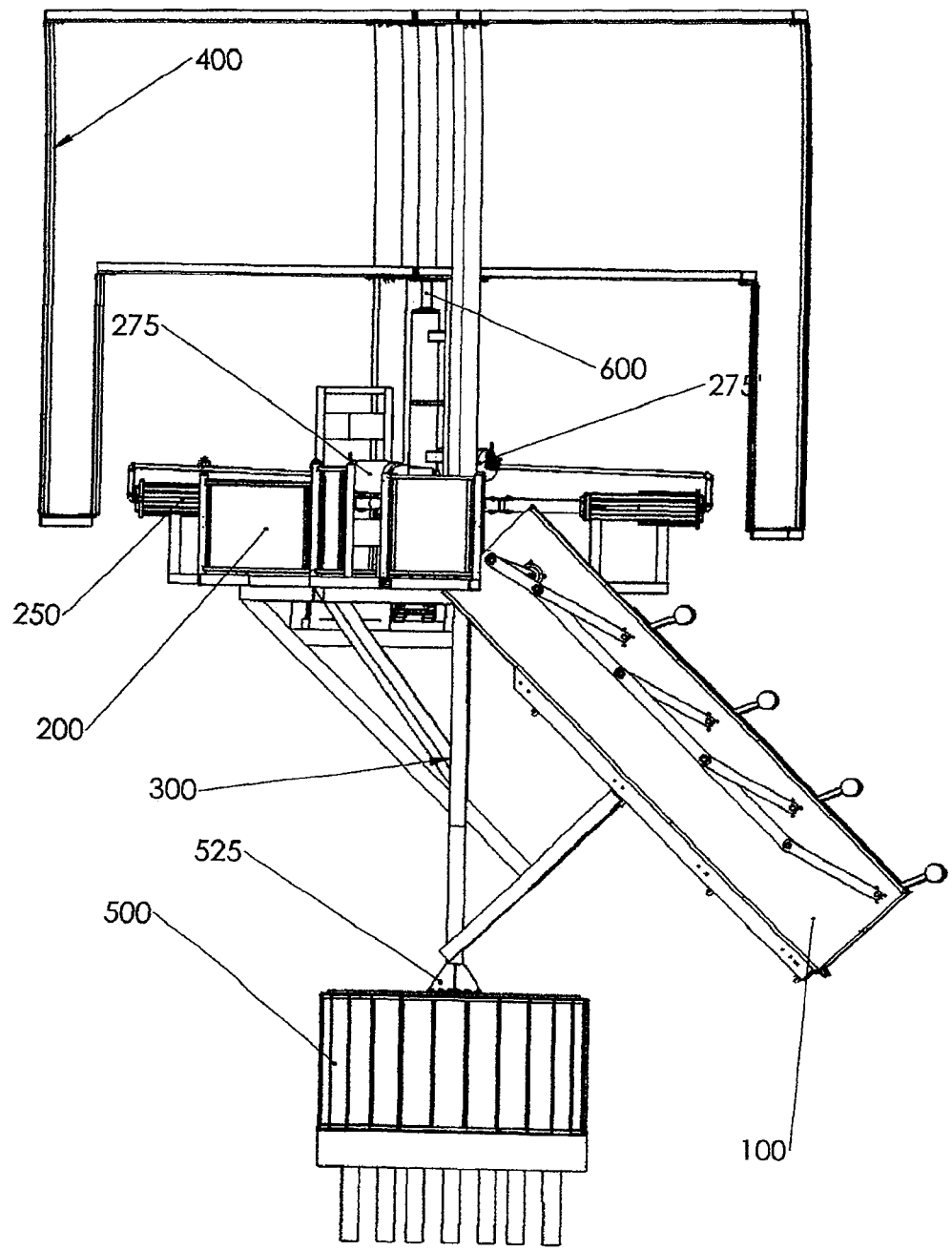
FIG. 3A is a side view of the preferred embodiment.
Figure 3B:
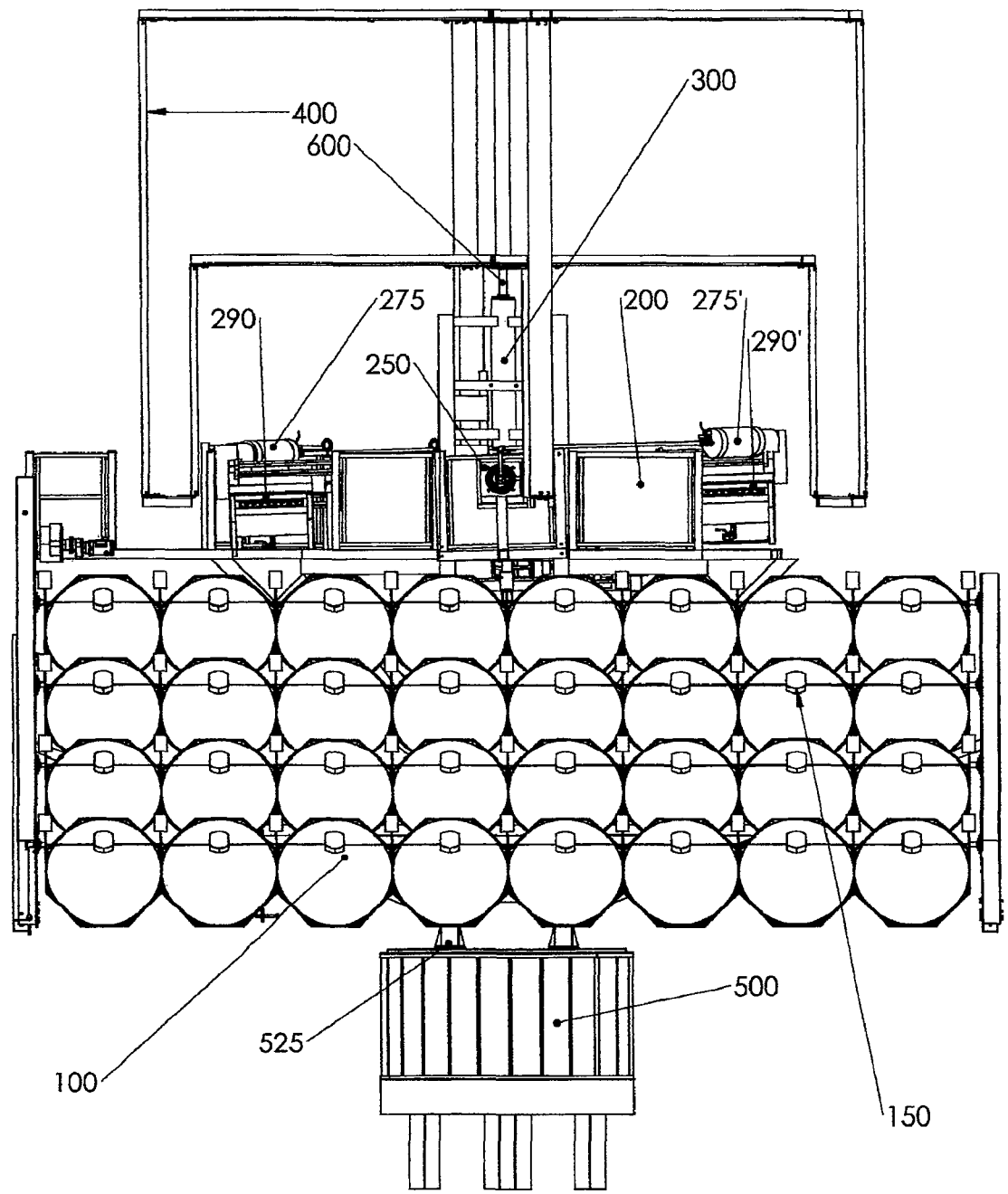
FIG. 3B is a front view of the preferred embodiment.
Figure 3C:
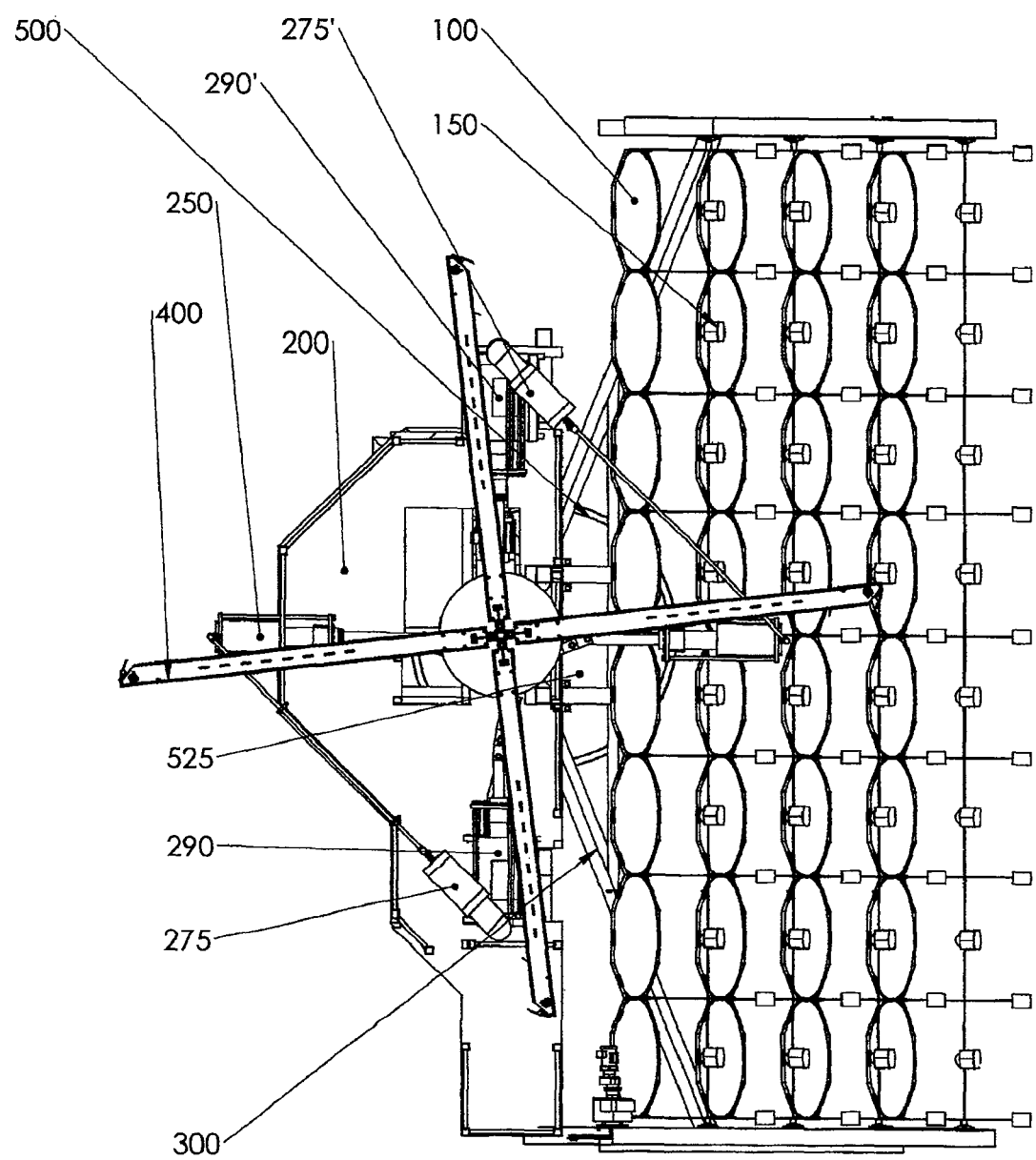
FIG. 3C is a top view of the preferred embodiment.
Figure 3D:
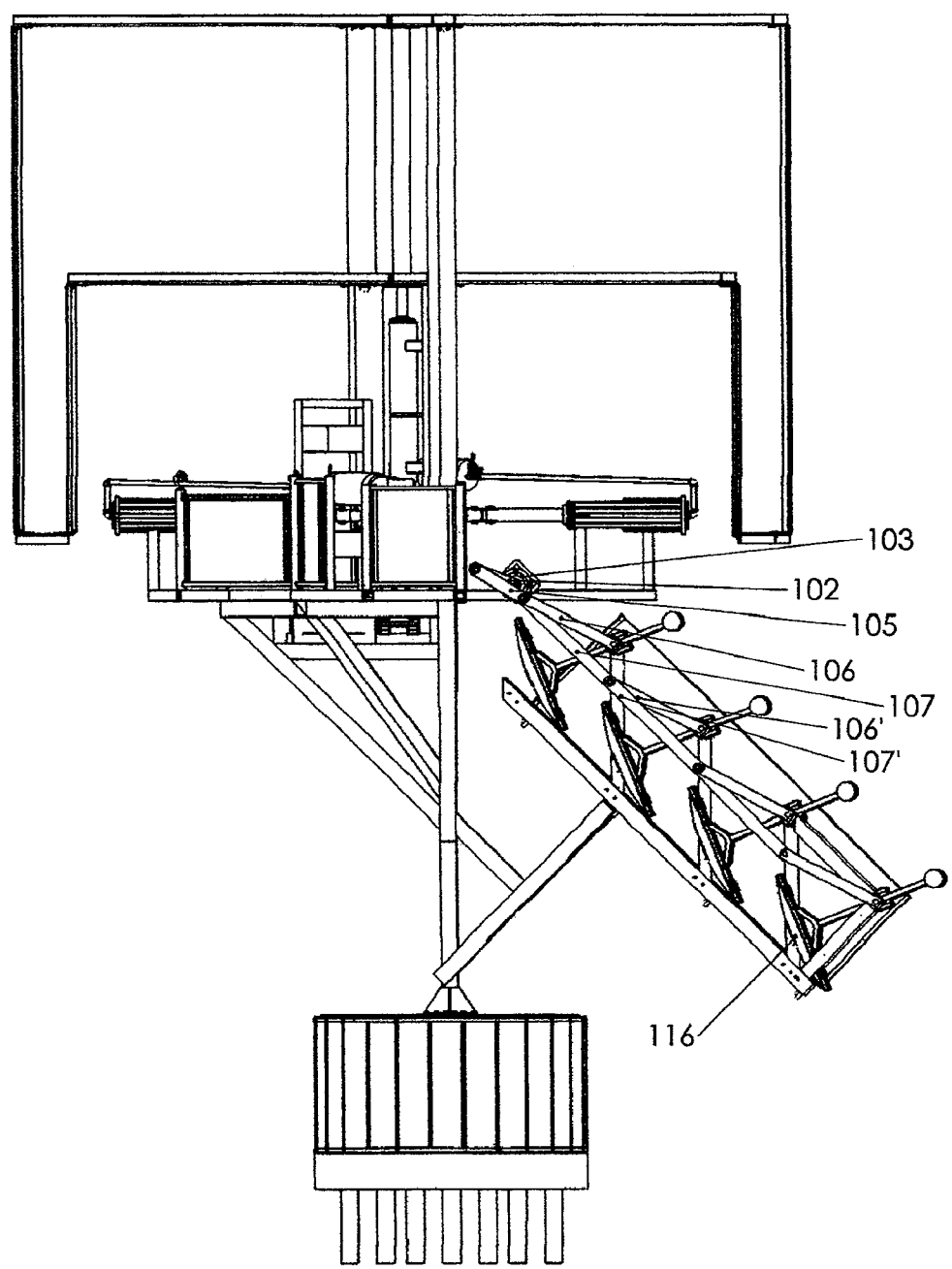
FIG. 3D is a side view of the preferred embodiment, with the C-channel side rail removed to show the linkage operation more clearly. The parabolic mirrors are shown in a low-angle or dawn/dusk position.
Figure 3E:
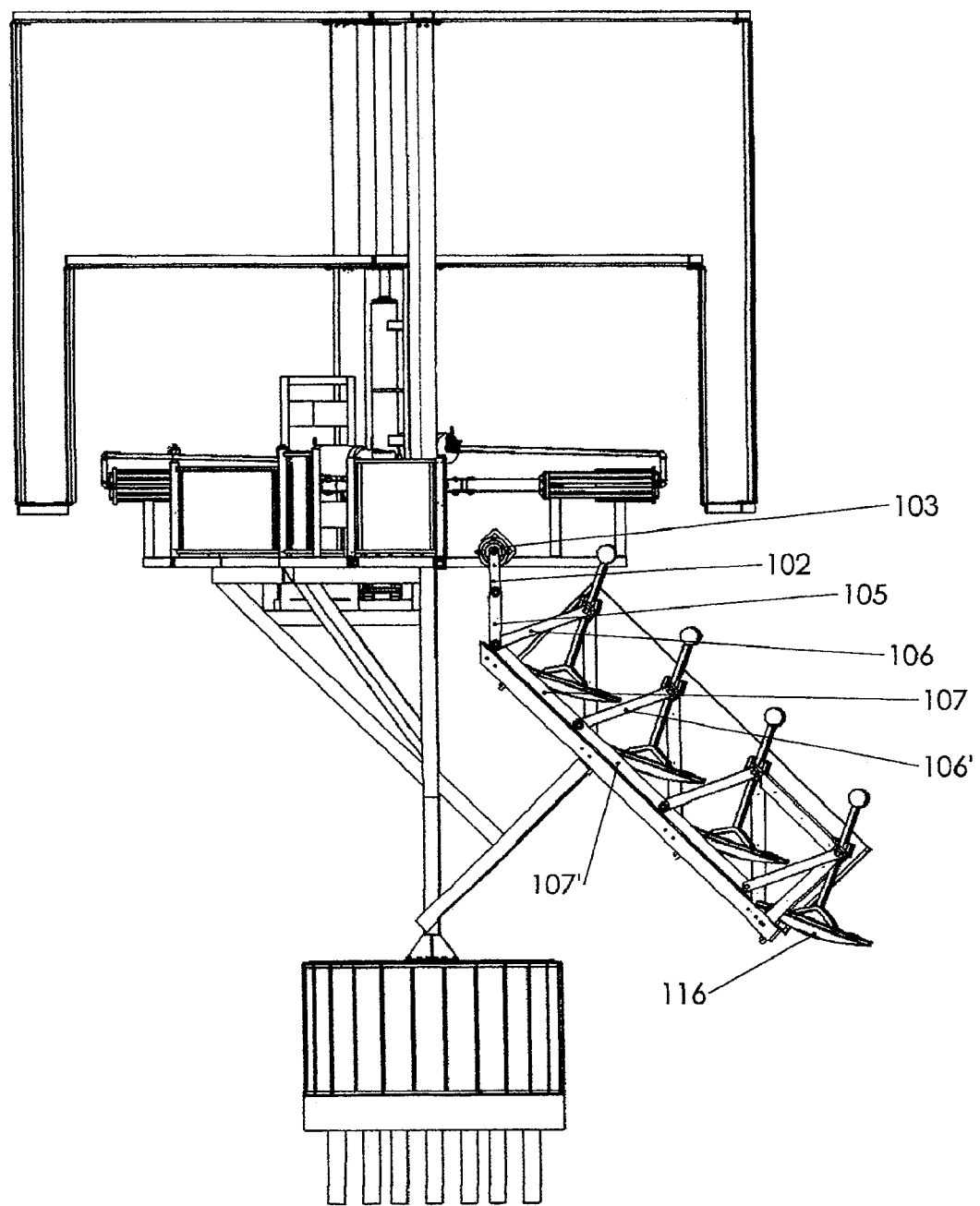
FIG. 3E is a side view corresponding to FIG. 3D, but with the parabolic mirrors in a high angle or mid-day position.

FIG. 3D is a side view of the preferred embodiment, with the C-channel side rail 101 removed to show the linkage operation more clearly. The parabolic mirrors are shown in a low-angle position. FIG. 3E is a side view corresponding to FIG. 3D, but with the parabolic mirrors in a high angle position.

Figure 15A:
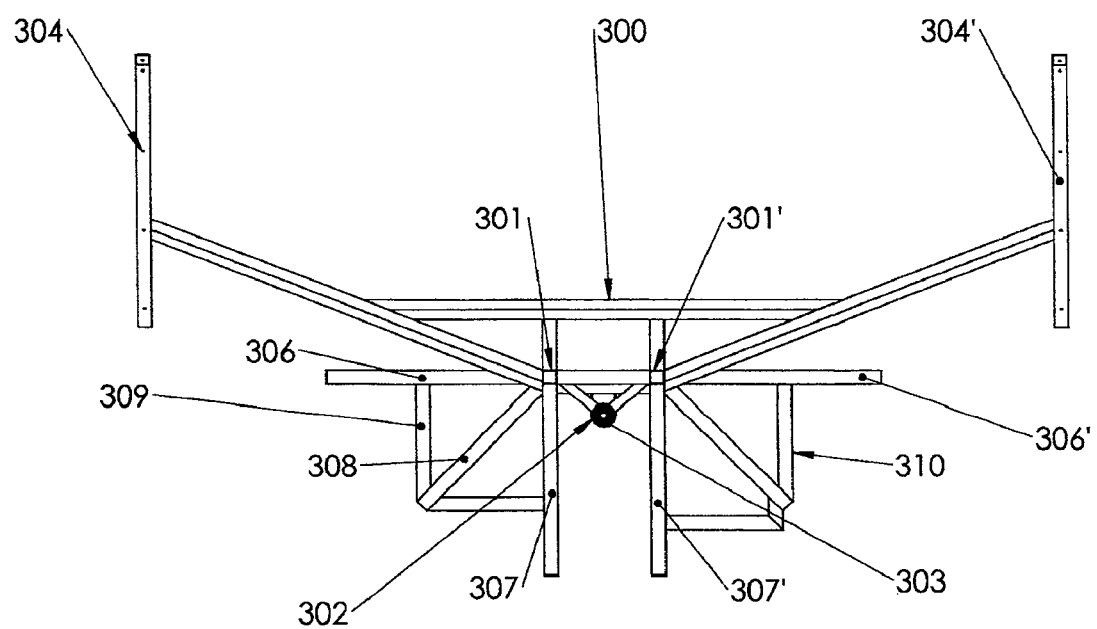
FIG. 15A is a top view of the main mast and frame assembly.
Figure 15B:
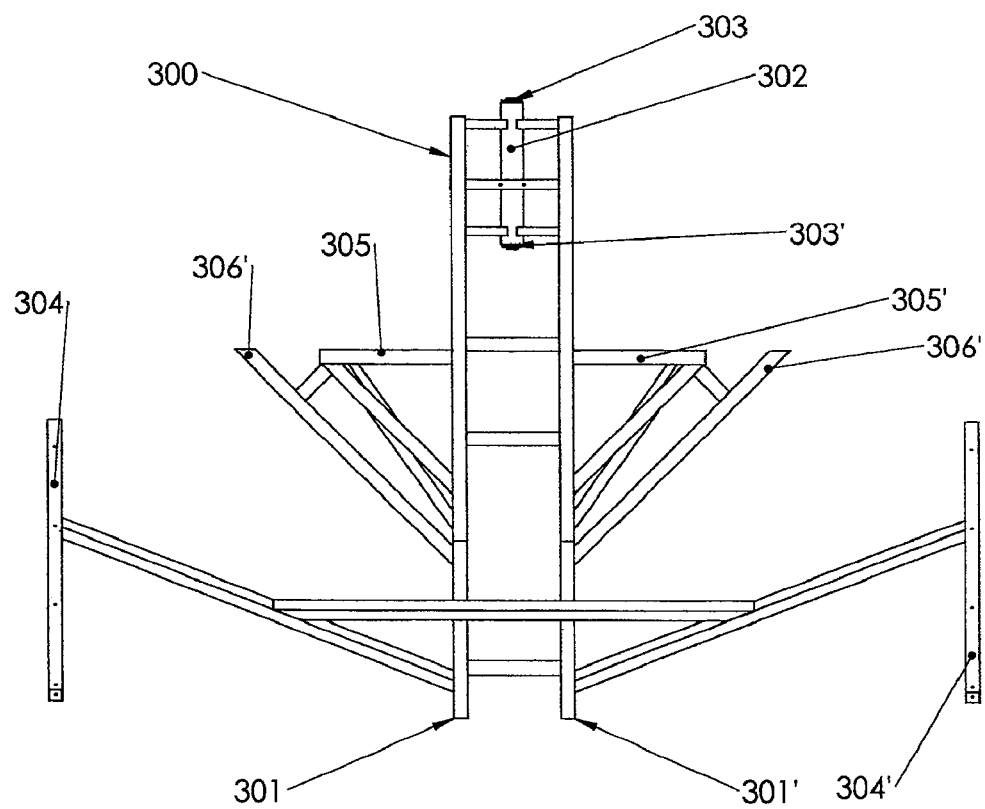
FIG. 15B is a front view of the main mast and frame assembly.

As observed in FIG. 4A, the C-channel side rail 101 is supported by a frame member 304 which is a key structural element of the main mast and frame assembly 300 (see FIGS. 15A and 15B). The frame member 304 is oriented at a 45-degree angle from horizontal.

The gear reducer 103 is mounted outside the C-channel side rail 101, and is structurally supported by it. The gear reducer's output shaft resides inside the C-channel side rail, and rotates the crank 102 to drive the linkage assembly. The crank starts in the position shown in FIG. 3D, and moves counter-clockwise in increments until it reaches the position shown in FIG. 3E. It then moves clockwise in increments, back to the FIG. 3D position at the end of the day. The crank in turn drives the secondary linkage 105. The secondary linkage in turn controls the rotation of the first of four rotation linkages 106 which in turn rotationally controls the highest horizontal shaft axis 110'''. The secondary linkage also is connected to and controls the motion of the first connector linkage 107. The connector linkage connects to a second connector linkage 107' and also to the second of the four rotation linkages 106' which in turn rotationally controls the second highest horizontal shaft axis 110''. In turn, the second connector linkage 107' connects to the third and final connector linkage 107'' and as well as to the third of the four rotation linkages 106'' which in turn rotationally controls the second lowest horizontal shaft axis 110'. The third and final connector linkage 107'' is connected only to the final rotation linkage 106''' which in turn rotationally controls the lowest horizontal shaft axis 110.

The secondary linkage 105 is responsible for translating rotational motion delivered by the gear reducer 103 and electric motor 104 into a horizontal shaft axis 110 rotational swing of 50 degrees. This in turn controls the rotation of the rigid frame assembly 120 and the parabolic mirrors 116 that it supports, making the angular adjustment equal and common for all rigid frame assemblies and parabolic mirrors. The median horizontal angle of the parabolic mirrors 116 in the design is 45 degrees, which coincides with the same horizontal angle of the frame member 304 supporting the C-channel side rail 101. Given the 50 degrees of rotational motion flexibility of the design, the parabolic mirrors 116 are thus capable of being rotated between an altitude of 20 degrees from horizontal to 70 degrees from horizontal. This meets the site-specific geographically imposed altitude alignment requirements of most solar panel installations. Obviously, the degree of rotation can be varied as desired, with minor design changes within the scope of the invention. The 45-degree median angle, and the 50 degrees of rotation, are for this specific example.

In a preferred example, the crank starts at dawn in the same position as at dusk. It rotates incrementally counter-clockwise to its highest angle (mid-day) position, and then clockwise back to its lowest angle (dusk/dawn) position.

Alternatively, the crank could go through a complete rotation of 360 degrees so it returns to the 8:30-9:00 pm position at dusk. In such a version, in order to complete a full daily cycle of sun rotation from dusk to dawn, the gear reducer 103 needs only to complete one 360-degree revolution.

Start and stop times for the operation of the electric motor 104 are controlled by a programmable controller, programmed to turn the motor on for only a few milliseconds at a time every 15 minutes or so throughout the day. The daily sequence of start and stop times will vary depending on the site-specific needs, and the particular time and date when solar tracking is occurring. The brake incorporated on the electric motor 104 assists in improving the precision of the start and stop sequence. In one example of the invention, the crank 101 is approximately 41 cm long (pivot point to pivot point), and the secondary linkage 105 is approximately 52 cm, such that the ratio of the crank length to secondary linkage length is approximately 0.79. In another example, the respective dimensions are approximately 58 cm and 70 cm, and the ratio is approximately 0.83. In general, suitable ratios may be in the range of 0.75 to 0.85. These dimensions and ratios control the angle of rotation of the parabolic mirrors. In the first example (the FIGS. 1 to 20 embodiment), there is 50 degrees of rotation. In the second example (the FIGS. 21 to 29 embodiment), there is 74 degrees of rotation. Varying the dimensions and ratios varies the range of rotation.

Light Energy Redirection to the Heat Engine Storage Compartment

Figure 5:
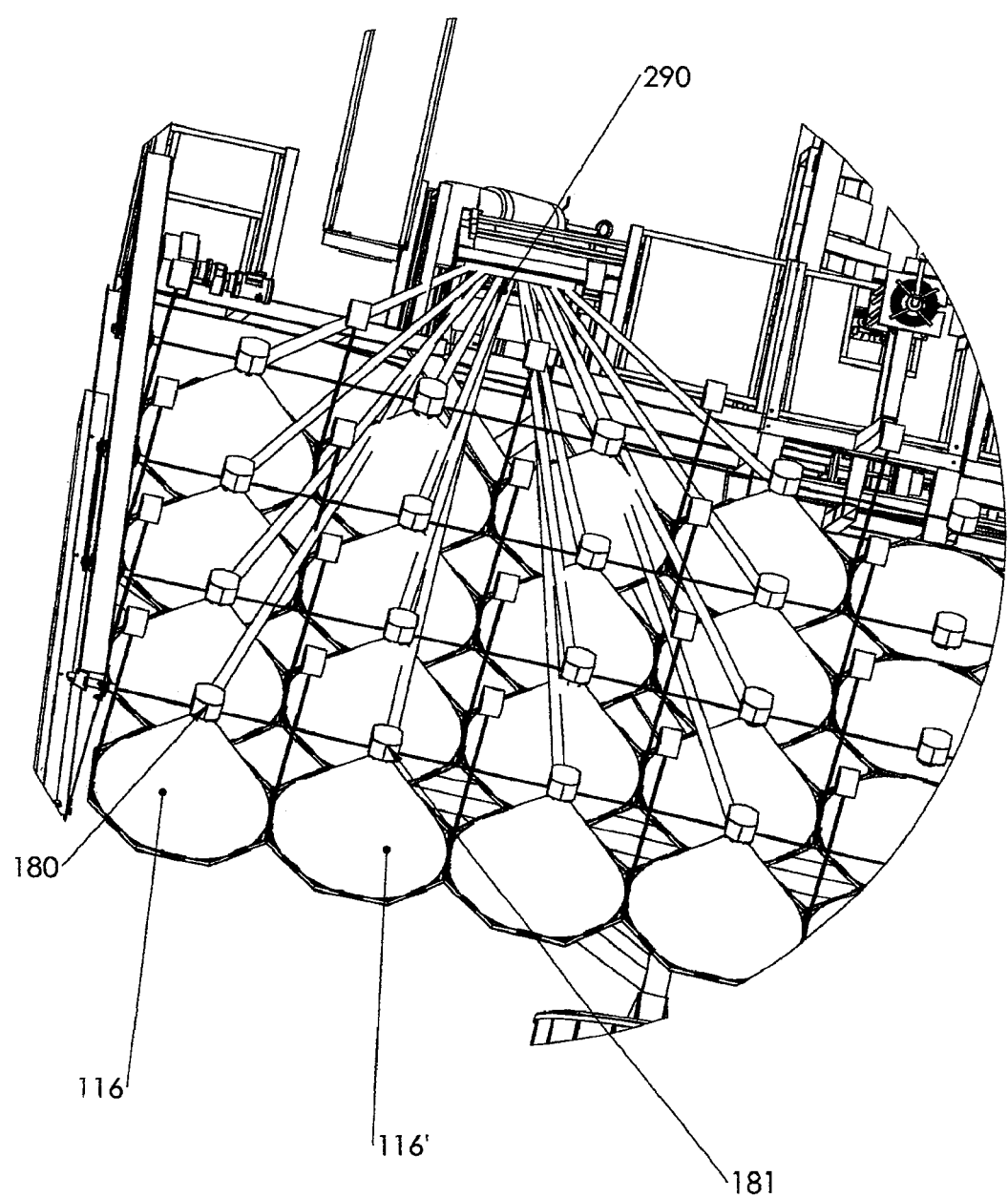
FIG. 5 is a front view showing light energy concentrated and redirected to a thermal storage compartment.
Figure 6:
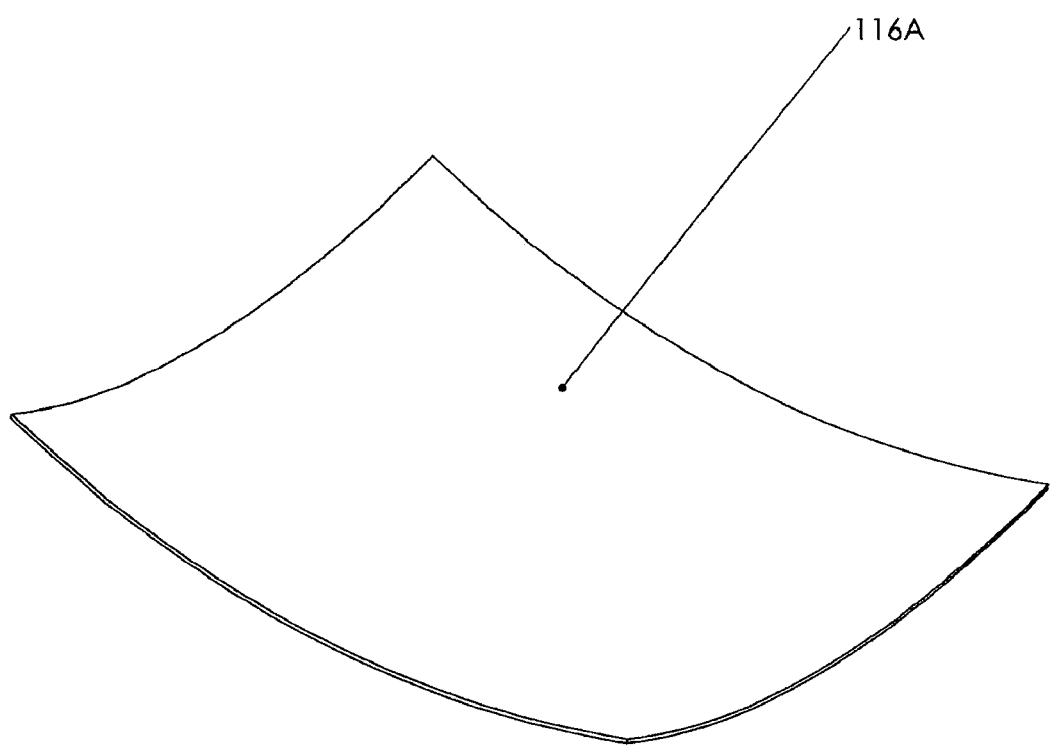
FIG. 6 shows an alternate mirror embodiment with a square shape.

FIG. 5 illustrates how the array of parabolic mirrors 116 focuses and redirects light to the heat engine storage compartments 290. The light from the parabolic mirrors 116, 116' focuses the energy onto the individual hyperbolic mirrors 180,181 which redirect and further concentrate the light towards the heat engine storage compartment 290.

Alternative Mirror Configuration

FIGS. 6 and 21 to 24C show a square mirror 116A as an alternative to the circular parabolic mirrors 116. These mirrors can be used within basically the same equipment form factor. The advantage is that 27% more light energy per mirror can be captured and redirected towards the heat engine storage compartment 290. It should be understood that non-square rectangular mirrors could be used with the same effect, square just being a special case of rectangular. Where the word "rectangular" is used in this specification, it should be interpreted to indicate either a square or non-square rectangle unless the context indicates otherwise.

Hyperbolic Mirrors and Optical Shaft Sub-Assembly Kinematics Discussion

Figure 7:
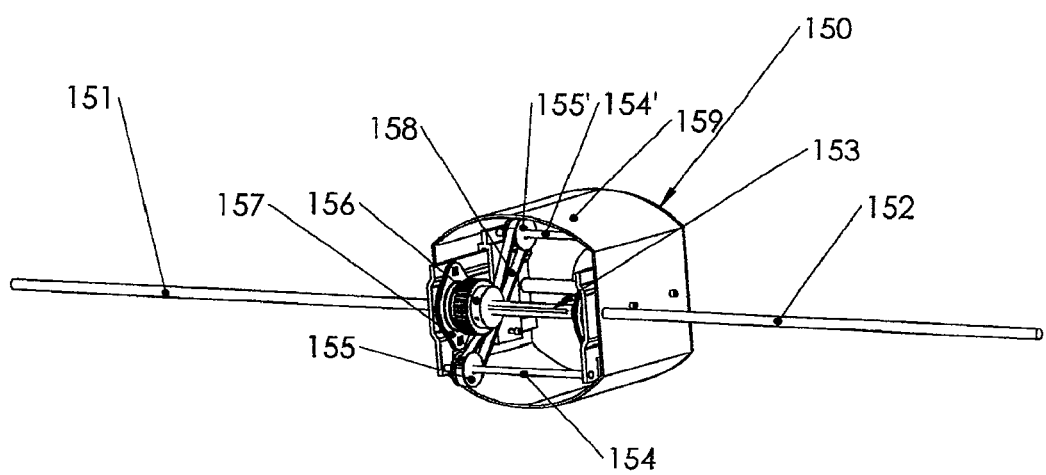
FIG. 7 shows the internal mechanism of the main optical shaft subassembly.
Figure 8A:
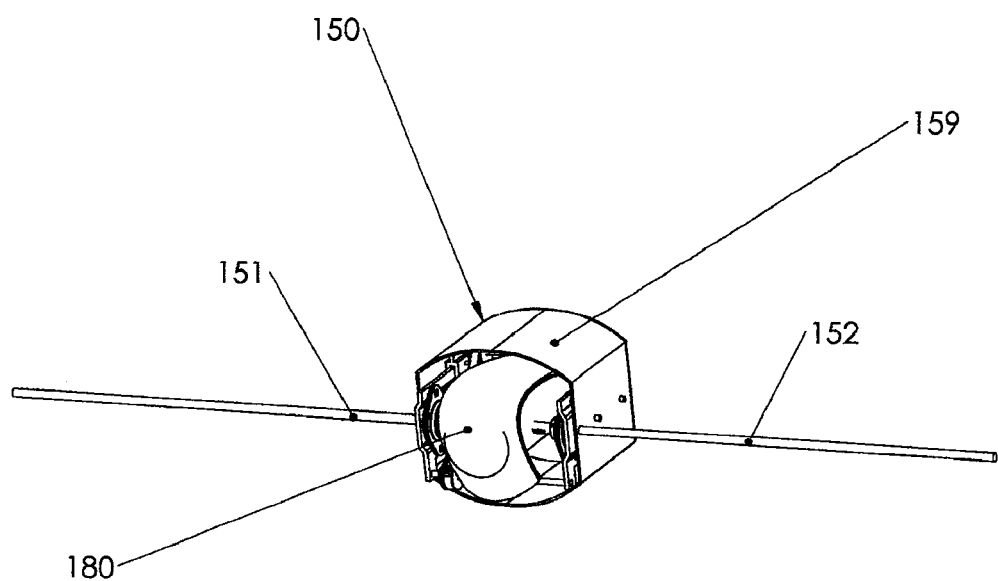
FIG. 8A shows the main optical shaft subassembly with the mirror in dawn and dusk position.
Figure 8B:
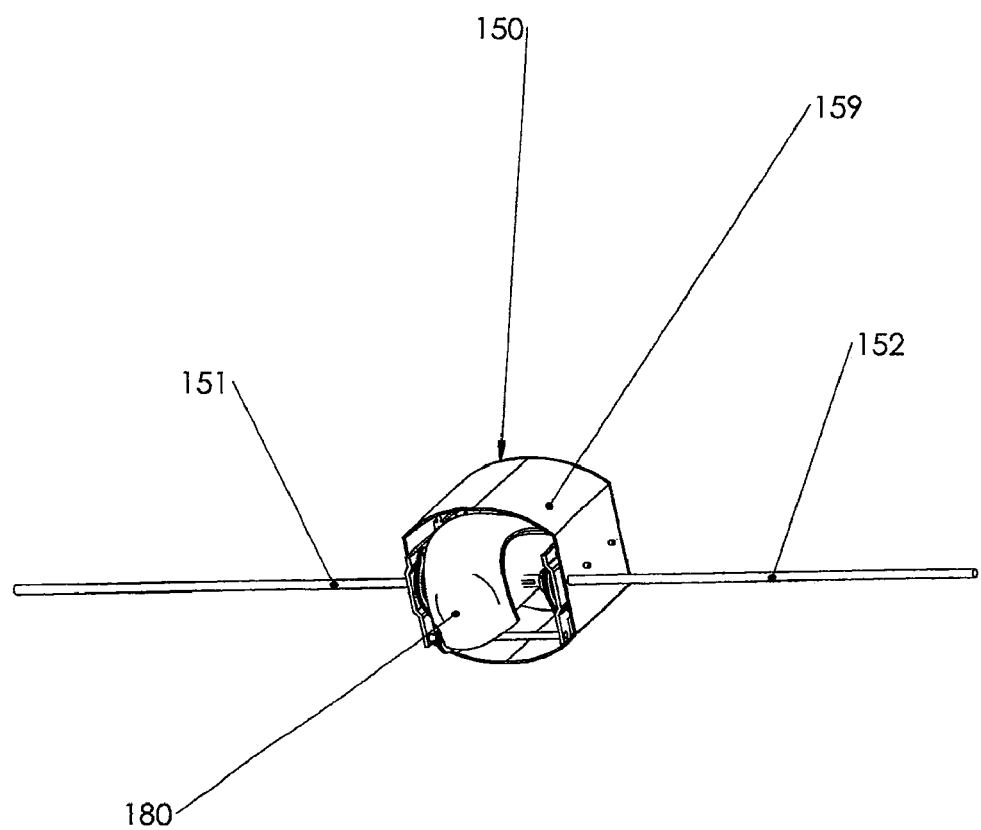
FIG. 8B corresponds to FIG. 8A, and shows the mirror in its highest (mid-day) position.

Referring to FIGS. 7 to 8B, the main optical shaft subassembly 150, situated on the horizontal or altitude axis of alignment, is responsible for redirecting the solar energy from the rotating parabolic mirrors 116 to the fixed location individual targets at the heat storage compartment 290. The main optical shaft subassembly 150 is fixed in position laterally, held in place by the rigid frame assembly 115,119, 120. Similarly, the individual targets on the heat storage compartment 290 are fixed in position. Consequently, there is no need for any variation in the axial position of the hyperbolic mirrors (180,181,189 and 194 of FIG. 4), and they can be mounted in fixed positions.

Regarding radial movements of the horizontal axis of alignment, since the parabolic mirrors 116 are moving radially about the horizontal axis, and since the individual targets on the heat storage compartment 290 remain in a fixed position, there is a need for an offsetting adjustment in the angular position of the hyperbolic mirrors. Assuming the hyperbolic mirrors' position of reflection is located on the horizontal axis of alignment, the amount of offsetting adjustment is equivalent to one half of the angular movement of the parabolic mirror 116. This offsetting adjustment is accomplished automatically and continuously using the mechanism incorporated within the main optical shaft subassembly 150.

FIGS. 7 and 8 illustrate the function of this optical shaft subassembly 150. The device is structurally held by the optical main shaft 151,152 which has its outboard ends structurally affixed to the rigid frame assembly 119,120. The inboard ends of the optical main shaft 151,152 are structurally affixed to the optical equipment cover 159.

Within the optical equipment cover 159 resides the equipment required to facilitate the offsetting adjustment. Two light duty flange bearings 157 support the keyed optical mirror shaft 153 which is permitted to rotate freely and independently of the rotation of the optical main shaft 151 and optical main shaft 152. This keyed optical mirror shaft 153 can be but is not necessarily collinear with the optical main shaft 151, 152. Also mounted on the optical mirror shaft 153 is a synchronous drive sprocket component 156 with 32 sprocket teeth. Also mounted on two individually fixed small sprocket shafts 154 and 154' are two additional synchronous drive sprocket components 155 and 155' each with sixteen sprocket teeth. Mounted between the three sprockets is a dual-sided synchronous serpentine belt drive 158. The outermost small sprocket shaft 154 located on the external edge of the optical equipment cover 159 is structurally affixed to a side plate 160. This side plate 160 also provides linear guidance for a sprocket belt tightening device 161 which facilitates the tightening of the dual-sided synchronous belt drive 158.

Referring to FIG. 8A, a distinctly designed hyperbolic mirror 180 is also mounted to the optical mirror shaft 153 and is fixed axially by shaft collars and fixed radially by the keyed nature of the optical mirror shaft 153.

The above described construction details, results in a radial movement path of the hyperbolic mirror 180 which is opposite in direction and is one half of the angular movement of the optical main shaft 151, 152. So while during any given day, there could be a 50-degree rotation of the optical main shaft 151, 152, the hyperbolic mirror 180 would see an equal and opposite adjustment of up to 25 degrees.

The extents of this level of rotation are observed by the two mirror positions observed in FIGS. 8A and 8B. The circle exhibited on the hyperbolic mirror 180 is an indication of the extents of the parabolic mirror's 116 light energy being concentrated to a diameter of 7.5 cm onto the hyperbolic mirror 180, and where it would reside on the hyperbolic mirror at different times of the day, depending on the parabolic mirrors' 116 likely angular position at that point in time.

Heat Engine Design and Linear to Rotary Motion Converter

Figure 13A:
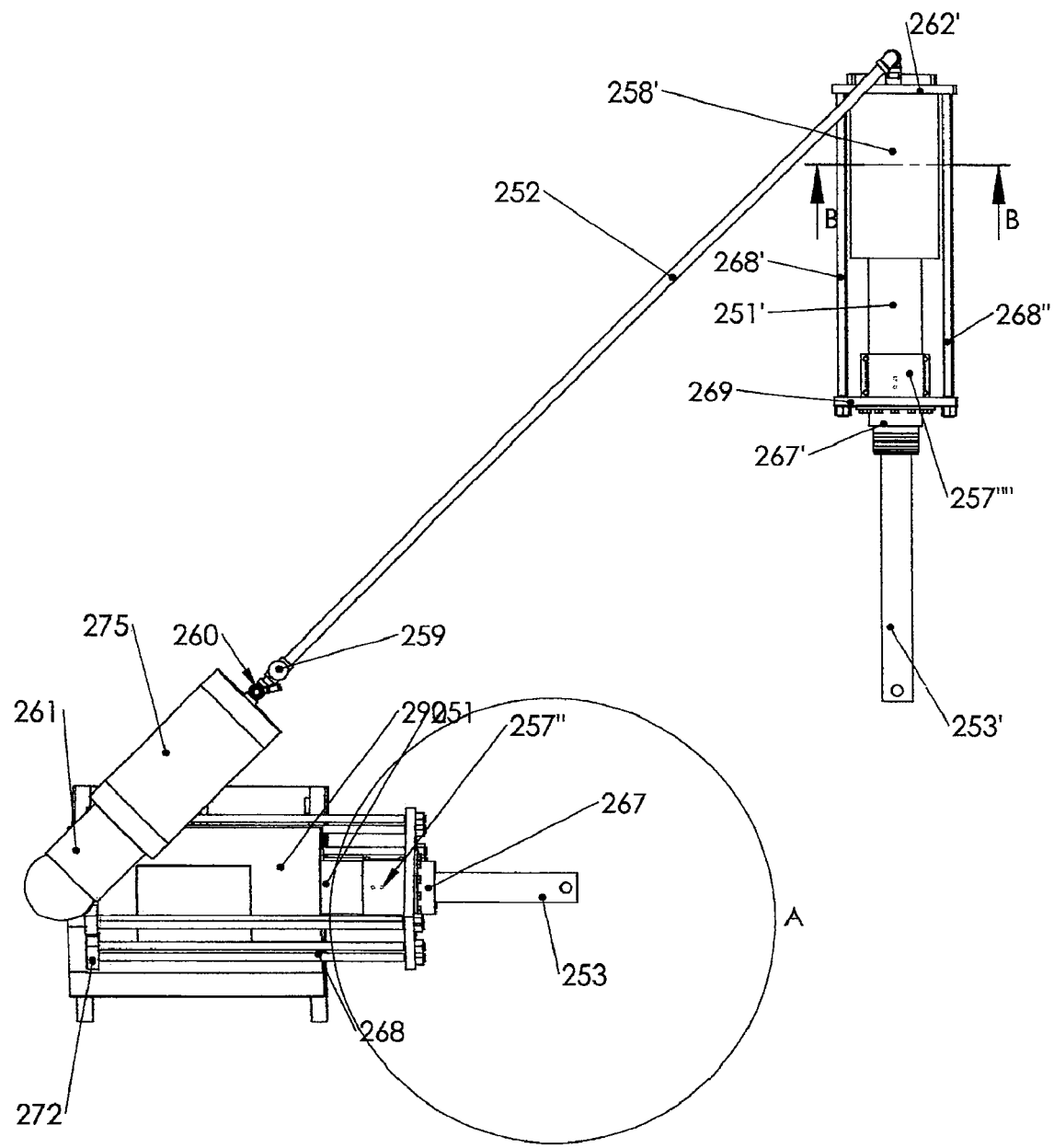
FIG. 13A is a view of the left side of the regenerator and cylinder assembly.
Figure 13B:
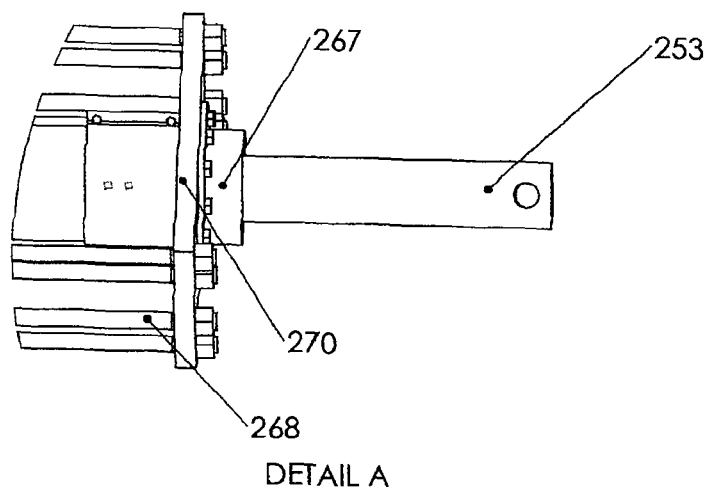
FIG. 13B a detailed view of area A of FIG. 13A.
Figure 13C:
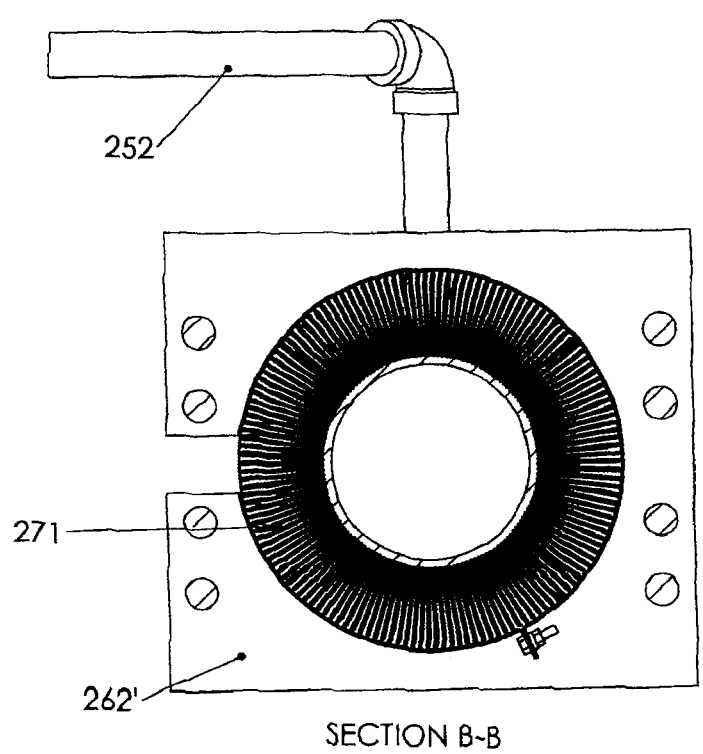
FIG. 13C is a cross-section at B-B of FIG. 13A.

FIGS. 9, 10A, 10B and 10C provide a detailed description of the complete heat engine 250 Design. FIGS. 11A to 11E provide a more comprehensive description of the regenerator assembly 275 used in the heat engine. FIGS. 12A to 12D provide a more comprehensive description of the heat engine storage compartment assembly 290'. FIGS. 13A to 13C provide a more comprehensive description of the regenerator and cylinder assembly used within the heat engine 250 design.

We start the discussion on the heat engine 250 design by discussing the design of the heat engine storage compartment assembly 290' as detailed in FIG. 12A to 12D.

As discussed above, the parabolic mirrors' 116,116' concentrate the sunlight onto the individual hyperbolic mirrors (180 and 181 respectively of FIG. 4A) to an approximate concentration diameter of 7.5 cm. The individual hyperbolic mirrors then reflect and further concentrate the light energy to one of sixteen 5 cm target zones situated on the copper spreader plate described as the heat storage compartment front plate 267'.

In FIGS. 12A to 12D, the heat engine storage compartment is further defined. The sixteen individual sunlight target zones are evenly distributed on the copper spreader plate 267'. The spreader plate 267' is metallurgically bonded to the copper folded fin 292' which acts as the heat transfer mechanism for the solar salts situated within the heat storage compartment. The solar salt composition to be used in the storage area will be optimized to have the lowest liquidus temperature, a composition such as the following (Li—33% mol, K—48% mol, and Na—19% mol). The galvanized storage chamber 291' houses the solar salt composition. The galvanized storage chamber 291' is encased in a suitable insulation material 296' on three sides. There is a removal access plate 294' into the galvanized storage chamber 291' in order to access the chamber and fill with the solar salt composition. This removal access plate 294' can be accessed only after removing the separate insulation material compartment 295' above it. The galvanized storage chamber 291' is a scalable design, which can be made larger if greater thermal storage capability is a customer requirement, and smaller if lesser thermal storage capability is required.

Figure 9:
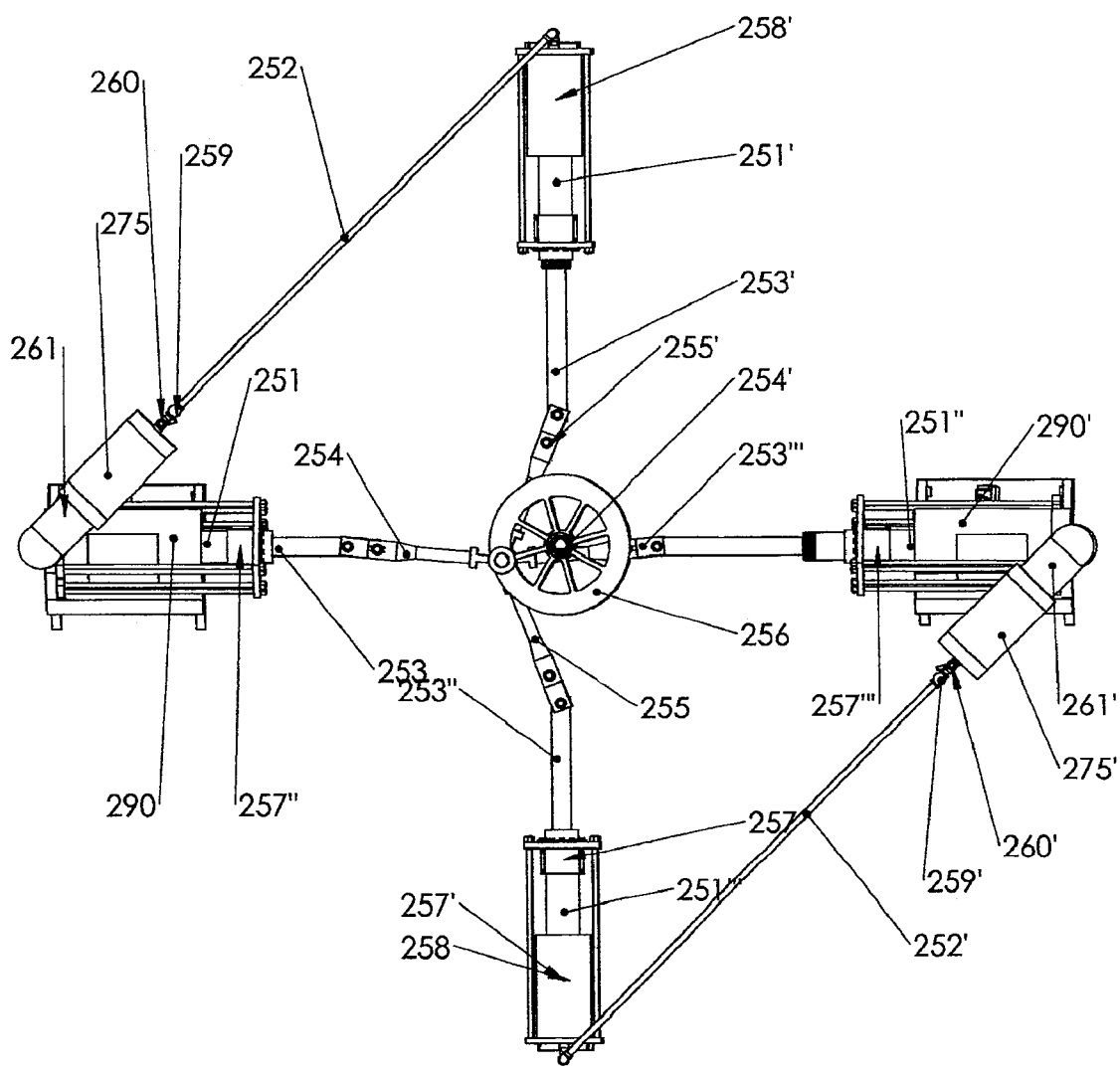
FIG. 9 is a top view of the heat engine.

Referring to FIG. 9, a hot piston 251,251" pressurized with helium gas resides within each of the two heat storage compartments 290,290'. During the hot piston compression cycle, the heated helium gas exits from the hot piston and passes through the hot insulated exit pipe 261,261', then through the regenerator assembly 275,275' which acts as a temporary heat storage device. The hot helium then begins to cool by passing through the uninsulated pipe 252,252' to the cold piston 251',251". The cold piston 251',251'" has an aggressive folded-fin heat sink assembly 258,258' metallurgically bonded to it. As the vertical axis wind turbine blade 400 passes by the cold piston 251',251', it initiates a localized pressure drop condition that results in the development of airflow velocity that passes through the folded fin heat sink assembly, thereby cooling the cold piston and significantly increasing the temperature differential between the hot piston and the cold piston. As the cold piston 251',251" completes its compression cycle, the cooled helium gas in the piston passes back through the uninsulated pipe 252,252' and back through the regenerator assembly 275,275', where the stored heat begins to reheat the helium gas. The heated gas then passes through the hot insulated exit pipe 261,261' and once again into the hot piston 251,251". The regenerator assembly 275,275' plays an efficiency improvement role in this heat engine 250; the greater the effectiveness of the regenerator 275,275' in heating and cooling in the helium gas, the greater the efficiency of the heat engine design.

The heat engine is comprised of two pairs of hot piston 251,251", 2 regenerator assemblies 275,275' and two pairs of cold pistons 251'251'.

The piston rod 253 that exits each of the hot piston 251,251'" and cold piston 251'251'" is connected to a rotator cylinder linkage 254,254'255,255'. All four rotator cylinder linkages are connected to a Stirling engine rotator pin 263 situated between the top and bottom heat engine rotator wheels 256,256'. The centre hub of the top heat engine rotator wheel 256 connects directly with the main driveshaft 600. The bottom heat engine rotator wheel 256' connects directly to the speed increaser input shaft 203. This describes the rotary motion interface for both the vertical axis wind turbine 400 and the solar collector array 100.

FIG. 13A to 13C describes through the use of a top view and detailed and sectional view describes in more detail the function of the regenerator and cylinder assembly. The heat engine 250 is comprised of two of these linear motion actuating devices. Starting from the cold piston rod end 253', the piston rod 253' passes through a gland 267' that is supported by the cold piston front plate 269. A series of 8 tension rods 268', 268" provide a compressive load on the cold piston front plate and the cold piston back plate 262', ensuring a pressurized seal is maintained. The piston rod 253' then enters into the body of the cold piston 251'. The cold piston 251' is supported by two cold piston support structures 257'",257"". The wind turbine end of the cold piston 251" contains a shrouded cover 258' encompassing an aggressively constructed folded fin heat sink 271 which is metallurgically bonded to the cold piston 251'. The cold piston back plate 262' has configured openings in the plate to ensure airflow from the vertical axis wind turbine 400 is unobstructed and able to pass through the aggressively constructed folded fin heat sink 271 freely. The cold piston 251' exit is connected to the uninsulated return pipe 252. Situated adjacent to the regenerator assembly 275 is a pressure gage 259 and a valve 260 for pressurizing the regenerator and cylinder assembly with helium gas. Adjacent to the valve 260 is the regenerator assembly 275, which is followed by the insulated return pipe 261, that sits at the entrance of the hot piston 251. The hot piston back-plate 272 resides at the back plate of the hot piston 251, which is encased in insulation material in order to minimize heat loss. Adjacent to this hot piston back-plate 272 sits the heat storage compartment assembly 290. At the opposite end of the hot piston 251 resides the hot piston front plate 270. A series of 8 tension rods 268 provide a compressive load on the hot piston front plate 270 and back plate 272. The hot piston front plate 270 supports a gland 267 which supports the piston rod 253 which exits the hot piston 251.

Figure 10A:
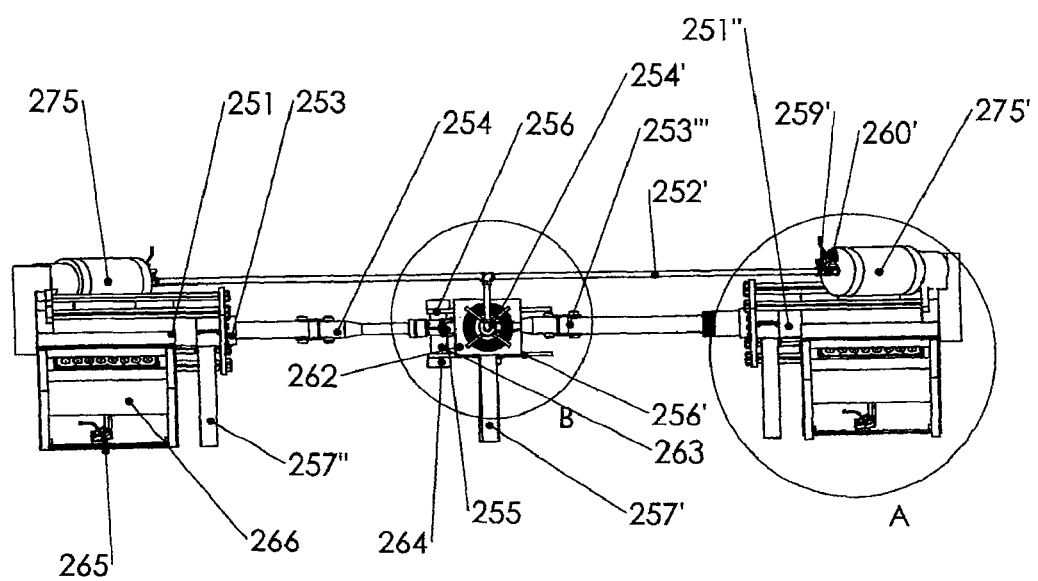
FIG. 10A is a front view of the heat engine.
Figure 10B:
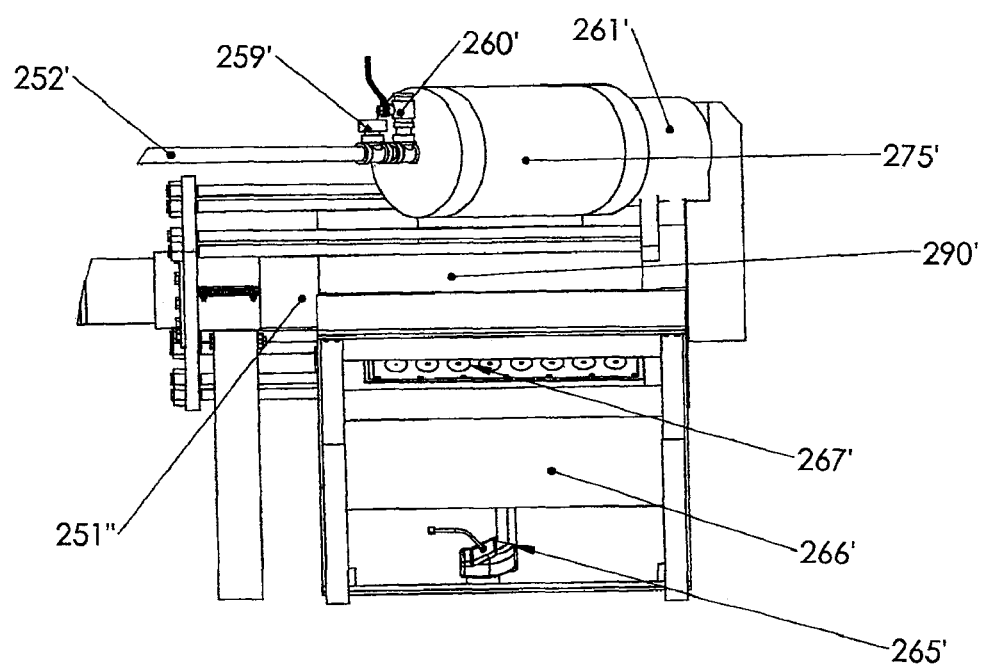
FIG. 10B is a detailed view of area A of FIG. 10A.
Figure 10C:
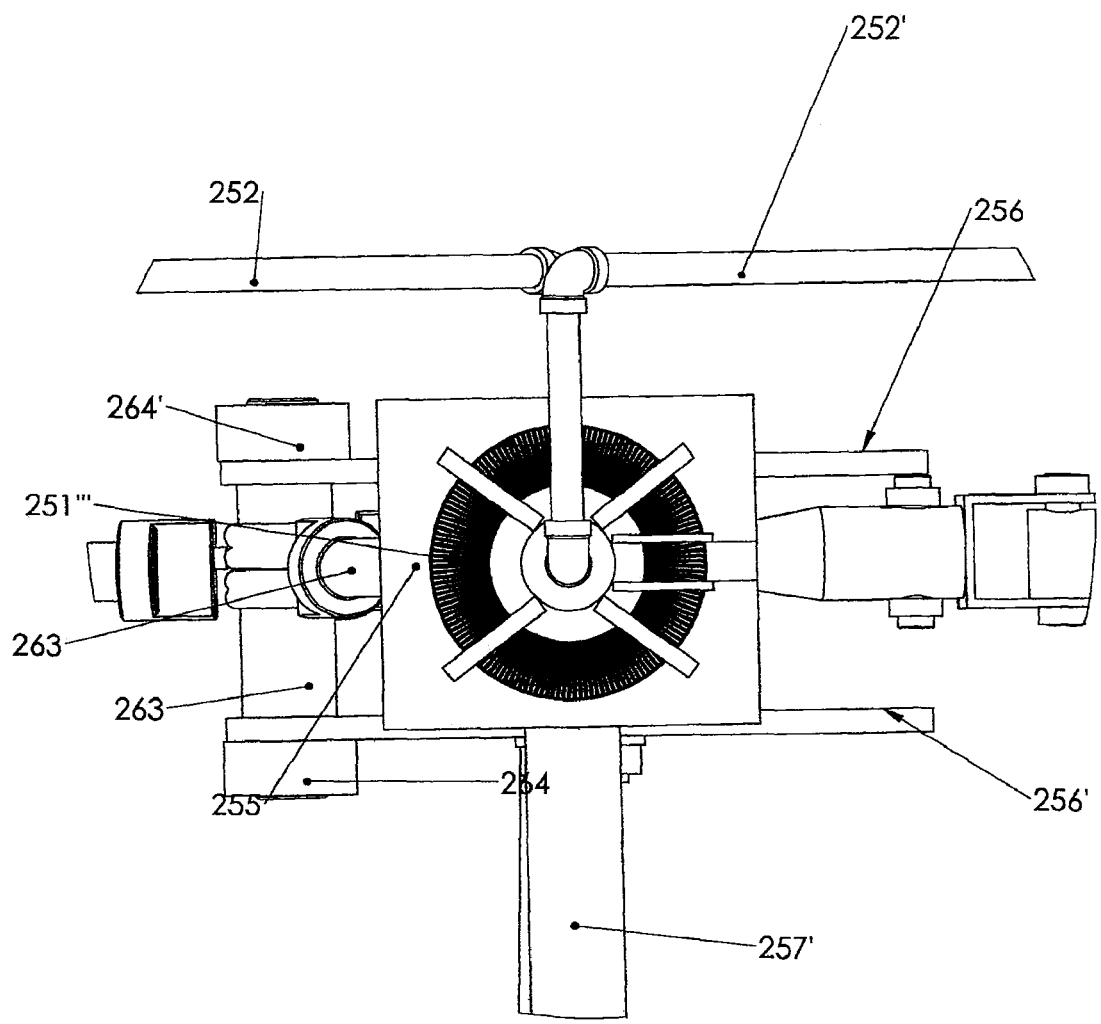
FIG. 10C is a detailed view of area B of FIG. 10A.
Figure 11A:
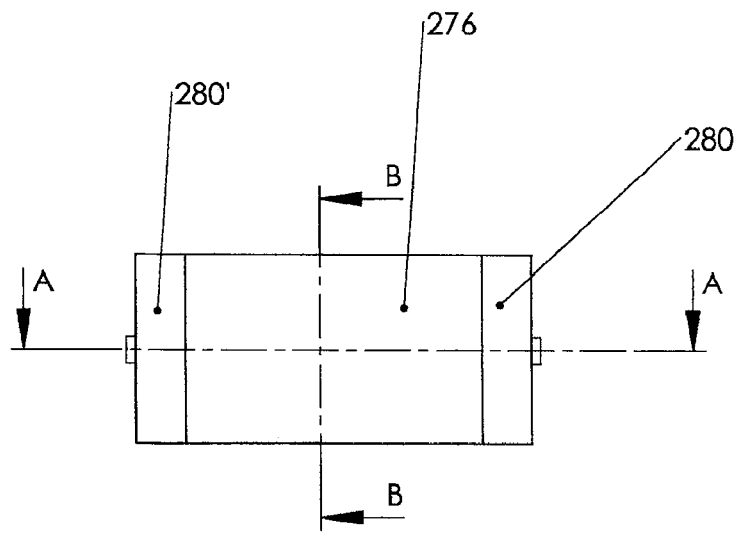
FIG. 11A shows the regenerator assembly.
Figure 11B:
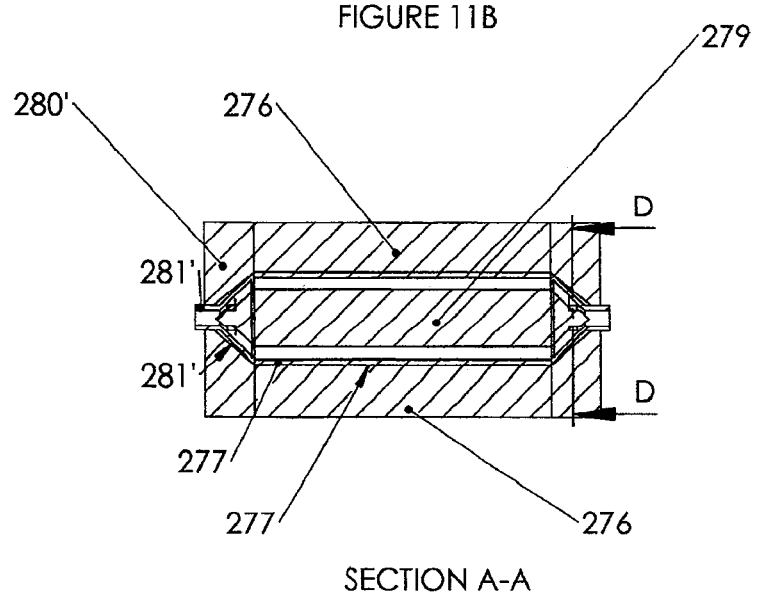
FIG. 11B is a cross-section at A-A of FIG. 11A.
Figure 11C:
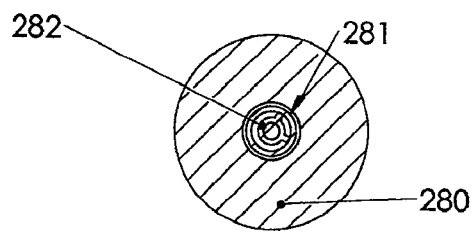
FIG. 11C is a cross-section at D-D of FIG. 11B.
Figure 11D:
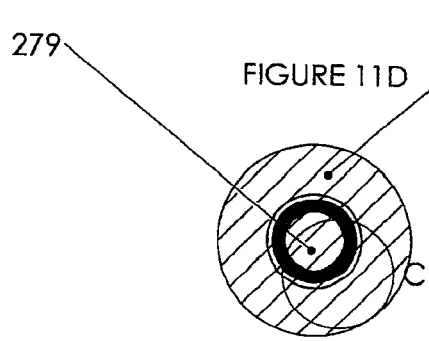
FIG. 11D is a cross-section at B-B of FIG. 11A.
Figure 11E:
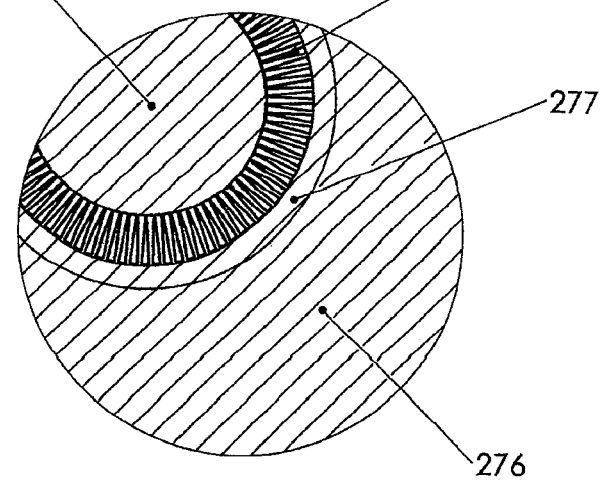
FIG. 11E is a detailed view of area C of FIG. 11C.
Figure 12A:
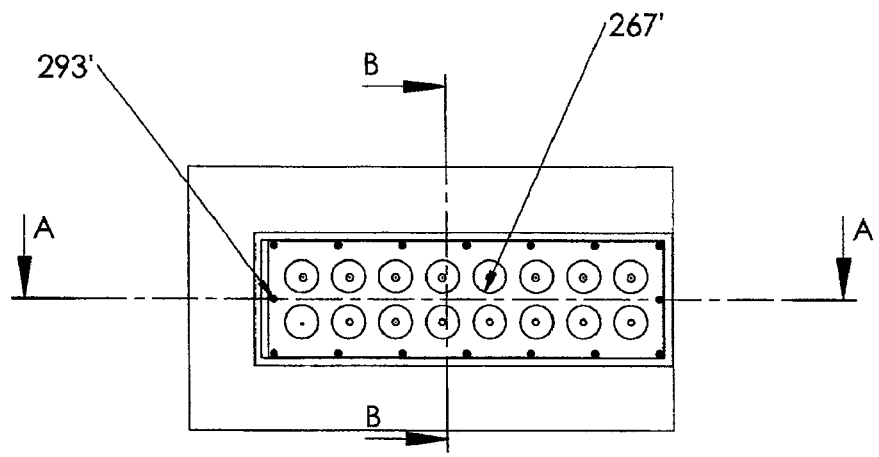
FIG. 12A shows the heat engine storage compartment assembly.
Figure 12B:
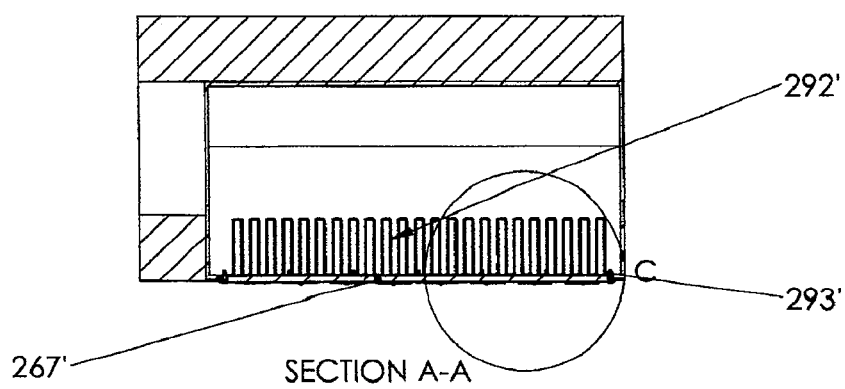
FIG. 12B is a cross-section at A-A of FIG. 12A.
Figure 12C:
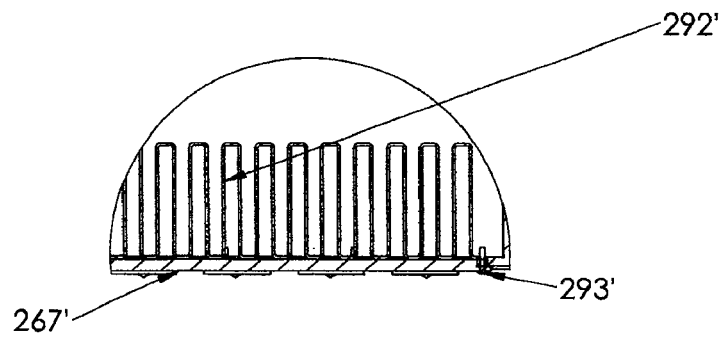
FIG. 12C a detailed view of area C of FIG. 12B.
Figure 12D:
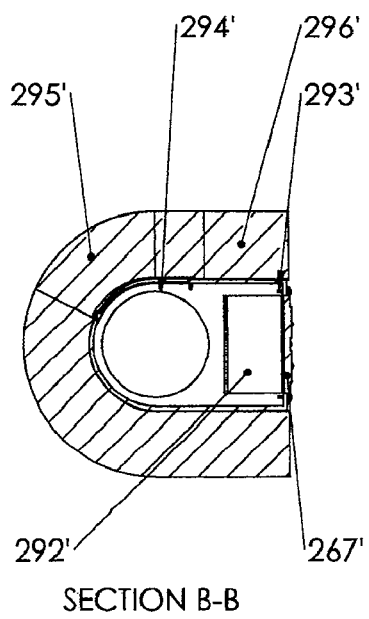
FIG. 12D is a cross-section at B-B of FIG. 12A.

FIG. 10A to 10C describes the front view of the heat engine 250 four piston design and it describes a few detailed features of the design to a greater extent than the other views.

Detail A shows the copper spreader plate with the sixteen sunlight target zones 267', which is the heat source for the heat storage compartment assembly 290'. A thermocouple embedded within the copper spreader plate 267' monitors temperatures of the spreader plate throughout the day. When the temperature of the spreader plate reaches a certain minimum temperature threshold, the linear actuator 265' is activated, and the insulator front plate 266' is linearly raised to cover the copper spreader plate 267'. This action minimizes heat losses within the heat storage compartment assembly 290. Similarly, a thermocouple is also embedded within the insulator front plate 266' at a strategic location, and when the thermocouple reaches a certain minimum threshold temperature the linear actuator 265' is once again activated and the insulator front plate 266' is linearly lowered thereby exposing the copper spreader plate 267'. This above described process identifies a strategy to minimize thermal compartment heat losses during the evening periods, and high cloud-cover periods which arise during the variable solar collection conditions experienced.

Detail B shows a partial front view of the device which converts linear motion into rotary motion. The front cold piston assembly of the heat engine covers the centre region, however what is observed is the rotator cylinder linkage 255 connection to the heat engine rotator pin 263. The Detail B view also partially communicates how the general space, other than the Stirling engine rotator pin 263, is clear and unobstructed in between the top rotator wheel 256, and the bottom rotator wheel 256' so as not to restrict rotation of the four rotator cylinder linkage 254,254',255,255' components connected to it.

FIG. 11A to 11E provides a sectional and detailed view of the regenerator assembly 275,275' construction. The regenerator is a key component of the heat engine design. It needs to be effective at temporarily storing the heat from the hot helium gases which enters and exits the unit during the hot piston compression cycle; and it in turns needs to be effective in reheating the cold helium gases during the cold piston compression cycle upon their return through the regenerator. Pressure drop is also an appropriate consideration in determining the design of this device, as pressure drop will also lessen the efficiency of the heat engine.

The regenerator assembly is encased in insulation 276 around its circumference. As well the end units are encased in Insulation 280,280'. The regenerator assembly 275,275' has a standard pipe inlet which is transitioned in the end cap assembly 281,281' as the gases are routed circumferentially around a central copper regenerator core 279. The copper regenerator core is held in position concentrically by two regenerator hanger supports 282,282' located within the endcap assembly 281,281' region of each end. A highly dense aluminum (or copper) lanced folded fin 278 is metallurgically joined to the central copper regenerator core 279. The central copper regenerator core 279 and highly dense lanced folded fin 278 is held in place by an outer pipe 277 which is welded to the end cap assemblies and pressurized to ensure no gaseous leaks.

Main Maintenance Platform Assembly

Figure 14A:
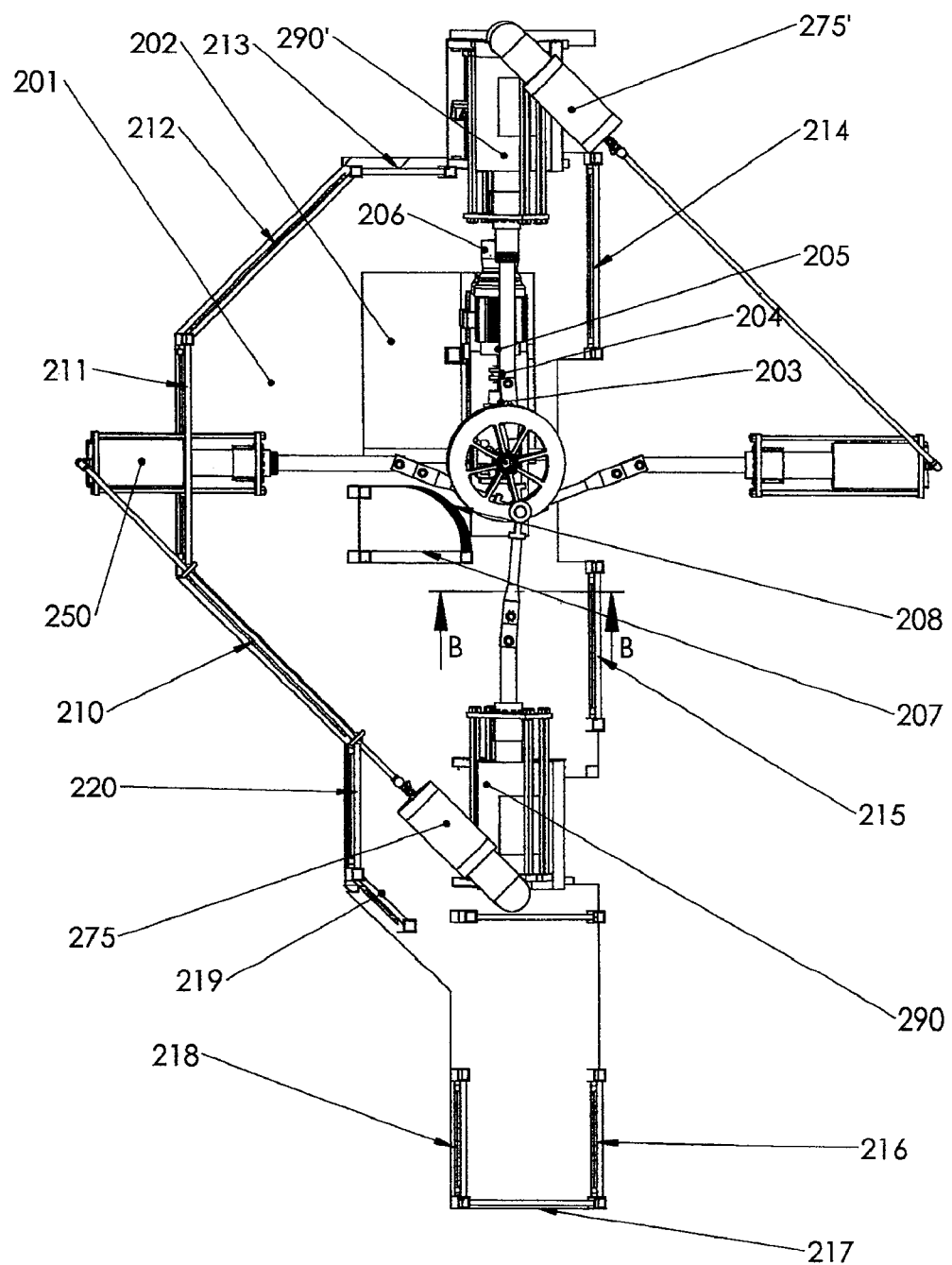
FIG. 14A is a top view of the main maintenance platform assembly.
Figure 14B:
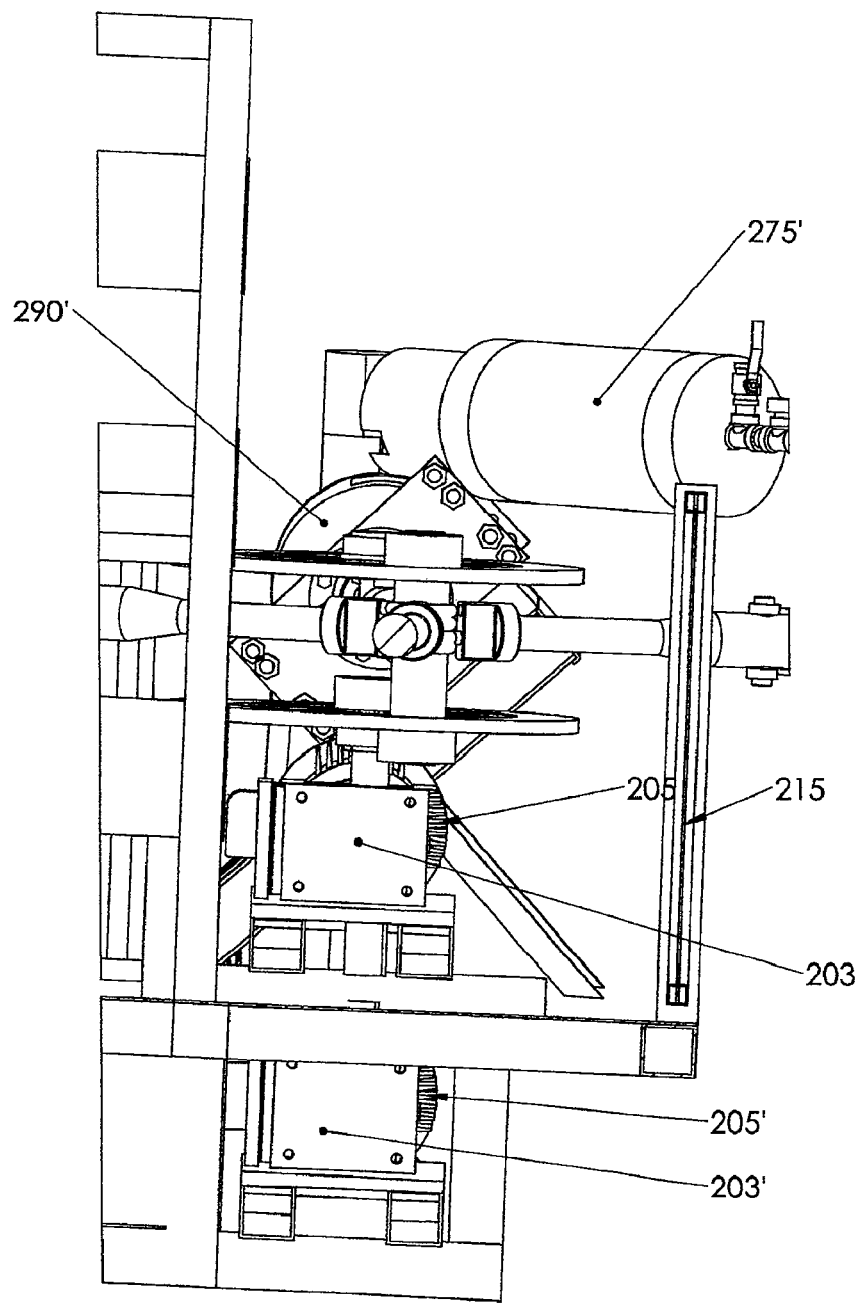
FIG. 14B is a cross-section at B-B of FIG. 14A.

FIG. 14A is a top view of the main maintenance platform assembly 200.

The main purpose of this main platform assembly 200 is to provide human access to the heat engine 250 equipment and rotating equipment so as to facilitate the ongoing maintenance needs of the top level assembly. Human access is provided through the access opening 207 where access is achieved through a pull down ladder.

Human safety is achieved through restricting access to the pull down ladder through the use of a lock. When the lock is removed, and when the ladder is pulled down, a proximity sensor receives an alert, which completes one of three actions; i) it energizes the brake 206 which restricts the rotation of the vertical axis wind turbine 400, ii) it activates a second proximity sensor which ensures that the vertical axis windmill blade 400 is not blocking any access to the outer platform defined by the perimeter safety walls 216, 217 and 218, and iii) it energizes the motor 104 actuating the horizontal or altitude axis and the motor 506 actuating the vertical or azimuth axis, and instructs these motors to park in a mode that minimizes solar collection activities. The goal of these actions would be to shut down all rotating equipment prior to the human reaching the platform, thereby placing human safety as a priority over energy collection activities.

Human safety is also achieved through the use of access opening guarding 208 protecting the human from rotating equipment, safety perimeter walls 210,211,212,213,214, 215,216,217,218, 219 and 220) around nearly the entire platform, and by providing a bearing maintenance stepper plate (not shown in the accompanying drawings) which covers the mechanism that translates linear motion into rotary motion, and provides access to the vertical axis wind turbine support bearings 303,303' (see FIG. 1).

The maintenance platform assembly 200 also provides maintenance access to the speed increaser 203 that multiplies the vertical axis wind turbine 400 and heat engine 250 rotary speed inputs, and increases them to an rpm which is above the synchronous slip speed of the generator 205. The brake 206 is incorporated into the back end of the generator 205. A coupling 204 connects the speed increaser 203 with the generator 205.

The windmill will operate best within a certain range of tip speed ratios. Tip speed ratio is defined as the ratio between the tangential speed of the tip of a blade and the actual velocity of the wind. The tip speed ratio is related to efficiency, with the optimum varying with blade design. In this example, a tip speed ratio of 3 to 6 is the preferred target, and a range of operating speeds between 120 and 180 rpm. The larger the unit and the windmill diameter becomes, the slower the operating rpm of the unit becomes. Operating rpm may be varied in the design at relatively low changeover cost.

The maintenance platform design facilitates an optional dual generator, by incorporating a lower maintenance access region as described by 202. As a result, the speed increaser 203, the coupling 204 and the generator 205 can be duplicated. In such an application, the speed increaser 203, would need to have a dual output shaft design, and would require an electro-mechanical clutch in between the top speed increaser 203 and the bottom speed increaser 203', so that activation or deactivation of the bottom speed increaser could be controlled by energy generation control software.

Given this dual generator 205,205' option (as observed in FIG. 14B), in peak periods of energy collection when there is a period of extremely high wind speeds, the dual generator 205,205' control design can be actuated, thereby facilitating a higher level of electricity output. Decisions relating to when to activate or deactivate the second drive could be automated and programmed into the control software.

Main Mast and Frame Assembly

FIGS. 15A and 15B describes the main mast and frame assembly 300 used in this design. This element of the design is the fundamental structural skeleton of the top level assembly. Two main mast vertical square columns 301,301' provide the main lower connection to the base rotator assembly 500 (see FIG. 18).

The lower hanging members of the main mast support the frame member 304,304'. Frame member 304,304' provides the primary structural support for the array of solar collectors and the C-channel side rail sub-assembly 100 as indicated in FIG. 1.

As was discussed earlier, the heat engine storage compartment 290 per FIG. 1 is situated at a 45-degree angle from horizontal, so as to be perpendicular to these frame members 304,304'. This orientation best facilitates the solar collector's heat transfer process.

The structural elements identified as 305,305',307,307', 306,306',308,308',309 and 310 are the structural frame elements which provide overall support for the main maintenance platform subassembly 200 (see FIG. 14).

The cylindrical tube 302 and piloted flange bearings 303,303' are the primary structural elements which support the driveshaft 600 driving the windmill arm and blade assembly 400 (see FIG. 16), and facilitates its rotation. Through rotation, the windmill arm and blade assembly 400 derives mechanical torque from wind energy through the use of an intermediary driveshaft component 600.

Windmill Arm and Blade Assembly

Figure 16A:
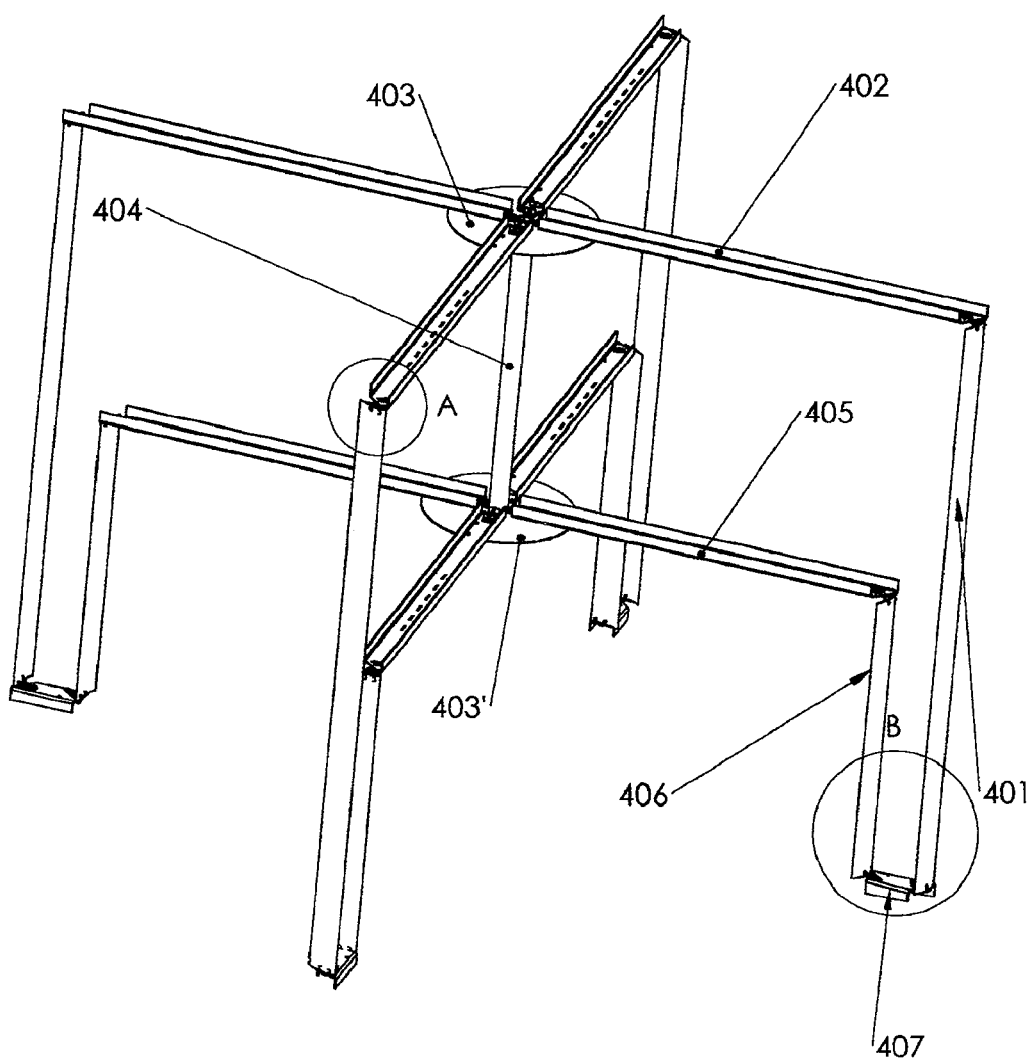
FIG. 16A is a perspective view of the vertical axis windmill arm and blade assembly.
Figure 16B:
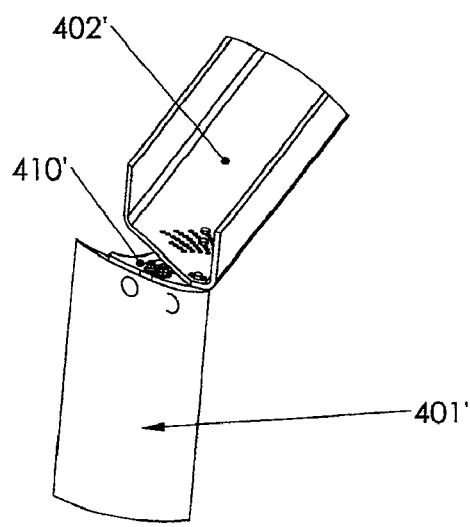
FIG. 16B a detailed view of area A of FIG. 16A.
Figure 16C:
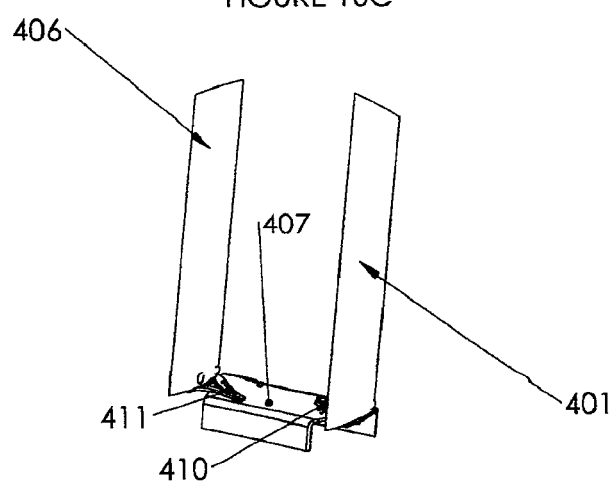
FIG. 16C a detailed view of area B of FIG. 16A.

FIGS. 16A to 16C show a four-blade windmill arm and blade assembly 400.

The design has two windmill arm support plate assemblies 403,403'. The top windmill arm support assembly 403 rigidly supports four upper windmill arm beams 402 and also facilitates static and dynamic balancing adjustments of the complete windmill arm and blade assembly 400. The upper windmill arm beam 402 in turn supports a blade inner support assembly 410 which has blade pitch angle feature adjustments incorporated into the design. The blade inner support assembly 410 in turn is fastened to the windmill blades 401 at the top.

Between the two windmill arm support plate assemblies 403,403' is a windmill support tube 404 which provides an interim structural support role for the complete windmill arm and blade assembly prior to its final installation. The two windmill arm support plate assemblies 403,403' have a concentric keyed interface with a keyed driveshaft 600 that passes through the complete assembly and which is structurally held by the piloted flange bearings 303,303' as indicated in the main mast and frame assembly 300 (see FIG. 15). The opposite shaft end has a keyed connection with the top rotator wheel 80 (indicated in Detail B of FIG. 10A), transferring torque generated from the windmill arm and blade assembly to this top rotator wheel 256.

The bottom windmill arm support plate assembly 403' rigidly supports four lower windmill arm beams 405. The windmill arm support plate assembly 403' also facilitates static and dynamic balancing adjustments as was the case in the upper assembly. The lower windmill arm beam 405 in turn supports a blade inner support assembly 410 which also has blade pitch angle feature adjustments. The blade inner support assembly 410 in turn supports the windmill blade 406.

At the base of the windmill blades, the inner windmill blade 406 is rigidly connected to the bottom blade inner support assembly 411. This bottom blade inner support assembly is fastened to the lower windmill arm beam 407, which also has an outer perimeter connection to the blade outer support assembly 410. The blade outer support assembly 410 is in turn fastened to the outer windmill blades 401 at the bottom.

Preferably, the windmill blades have an airfoil shape to optimize performance.

The design of this windmill arm and blade assembly offer several design benefits to the implementer. They are described as follows:

The blade profile has high coefficient of lift characteristics versus coefficient of drag characteristics for airfoil performance installations operating at Reynolds numbers approximating the realm of stand-alone vertical axis wind turbines installations of this nature.

The blade connection design offers a relatively clean and unobstructed blade connection design and does not require any mid-span connection requirements, which, if they existed could significantly impede wind turbine performance.

The blade connection design facilitates the flexibility of differing blade pitch angles which is helpful in optimizing the design's performance.

The windmill arm support assembly design facilitates static and dynamic balancing adjustments to the windmill arm and blade assembly thereby minimizing vibrational concerns associated with unbalance.

The windmill arm and blade assembly provides a dual blade design that offers three functional benefits: 1) it increases blade torque generating performance, 2) it keeps the floorplan area associated main maintenance platform assembly area primarily free from safety concerns associated with the rotating windmill, and 3) the inner blade design acts as a functional assist in facilitating heat removal within the cold piston design, thereby increasing the temperature differentials between the hot and cold pistons, and increasing the heat engine's operating efficiency.

Base Rotator Assembly Facilitating Azimuth or Vertical Axis Control

Figure 17:
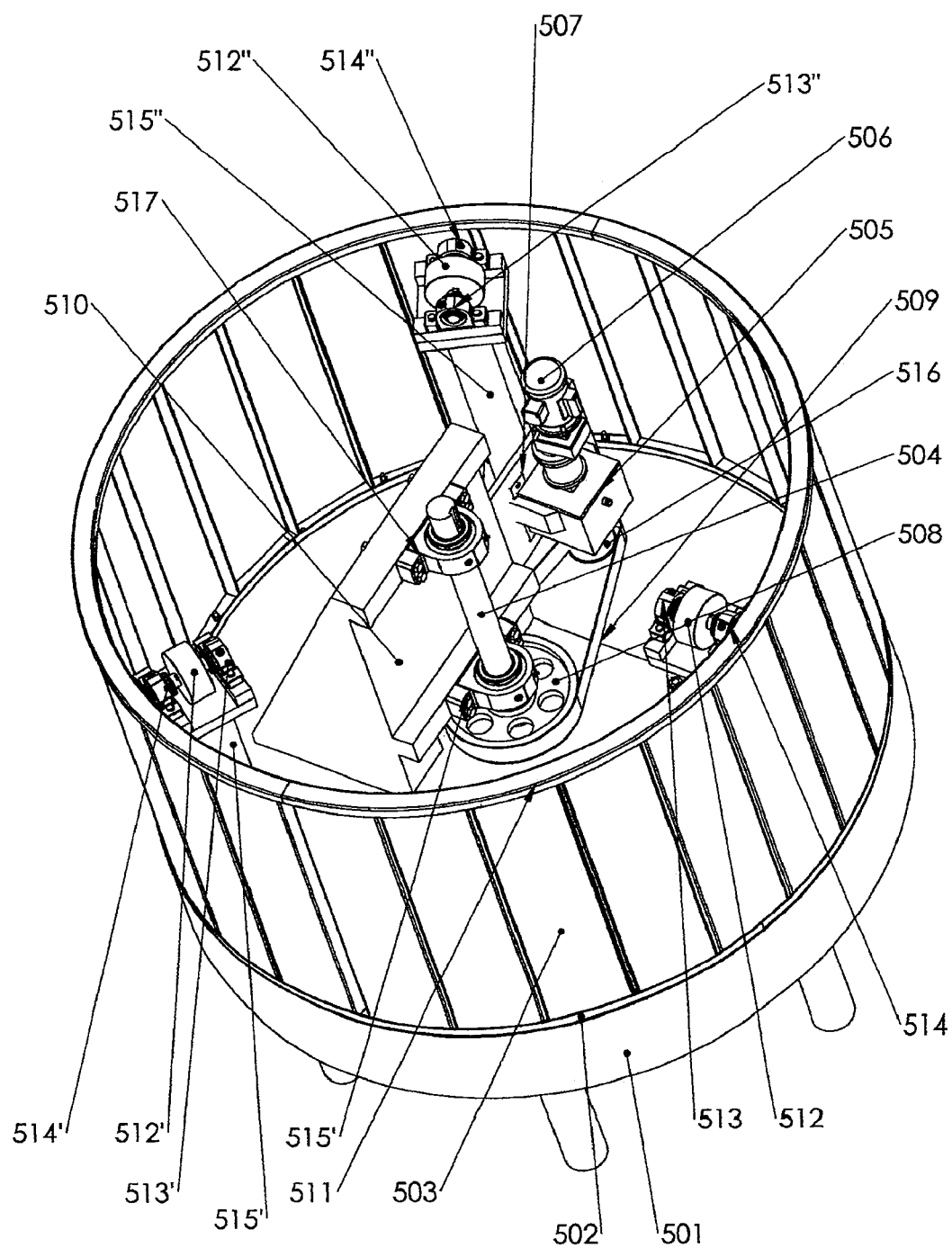
FIG. 17 is a perspective view of the base rotator assembly with its baseplate removed to show the internal components associated with azimuth axis rotation.
Figure 18A:
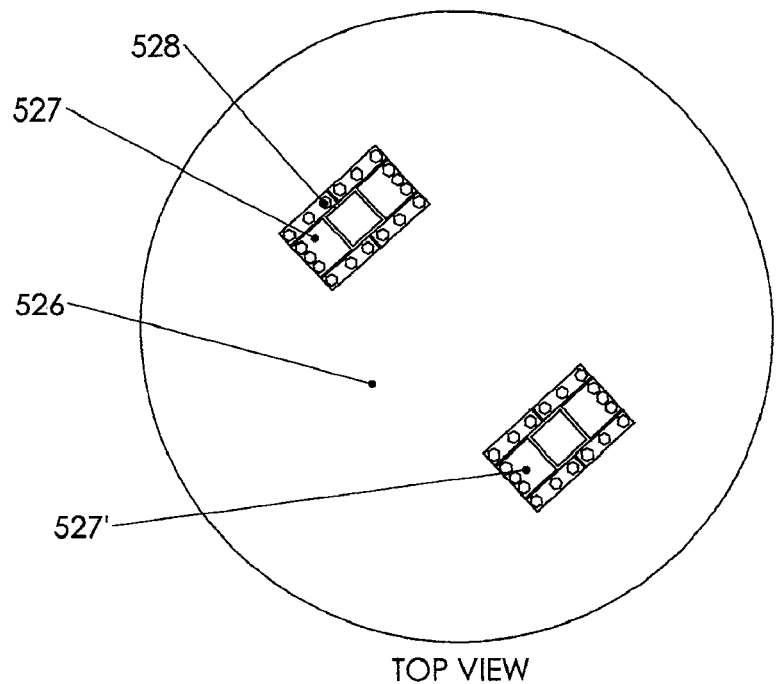
FIG. 18A is a top view of the rotator baseplate assembly associated with FIG. 17.
Figure 18B:
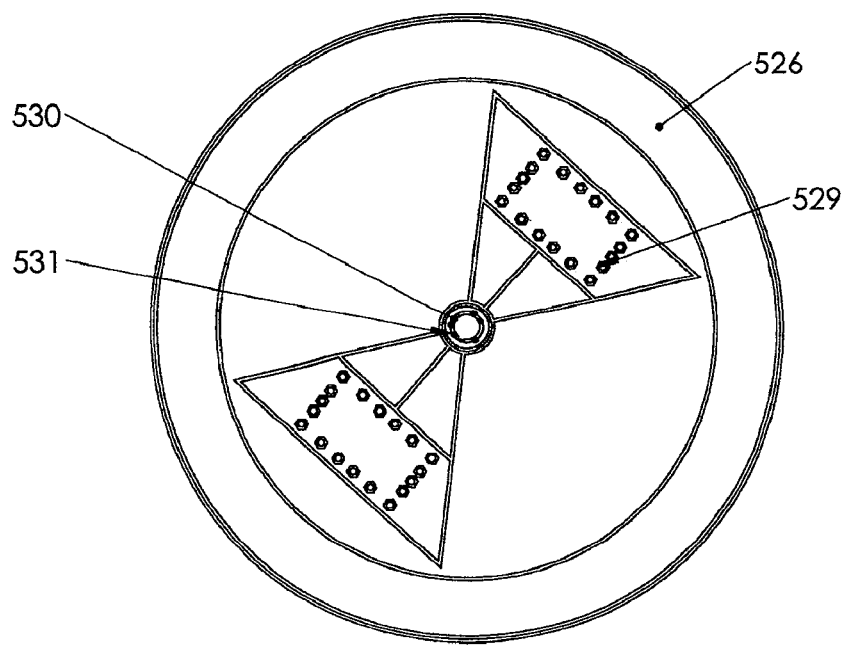
FIG. 18B a corresponding bottom view.

FIG. 17 describes the base rotator assembly 500 with the rotator baseplate assembly 525 removed. FIGS. 18A and 18B describes the rotator baseplate assembly 500 and its function.

The base rotator assembly 500 describes a concrete footing 501 which can include concrete piles or posts that extend deeper into the ground.

Affixed to the top of the concrete footing 501 are two wall c-channel frames 502 which are fastened to the concrete footing. Seated within the wall c-channel frames 502 resides a multitude of base wall sections 503 which surround the entire perimeter of the concrete footing and conceals the internal equipment of the base rotator assembly. At the top of the Wall C-channel frames 503 resides a Wall C-channel top frame 511 supporting the top portion of the Wall C-channel frames 503. Parts of the C-channel top frame 511 are removable, thereby facilitating the removal of some of the base wall sections 503 facilitating access to the infrastructure equipment for maintenance purposes.

Within the base rotator assembly 500 resides a large foundation baseplate 510 which is capable of resisting a significant structural moment. A vertical shaft 504 with a keyed output facilitates the rotation of the rotator baseplate assembly's keyed welded hub 530 (see FIG. 18). The vertical shaft with the keyed output is supported by two pillowblock bearings 515,515' which are sized to resist the structural moment of the top level assembly. The vertical shaft with a keyed output 504 is driven by a large synchronous sprocket 508 through the synchronous belt drive 509 that is wrapped around a smaller synchronous driver sprocket 516. The smaller synchronous driver sprocket 516 is driven by the output shaft of the gear reducer 505; the gear reducer 505 is driven by the electric motor input 506. Loosening and tightening of the synchronous belt drive 509 is facilitated by a take-up frame 507 which moves the gear reducer 505 and motor 506 towards the vertical shaft 504 for loosening and away for tightening.

An alternative structure is used for the management of the significant infrastructure weight of the top level assembly. Three structural base members with trunnion baseplate and columns 515,515',515" are mounted on the concrete footing 501 at three 120-degree radially centric locations. On top of the trunnion baseplate and columns 515,515',515" is seated a fixed pillowblock rolling bearing 513,513',513" and a floating roller pillowblock roller bearing 514,514'514". Between the two bearings resides a trunnion wheel 512,512', 512" mounted on a shaft running between the two pillowblock roller bearings 513 and 514. The three trunnion wheels 512,512',512" are oriented such that they can rotate tangentially in the direction of motion of the vertical shaft with keyed output 504.

The rotator baseplate assembly 525 bottom view (see FIGS. 18A and 18B) is mounted to the base rotator assembly 500 such that the vertical shaft with keyed output 504 (see FIG. 17), seats within the keyed welded hub 530 on the baseplate 526, and provides the necessary delivered torque to rotate the rotator baseplate assembly 525, and therefore provide azimuth axis or vertical axis control to the top level assembly. The three trunnion wheels 512,512',512" also provide planar support for the rotator baseplate assembly 525 and each trunnion wheel 512,512',512" rotates as the plate rotates. The point of contact of the trunnion wheels 512,512',512" is in the flat circumferential band identified as 526 in the bottom view.

On the top view of the rotator baseplate assembly 525, the large base moment support plates 527,527' reside and are structurally supported by a multitude of structural hex bolts 528. These large base moment support plates 527,527' support the two main mast vertical square columns 301,301' that is noted on the main mast and frame assembly 300 (see FIGS. 15A and 15B).

The base rotator assembly 500 is responsible for providing azimuth axis control to the top level assembly. It being the lowest component, it is also responsible for managing the structural weight and structural moment associated with the complete structure. Given that the infrastructure weight of a combined wind and solar energy generator such as this is significantly higher than the standard weights of just a stand-alone solar energy device, the design has been radically revised in order to meet the weight challenge of this device.

In order to activate azimuth axis control for the entire system, the system needs to rotate less than a full revolution for the entire daily cycle. To facilitate the precision of its angular control, the gear reducer 505 and synchronous drive (508,509,516) reduces the speed of output down to a low speed of revolution. In order to accomplish angular control, this system needs to be activated for only a few milliseconds every 5 or 10 minutes, so the duty cycle on the power transmission components is extremely low.

Alternative embodiment using heat pipes as a heat transfer mechanism in place of hyperbolic mirrors.

Figure 19:
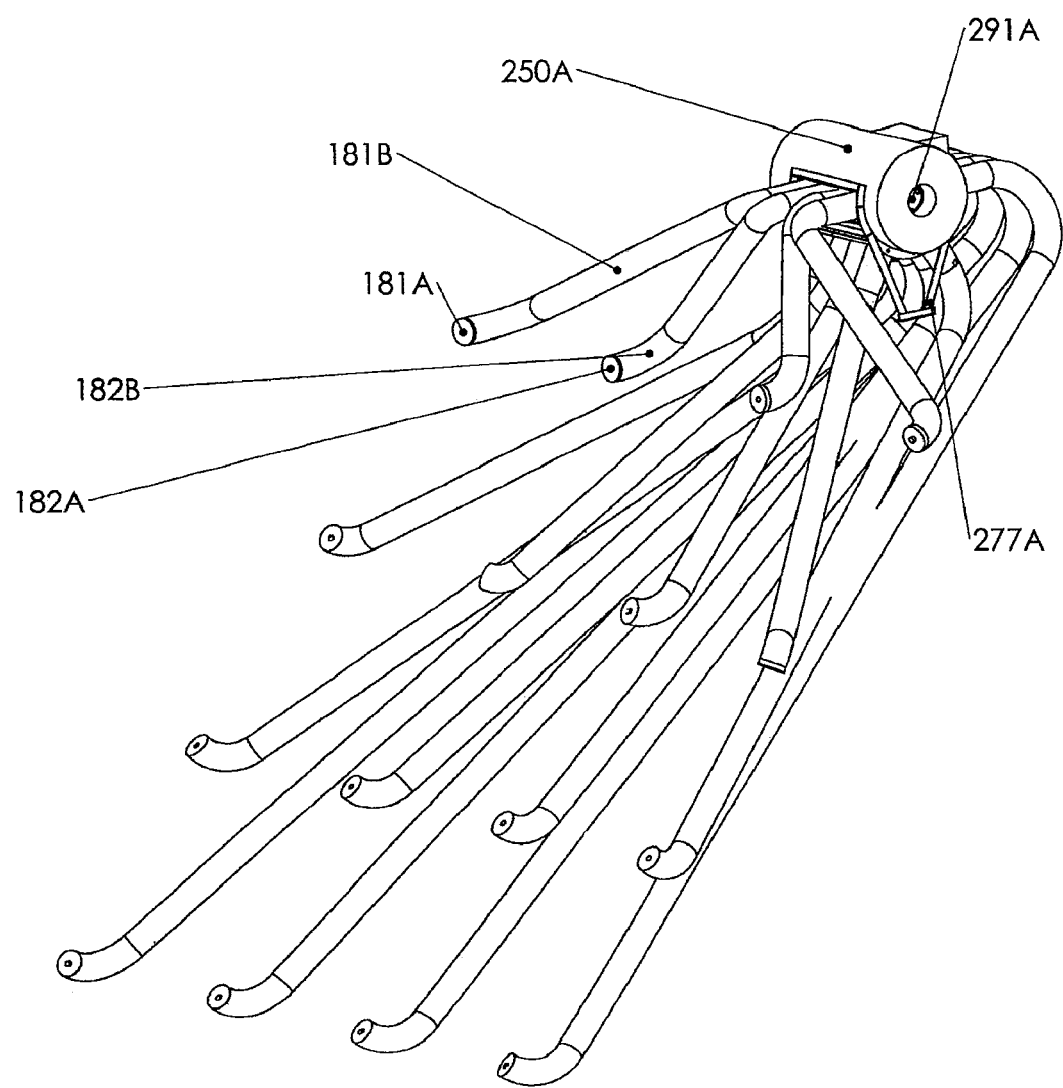
FIG. 19 is a perspective view showing an alternative embodiment of a heat engine collector compartment, assuming the delivery of heat through a heat pipe delivery system.
Figure 20:
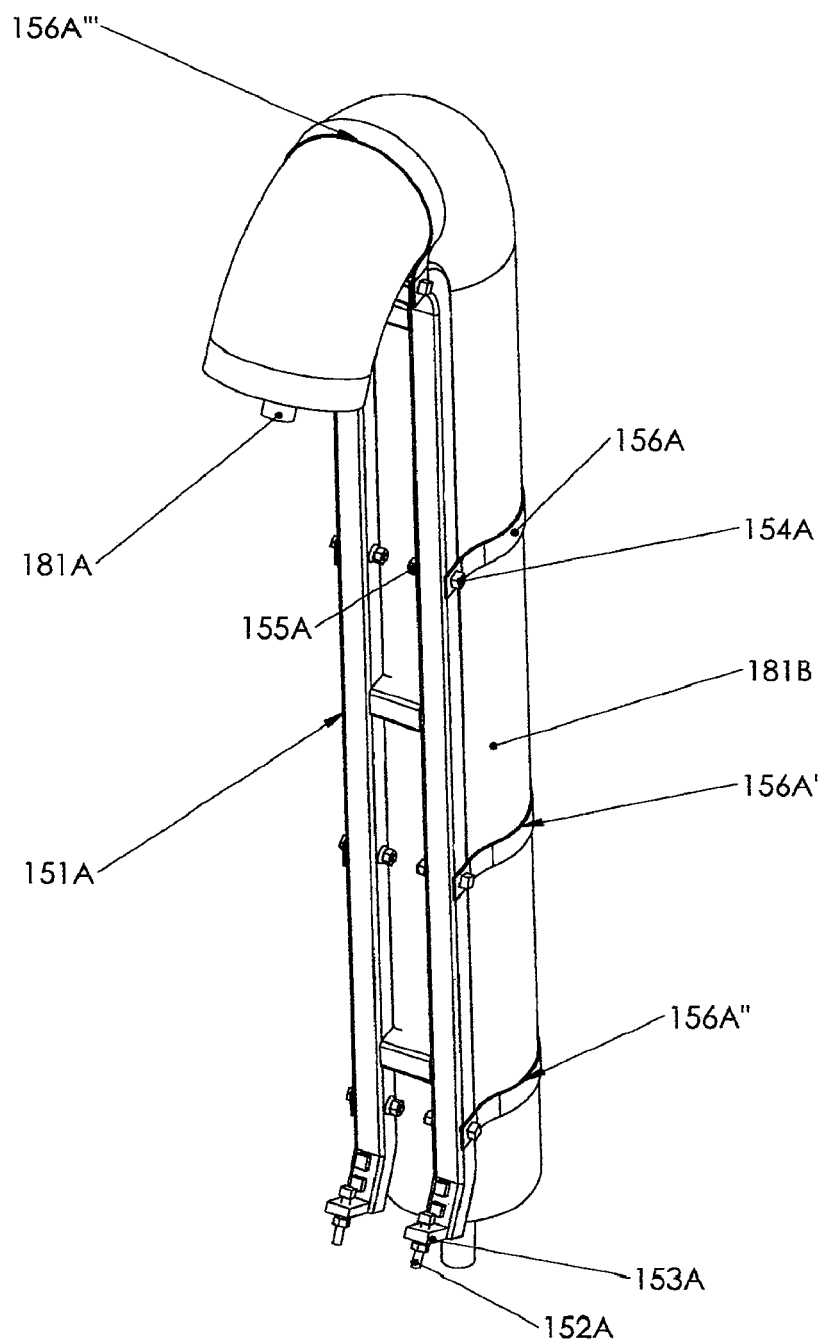
FIG. 20 is a perspective view showing an alternative embodiment of a heat pipe attachment support structure for direct mounting to the parabolic mirror frame assembly.
Figure 21:
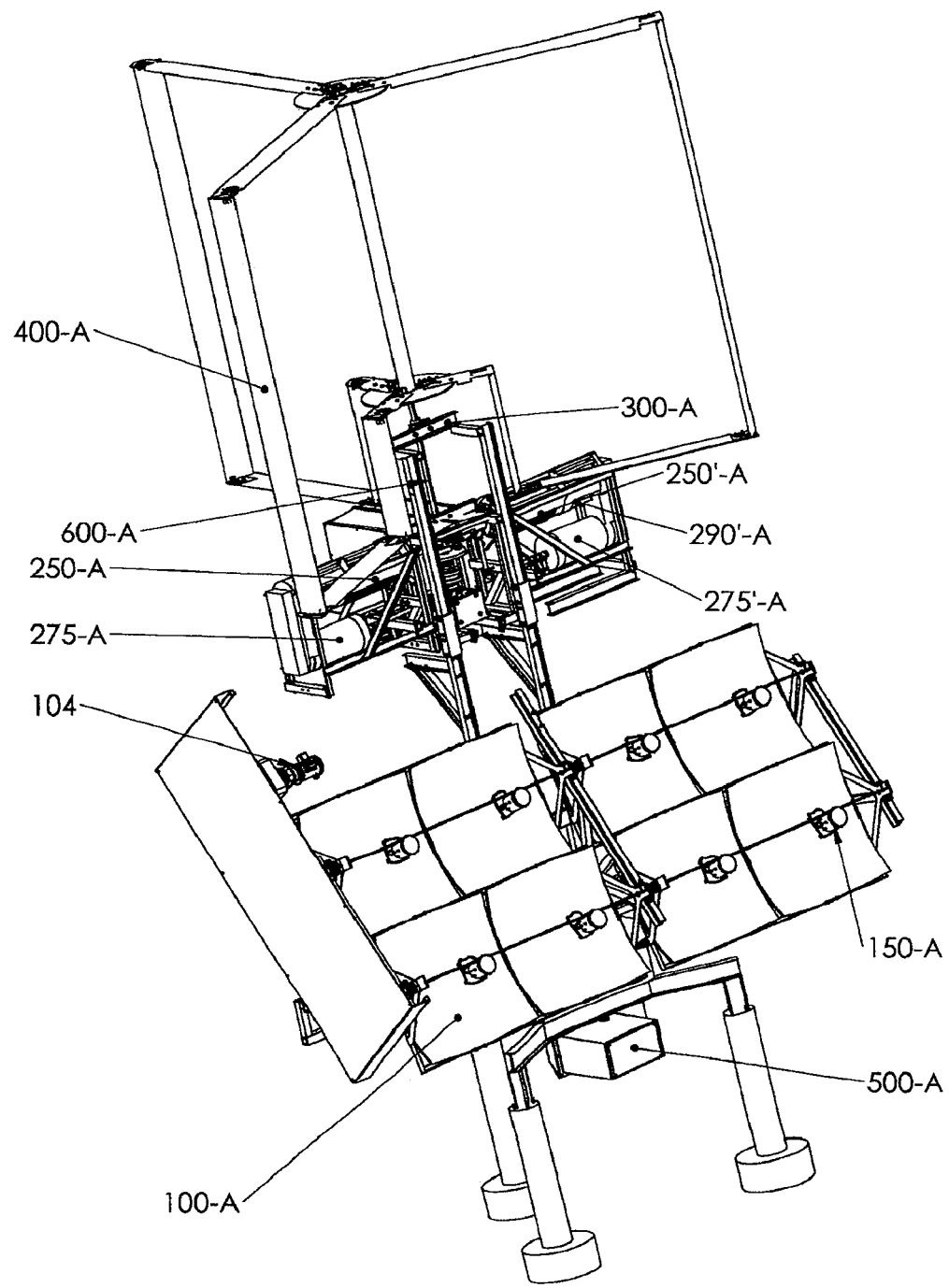
FIG. 21 is a perspective view of the preferred embodiment of the invention, but using square parabolic mirrors instead of circular ones.
Figure 22:
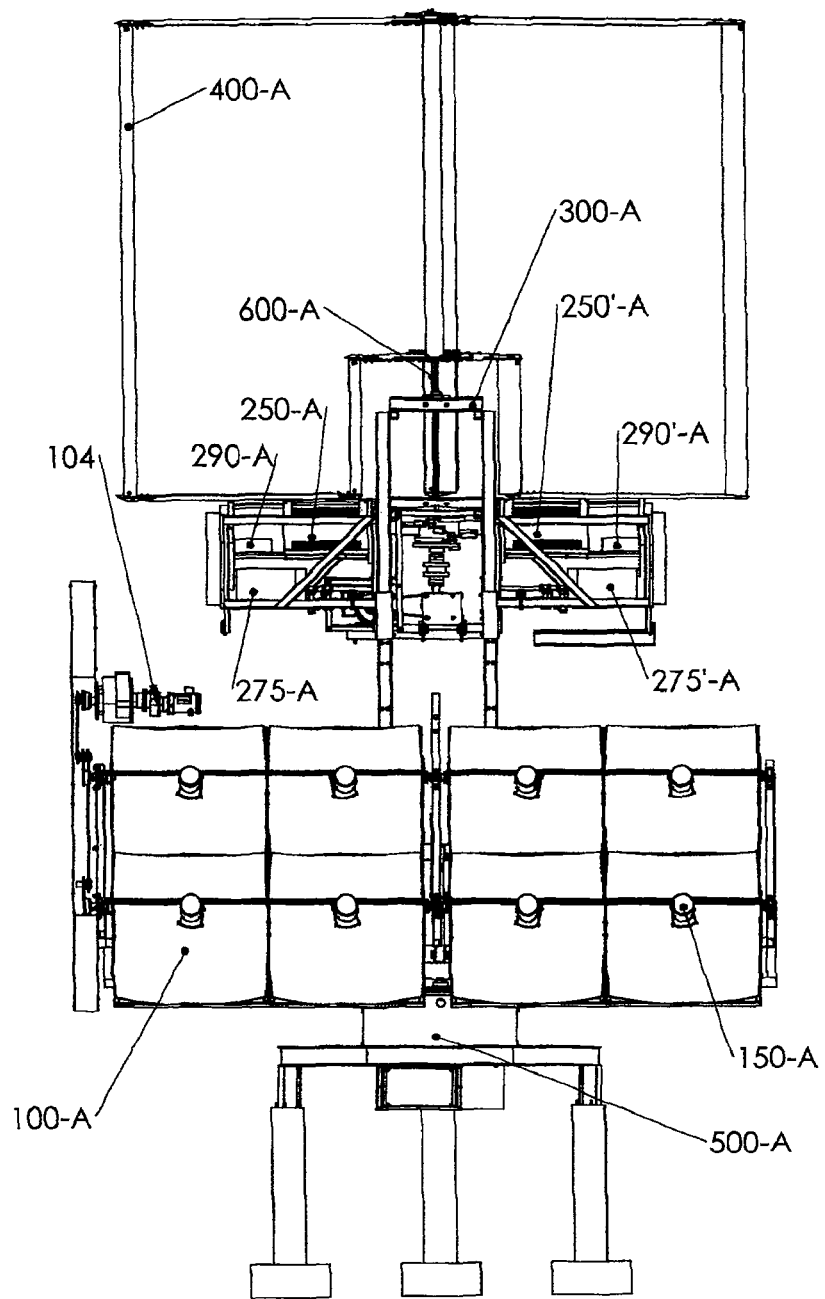
FIG. 22 is a front view corresponding to FIG. 21.
Figure 23:
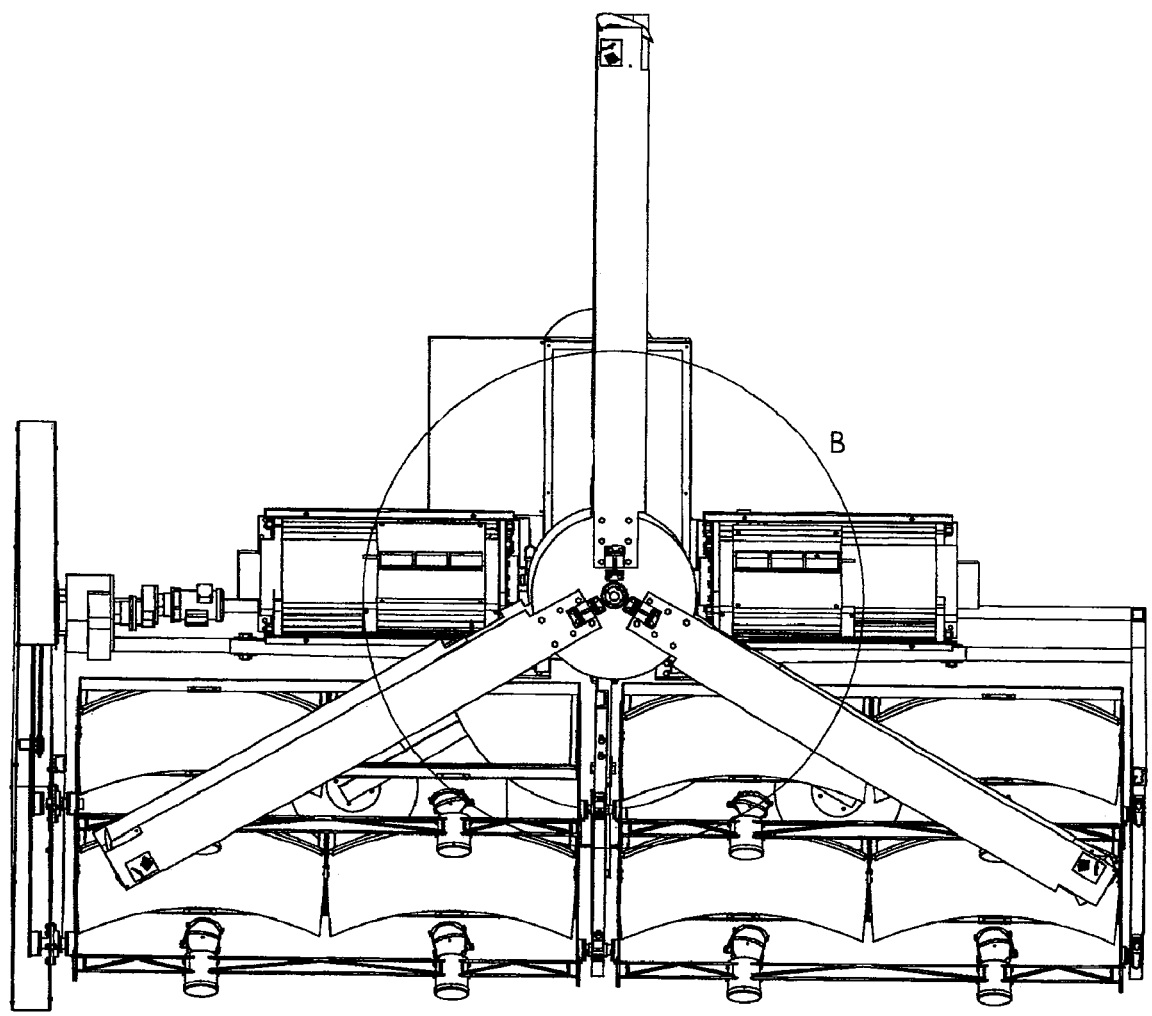
FIG. 23 is a top view corresponding to FIG. 21.
Figure 24A:
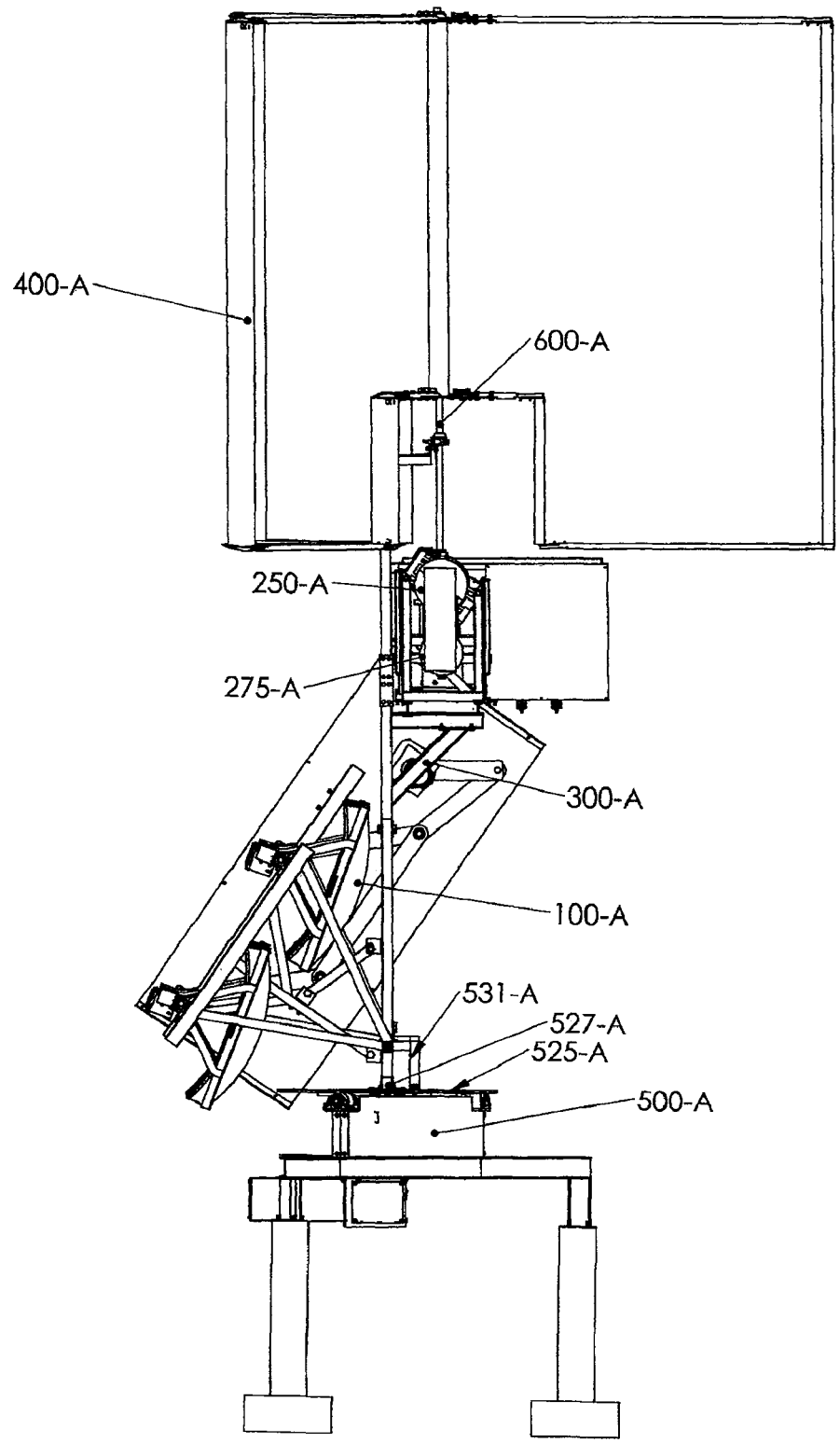
FIG. 24A is a side view corresponding to FIG. 21.
Figure 24C:
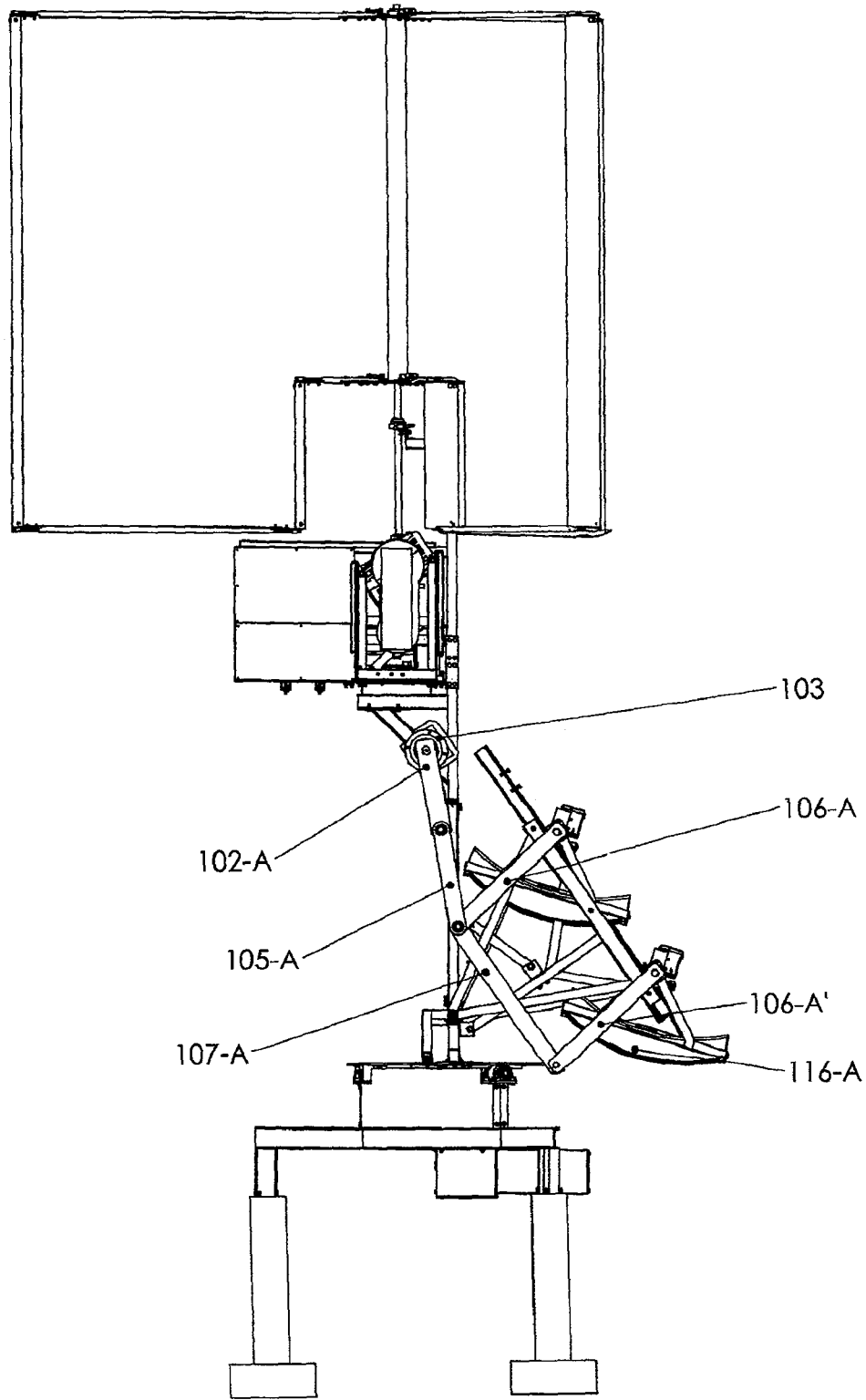
FIG. 24C is a side view corresponding to FIG. 24B, but with the parabolic mirrors in a high angle or mid-day position.

FIG. 19 and FIG. 20 communicate alternative embodiments using heat pipes that could be used in place of an hyperbolic mirror in transferring heat energy derived from the concentrated parabolic mirror 116 to the heat storage compartment 290A driving the hot piston 251 of the heat engine 250. Heat pipes are a phase change device which starts with a liquidus material, which when heated converts to a gaseous material. Extremely high levels of heat transfer rates are possible with heat pipes 181A, 182A, possibly as high as or higher than 200,000 Watts per meter Kelvin (W/Mk). This compares to the heat transfer capability of metallic elements such as copper which is reputed to have the highest level of heat transfer but is limited to 400 W/Mk heat transfer rates. Heat pipes work best in an environment where heat needs to travel to a higher elevation, and the liquidus arising during cooling, can travel by gravity down to the lower position. These environmental conditions are present in the current invention general design concepts.

FIG. 19 identifies an array of heat pipes 181A, 182A that are initiated at the focal point of the parabolic mirrors 116 (see FIG. 4) and end at the heat engine storage compartment 290A. The heat pipes 181A, 182A collect heat at a lower elevation, and transport it to the heat engine storage compartment which is elevated relative to the parabolic mirrors 116. The heat pipes 181A, 182A are encased in a circumferential layer of insulation 181B,182B, to minimize heat transfer losses. The heat engine storage compartment 250A is supported by a structural cage design 277A which would mount to the main maintenance floor panel. The heat engine storage compartment 250A would provide the source of heat required to heat the hot piston gases which would be positioned in its centre piston 291A.

FIG. 20 identifies a heat pipe attachment support structure for mounting the heat pipe 181A to the parabolic mirror rigid frame assembly 119 (see FIG. 4). In this figure, the heat pipe 181A is exposed and is positioned in the region where the parabolic mirror 116 focal point is situated. Insulation 181B surrounds the heat pipe so as to minimize heat transfer losses. A special structural frame 151A is used in order to brace the heat pipe 181A and insulation 181B. Four flexible braces 156A, 156A', 156A" and 156A'" are wrapped around the circumference of the insulation 181B and supports it rigidly against the structural frame 151A. The base of the structural frame 151A has an attachment device 152A, 153A which mounts directly to the parabolic mirror rigid support frame 119.

Referring to FIGS. 21 to 24C, an alternative hybrid system is described that consists of a solar collection array with altitude axis control 100-A, that is supported structurally by a main mast and frame assembly 300-A. Concentrated solar energy is re-directed to the heat engine solar targeting zone 290-A,290'-A which acts as a heat source for the heat engine 250-A; in this embodiment there is no main maintenance platform observed in the design. The efficiency of heat engine 250-A, 250'-A is significantly increased through the incorporation of a regenerator assembly 275-A, 275'-A which is identical in design to FIG. 11A to 11E details. The main mast and frame assembly 300-A, also provides superstructure support for the windmill arm and blade assembly 400-A, and eliminates the need for guide wire support. Windmill arm and blade assembly 400-A rotation is facilitated through the main vertical driveshaft 600-A. Structural moment and axial support of the main mast and frame assembly 300-A is facilitated by the rotator baseplate 525-A, moment connection plates 527-A as well as a new torsional beam connection element 531-A. Vertical axis or azimuth control for the entire assembly is provided by the base rotator assembly 500-A which supports the rotator baseplate 525-A.

Beta-Type Dual Heat Engine Design 250-A,250'-A

Figure 25A:
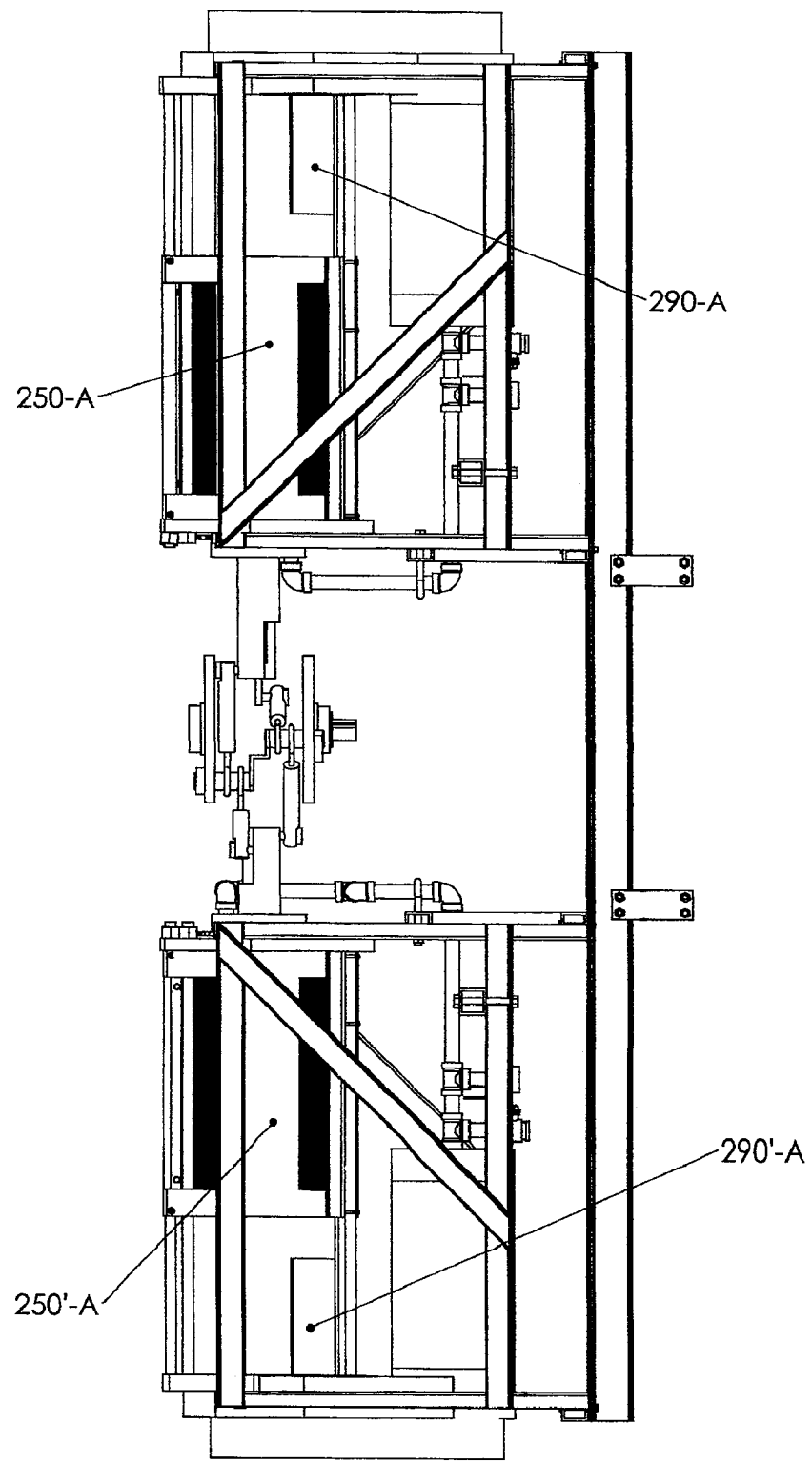
FIG. 25A is a front view of an alternative beta-type dual Stirling engine and a central rotator mechanism for the conversion of linear motion into rotary motion for direct engagement with the vertical axis wind turbine and speed increaser interface.
Figure 25B:
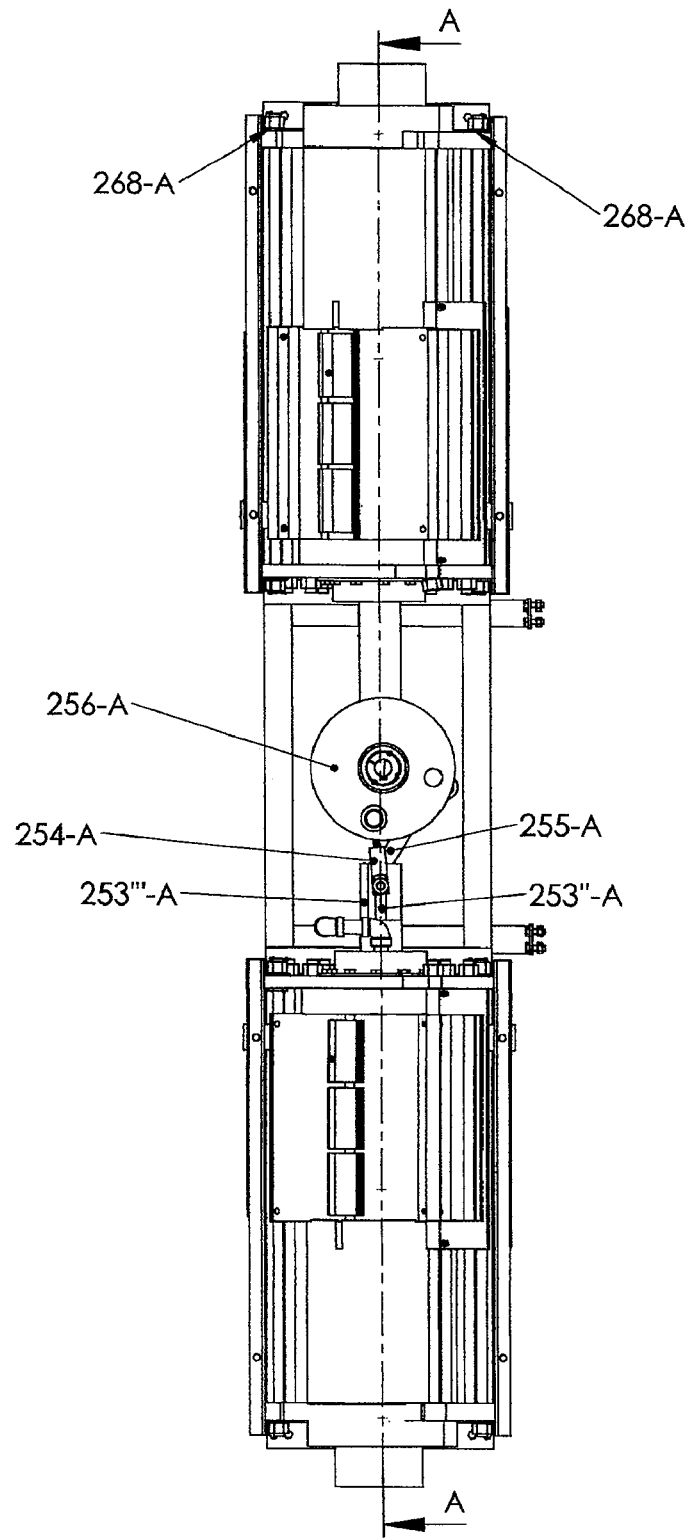
FIG. 25B is a corresponding top view.

FIG. 25A to 25C indicates a top and sectional view of the beta-style dual heat engine design being used in the alternative hybrid system, each engine comprising a hot piston and a cold piston all housed within a common core, with a separate connection loop that includes the heat engine's regenerator assembly.

In FIG. 25A we describe an alternative heat engine construction which is considerably more compact, and economical in design than the alpha-style heat engine described in FIGS. 9, 10, 11 and 13. In this design both the hot piston core 298-A, 298'-A and the cold piston core 297-A,297'-A reside within one of two piston cylinders 251-A, 251'-A respectively; in contrast, the alpha-style heat engine design had four piston cylinders—251,251'251", and 251'".

In FIG. 25A to 25C, the linear motion of the beta-style dual heat engine 250-A, 250'-A is described in the following manner. Starting with the cold piston rod 253'-A, 253'"-A, it passes through a gland 267-A, 267'-A that is supported by the cold piston front plate 269-A, 269'-A. A series of 8 tension rods, 268 provide a compressive load on the combined cold piston front plate 269-A,269'-A and the hot piston back plate 272-A,272'-A, ensuring a pressurized seal is maintained. The piston rod 253'-A, 253"-A then connects to the cold piston 297-A, 297'-A. A tightly packed aluminum folded fin heat sink 271-A,271'-A is linearly positioned on either side of the cold piston core, and is metallurgically bonded to the cold piston 251-A, 251'-A. These folded fin elements 271-A,271'-A act, in combination with windmill assisted airflow to actively cool the cold piston and increase the observed temperature gradient between the hot piston 298-A,298'-A and the mating cold piston 297-A,297'-A, thereby improving the operational efficiency and performance of the heat engine. The cold piston 297-A, 297'-A pushes the cold air into the uninsulated return pipe 252-A, 252'-A respectively. This return pipe passes by a valve 260 used for pressurizing the regenerator and heat engine assembly with helium gas. Adjacent to the valve 260 is a pressure gauge 259. Adjacent to the pressure gage 259 is the regenerator assembly 275-A, 275-A' with construction as described in FIG. 11. As the cold gas passes through the regenerator it is heated up. It then passes through an insulated hot pipe 261-A which returns the hot gases into the hot piston core 298-A,298'-A, expanding the hot chamber. These gases are heated by the solar energy being directionally concentrated onto the hot cylinder, and expands until it reaches its peak expansion point. The hot piston core is connected to a hot piston connecting rod 253-A,253"-A which has a clearance fit with the cold piston rod 253'-A, 253'''-A, enabling the hot piston rod 253-A,253"-A to operate with a motion which is independent of the cold piston rod. When the hot piston core 298-A, 298'-A reaches its peak expansion point, it reverses direction forcing the gases to follow a reverse cycle back towards the cold piston core 297-A,297'-A.

FIG. 25A to 25C does not indicate the presence of a heat storage compartment assembly 290 as is noted in Detail A of FIG. 10 and describe by FIGS. 12A to 12D of the initial design. The thermal storage device is viewed to be optional equipment in the design, and is not likely to be present on smaller energy based designs.

FIGS. 26A to 26D show an alternative embodiment of the hyperbolic mirror and optical shaft sub assembly with a function similar to what is described in FIG. 7 and FIGS. 8A and 8B. This embodiment differs in several ways.

The optical equipment cover 159-A has been designed in a more compact, and simple to manufacture manner in an attempt to minimize the shadow effect of the cover on the mating square parabolic mirror 100-A, and to lower manufacture costs.

The optical main shaft 151-A and 152-A has been reconfigured from a single shaft design to a dual shaft support design with greater level of structural rigidity both in flexural bending and torsional torque transfer. This more structural design has been accomplished without any increase in shadow effect on the parabolic mirror. The axis of rotation of the optical main shaft 151-A and 152-A has also been moved forward away from the centre of the optical equipment cover 159-A towards its outer perimeter. This is in an effort to reposition the axis of rotation nearer to the centroid of the hyperbolic mirror 180-A.

The shape of the hyperbolic mirror elements 180-A has also been redesigned to facilitate new heat engine solar targeting points on the hot piston 250-A, 250'-A. The hyperbolic mirror elements 180-A have also been redesigned so that the mirrors primarily rotate outside of the optical equipment cover, 159-A, so as to minimize any boundary constraints imposed by the new smaller optical equipment cover 159-A design. The hyperbolic mirror elements 180-A have been trimmed in size, so that the only portion of the mirror present in the design is required for the mirrored reflection of solar rays emanating from its mating square parabolic mirror 100-A.

Figure 26A:
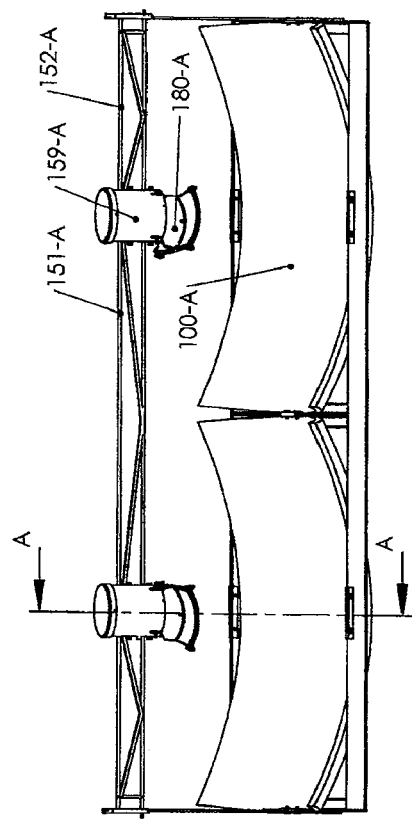
FIG. 26A is a front view of an alternative main optical shaft subassembly which controls the motion of the hyperbolic mirror assembly and its individually paired square parabolic mirror subassembly, showing the mirrors at their mid-day position.
Figure 26B:
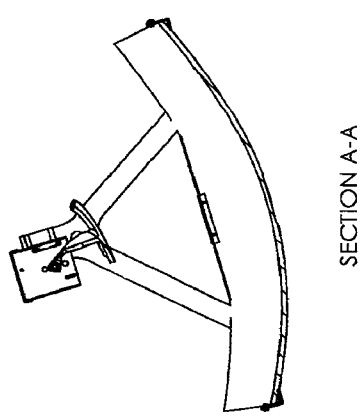
FIG. 26B is a cross-section at A-A of FIG. 26A.
Figure 26C:
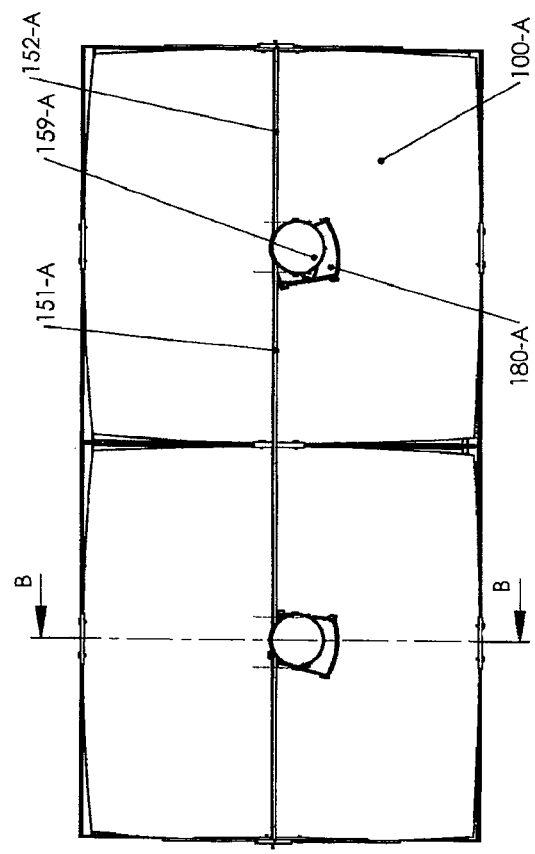
FIG. 26C a front view similar to FIG. 26A, but with the mirrors at their dawn and dusk positions.
Figure 26D:
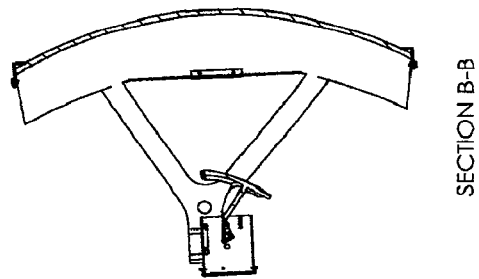
FIG. 26D is a cross-section at B-B of FIG. 26C.

FIGS. 26A and 26B show the rotational extents of this design which facilitates parabolic mirror rotation from a mid-day sun altitude position of 17 degrees above horizontal. FIGS. 26C and 26D reflect the rotational extents of the alternative design from a dawn or dusk sun altitude position of 93 degrees. In this design a total altitude rotation of 76 degrees is achieved with the parabolic mirror 100-A, and a counter-rotating extent of 38 degrees for the optical shaft sub-assembly 150-A, reflecting peak solar sun positions at latitudes above 40 degrees north. The above 90-degree dawn or dusk position, prohibits the buildup of snow or rain in the parabolic mirror in evening overnight conditions, thereby minimizing detrimental operating conditions which might arise especially in wintry climates due to snow accumulation conditions.

Figure 27:
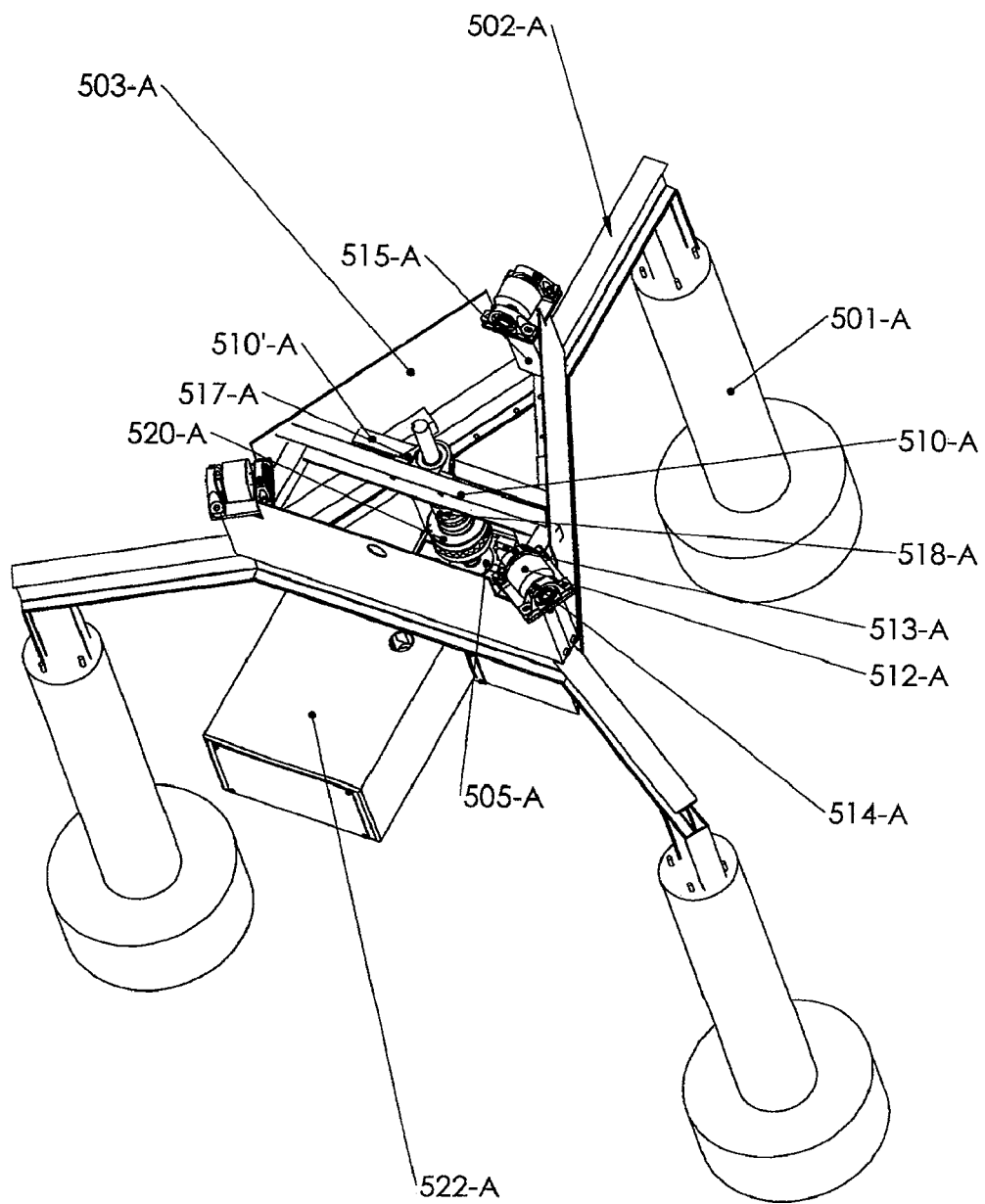
FIG. 27 is a perspective view of the alternative base rotator substructure assembly with covering baseplate and driveshaft removed.

FIG. 27 describes the alternative base rotator assembly 500-A with the rotator baseplate assembly 525-A removed. This substructure houses the azimuth axis rotating equipment, and dual axis solar control equipment.

Affixed to three concrete footings and column structures 501-A is a triangular shaped structural frame 502-A which provides general structural support for the complete alternative structure. Affixed to the structural frame are base wall sections 503-A which completely surround the enclosed equipment. At the three internal triangular vertices of the general support structure 502-A, three structural columns 515-A are positioned. Seated on top of each of the three structural columns 515-A, is a baseplate and a fixed pillowblock roller bearing 513-A and a floating pillowblock roller bearing 514-A. Between the two bearings resides a trunnion wheel 512-A mounted on a shaft running between the two pillowblock roller bearings 513-A,514-A. Each of the three trunnion wheels 512-A are oriented such that they can rotate tangentially in the direction of motion of the central vertical shaft 504-A. These three trunnion wheels provide the structural support for the dead weight of the entire structure and of the rotator baseplate assembly 525-A (as observed in FIGS. 21 to 24C).

A geared speed reducer and motor 505-A is mounted in the base of the internal compartment of the base rotator assembly 500-A. Affixed to the output shaft of the geared speed reducer and motor 505-A is a spacer coupling 520-A which connects directly to the central vertical shaft 504-A which provides azimuth rotational capability to the design. The central vertical shaft 504-A is supported by an upper floating pillowblock roller bearing 517-A and lower fixed pillowblock roller bearing 518-A. The upper floating pillowblock roller bearing 517-A is supported by a structural support beam 510-A which is connected to two of the three structural columns 515-A. The lower fixed pillowblock roller bearing is supported by a second structural support beam 510'-A which is connected also to two of the three structural columns 515-A. The two inner pillowblock roller bearings 517-A,518-A are responsible for the support of the vertical shaft, the support of the shaft's weight, and for the resistance of the structural moment associated primarily with the levered dead weight of the array of solar collectors, and any wind loads or snow loads associated with environmental operating conditions. The pillowblock roller bearings 517-A, 518-A are oriented in a manner which ensures that the primary radial loads are resisted by the base or side bodies of the pillowblock roller bearings 517-A, 518-A.

A separately framed control cabinet 522-A is positioned at the front of the base rotator assembly 500-A. This control cabinet 522-A houses the motor portion of the geared speed reducer and motor 505-A, all electrical wiring emanating from the altitude control gear motor 104, and from the Induction generator 205-A. This control cabinet 522-A also houses the PLC control equipment that controls the motion of the dual axis rotating invention.

Figure 28A:
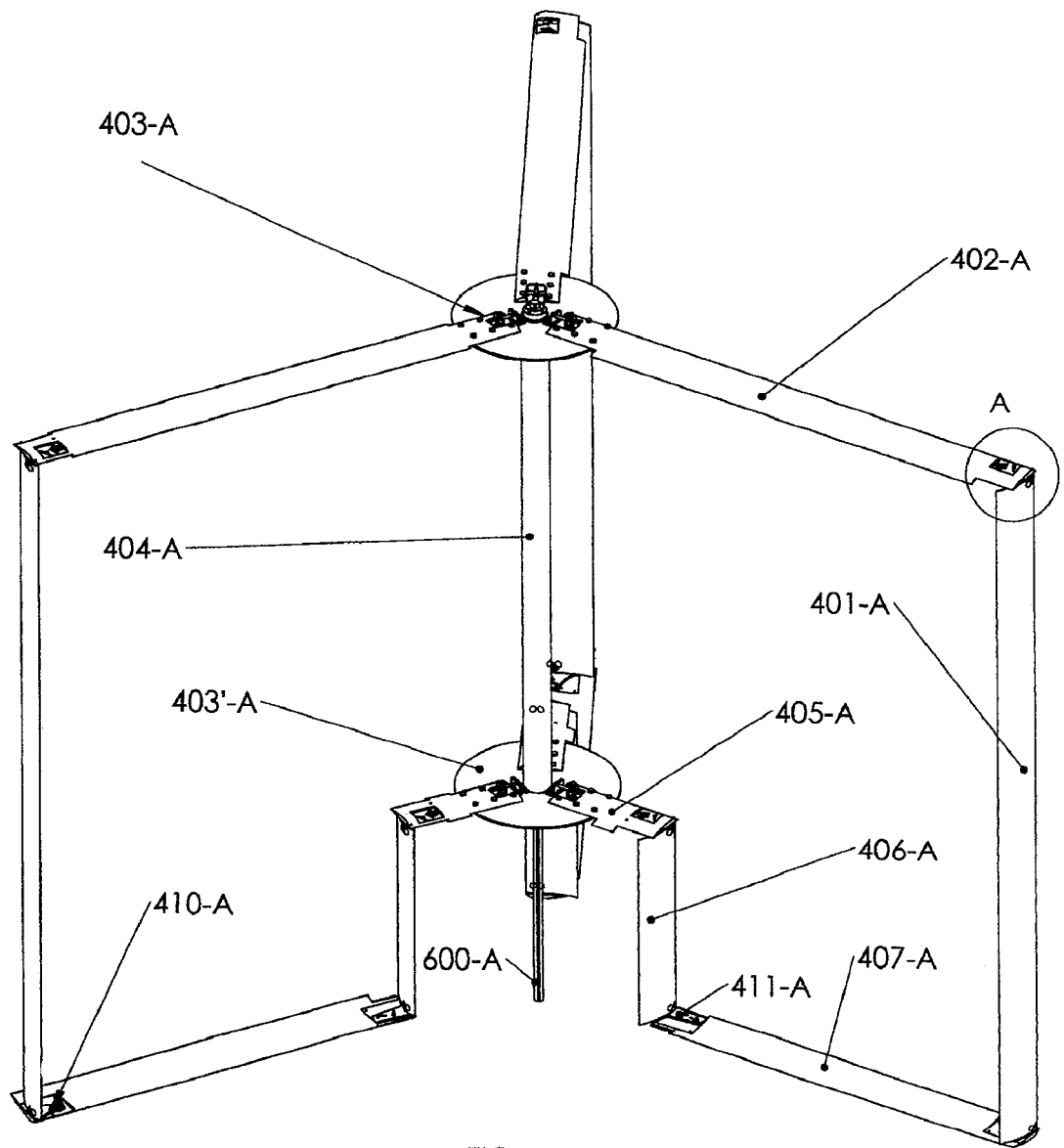
FIG. 28A is a perspective view of an alternative windmill arm and blade assembly with three blades and an airfoil beam design.
Figure 28B:
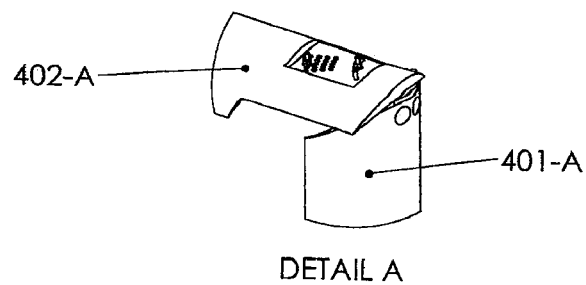
FIG. 28B is a detailed view of area A of FIG. 28A.

FIGS. 28A and 28B describe a three-blade windmill arm and blade assembly 400-A used in the alternative design.

There are two windmill arm support plate assemblies 403-A, 403'-A. The top windmill arm support assembly 403-A rigidly supports 3 upper windmill arm beams 402-A, and also facilitates static and dynamic balancing adjustments of the complete windmill arm and blade assembly 400-A. The upper windmill arm beam 402-A in turn supports a blade inner support assembly 410-A which has blade pitch angle feature adjustments incorporated in to the design. The blade inner support assembly 410-A in turn is fastened to the windmill blades 401-A at the top.

In between the two windmill arm support plate assemblies 403-A, 403'-A resides a windmill support tube 404-A which provides some rigidity and support for the complete assembly. The two windmill arm support plate assemblies 403-A, 403'-A have a concentric keyed interface with the keyed driveshaft 600-A that resides within the windmill support tube 404-A. The keyed driveshaft 600-A is structurally supported by a fixed and floating pillowblock bearing structure residing within the main mast and frame assembly 300-A.

The bottom windmill arm support plate assembly 403'-A rigidly supports three lower windmill arm beams 405-A. The windmill arm support plate assembly 403'-A also facilitates static and dynamic balancing adjustments as is the case with the upper assembly. The lower windmill arm beam 405-A in turn supports a blade inner support assembly 410-A which also has blade pitch angle feature adjustments. The blade inner support assembly 410-A in turn is fastened to the inner windmill blade 406-A.

At the base of the windmill blades, the inner windmill blade 406-A is rigidly connected to the blade inner support assembly 411-A. This blade inner support assembly 411-A is connected to the lower windmill arm beam 407-A which also has an outer perimeter connection to the blade support assembly 410-A. The blade support assembly 410-A is in turn fastened to the windmill blade 401-A at the bottom.

The base of driveshaft 600-A has a keyed connection with the top rotator wheel 256-A (See FIG. 29B), transferring generated torque from the windmill arm and blade assembly 400-A to this top rotator wheel 256-A.

The mechanical design of this alternative windmill arm and blade assembly offers several design benefits in addition to those already noted above.

The three double blade design facilitates an inner support infrastructure design such as the dual roller bearing support of the main mast and frame assembly 300-A, thereby eliminating the need for guide wires in the design.

The upper windmill support beam 403-A and the lower windmill support beam 407-A have adapted a blade profile design as well, thereby improving the power coefficient of the overall windmill arm and blade assembly 400-A enhancing its performance.

The lower windmill support beam 407-A works in concert with the folded fin elements 271-A,271'-A in the dual heat engine design 250-A,250'-A, providing windmill assisted airflow to actively cool the cold piston and increase the observed temperature gradient between the hot piston 298-A,298'-A and the mating cold piston 297-A,297'-A, thereby improving the operational efficiency and performance of the heat engine design 250-A,250'-A.

Figure 29A:
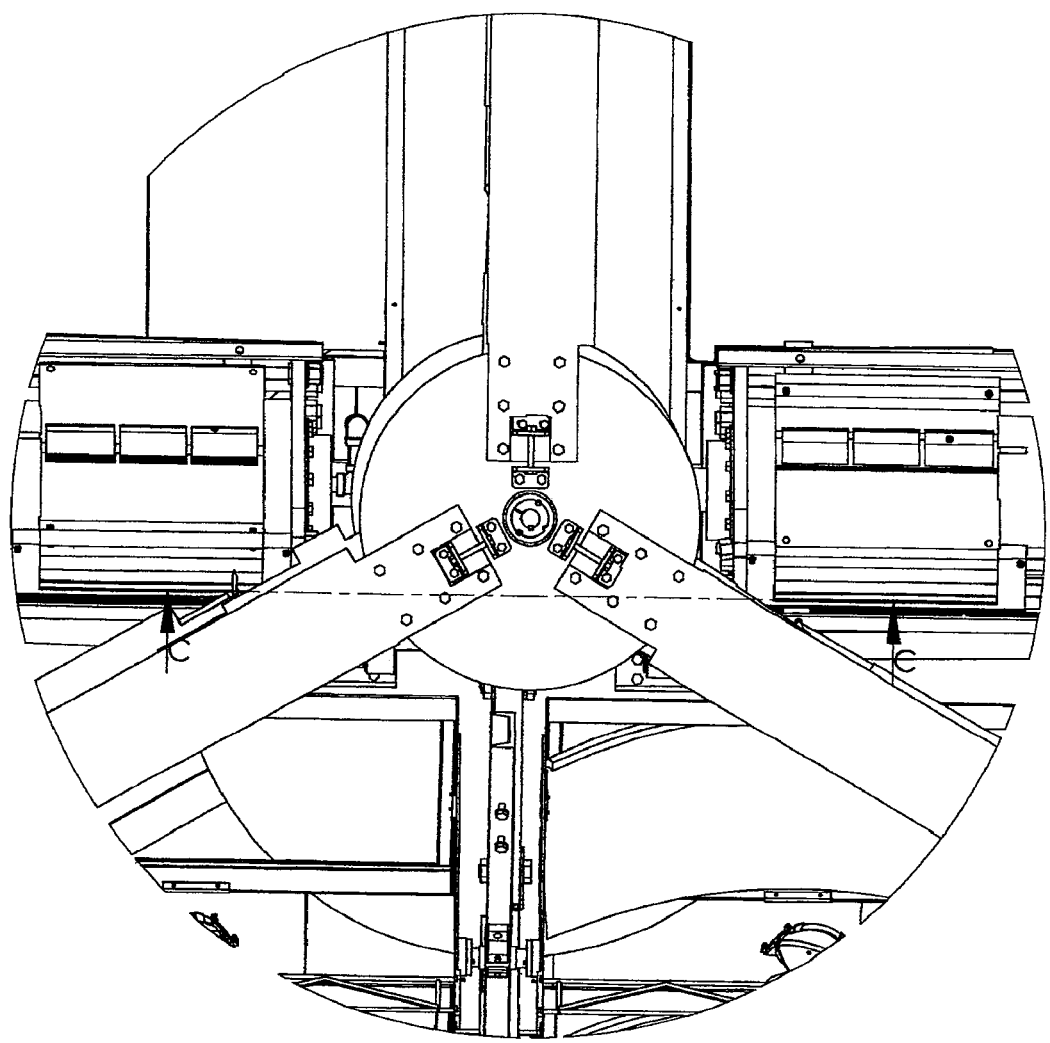
FIG. 29A is a detailed view of area B of FIG. 23.
Figure 29B:
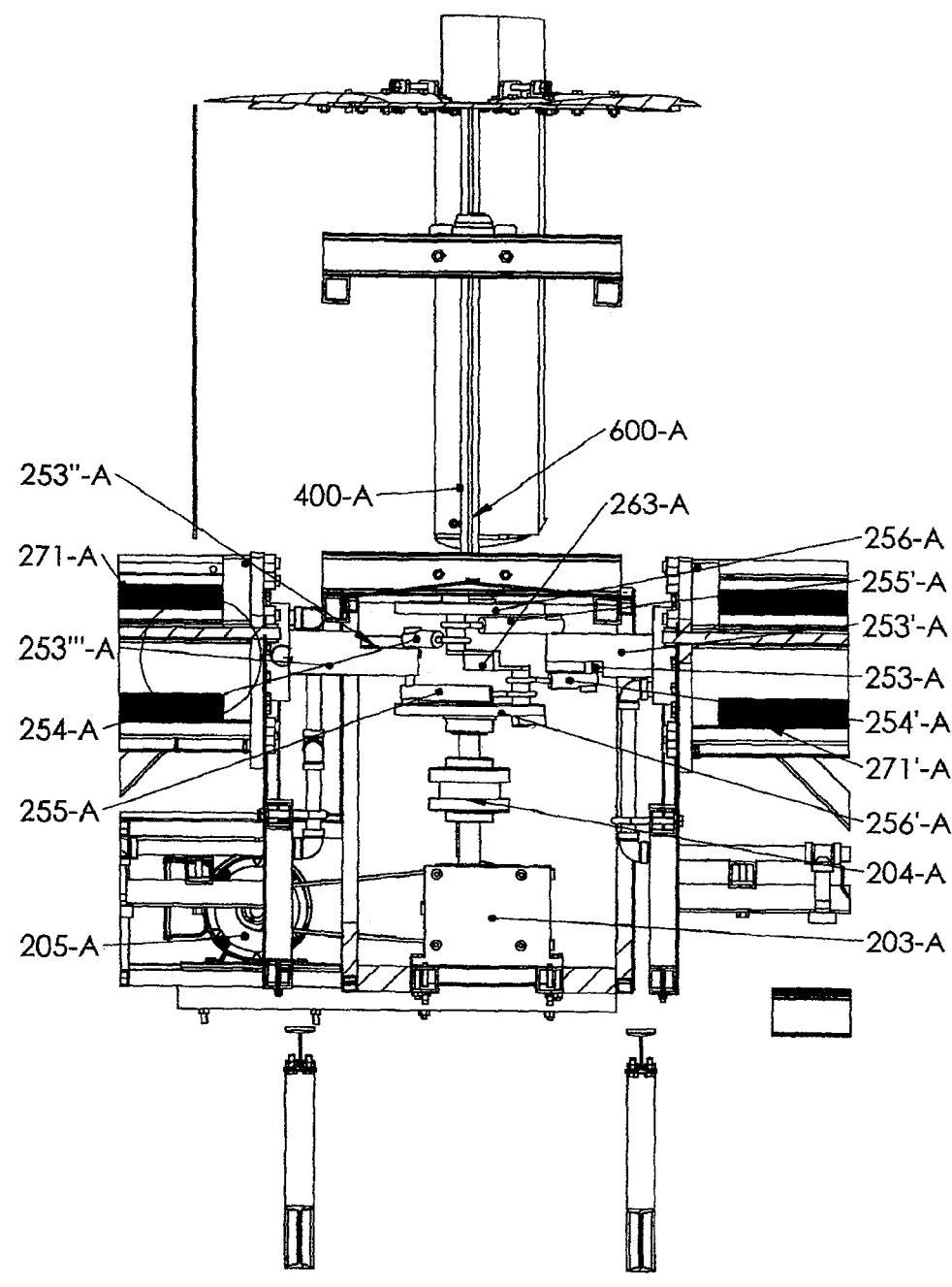
FIG. 29B is a cross-section at C-C of FIG. 29A, showing an alternative central rotator mechanism for the conversion of linear motion into rotary motion, for direct engagement with the vertical axis wind turbine and speed increaser which converts rotation speeds above the synchronous speed of the induction generator.
Figure 29C:
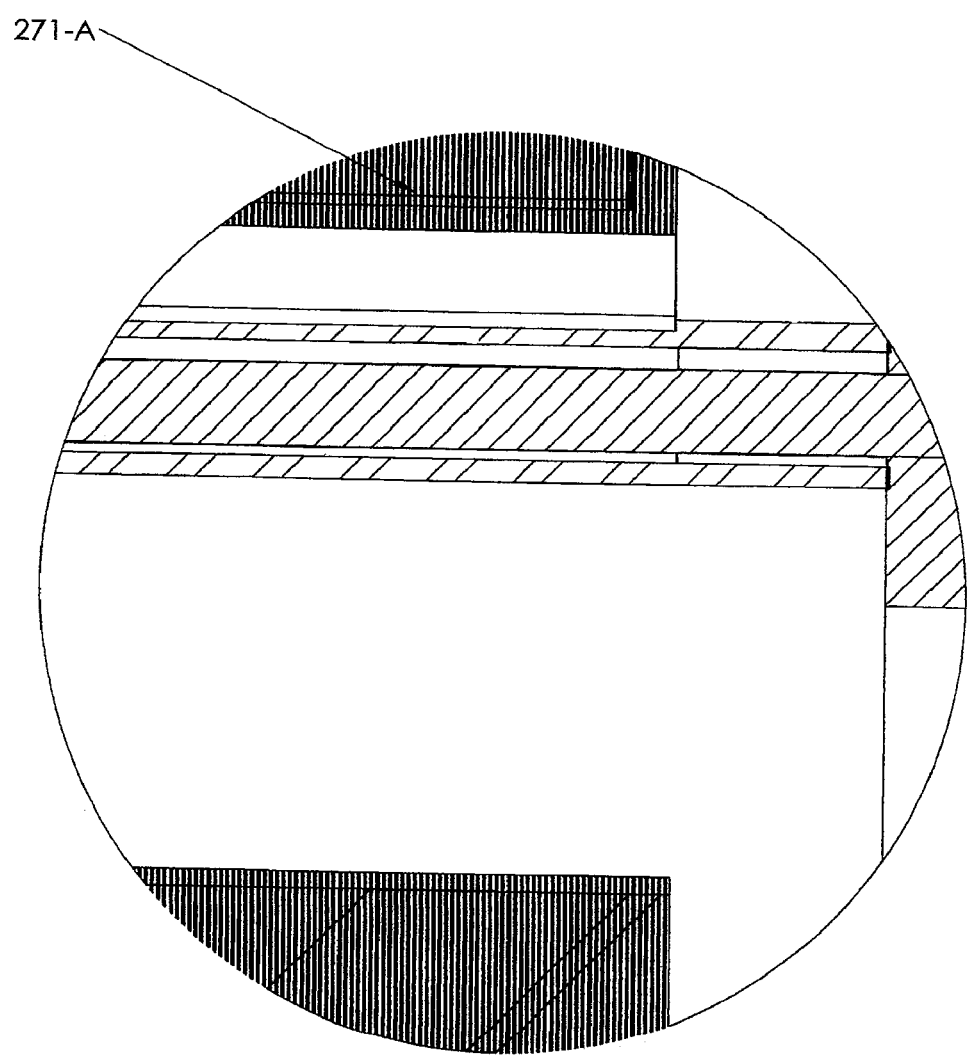
FIG. 29C is a detail of the circled area in FIG. 29B.

FIGS. 29A and 29B provides a more comprehensive sectional view of the alternative rotator assembly and how it is coupled to the vertical axis wind turbine and to the speed increaser driving the solar-wind generator. FIG. 29C is a close-up view of the circled area in FIG. 29B, showing the multitude of folded heat exchange fin elements.

In FIG. 29B, the rotator assembly is described, which has the function of translating the linear motions of the beta style dual heat engine 250-A,250'-A into rotary motion with identical characteristics to the rotary motion observed by the main power transmission driveshaft 600-A, and the vertical axis wind turbine 400-A that it is connected to.

Connected to the wind turbine driveshaft 600-A is the top rotator wheel 256-A. Interfacing with the top rotator wheel is a specially designed heat engine rotator pin 263-A which has the quality of having a top mounted pin, which is radially offset from the bottom mounted pin by a fixed angular difference, and with an intermediary connecting plate, specially designed to ensure no interference conditions arise during a normal 360-degree rotation of the vertical axis wind turbine 400-A. Rotator cylinder linkage 254-A and rotator cylinder linkage 255'-A are connected in a clearance fit manner to the top mounted pin of the heat engine rotator pin 263-A. Rotator cylinder linkage 254'-A and rotator cylinder linkage 255-A are connected in a clearance fit manner to the bottom mounted pin of the heat engine rotator pin 263-A.

The individual rotator assembly connections are described as follows:

For the top mounted pin of heat engine rotator pin 263-A: Rotator cylinder linkage 254-A is pin connected to the left side hot piston connecting rod 253"-A, thereby allowing the rotator cylinder 254-A to rotate freely relative to the linearly fixed cold piston connecting rod 253'''-A. Rotator cylinder linkage 255'-A is pin connected to the right side cold piston connecting rod 253'-A in a manner that allows rotator cylinder linkage 255'-A to rotate freely relative to the linearly fixed cold piston connecting rod 253'-A.

For the bottom mounted pin of heat engine rotator pin 263-A: Rotator cylinder linkage 255-A is pin connected to the left side cold piston connecting rod 253"-A, thereby allowing the rotator cylinder 255-A to rotate freely relative to the linearly fixed cold piston connecting rod 253'''-A. Rotator cylinder linkage 254'-A is pin connected to the right side hot piston connecting rod 253-A in a manner that allows rotator cylinder linkage 254'-A to rotate freely relative to the linearly fixed hot piston connecting rod 253-A.

The bottom mounted pin of the heat engine rotator pin 263-A is then connected to the bottom rotator wheel and shaft Subassembly 256'-A.

An appropriately torque sized coupling 204-A connects the bottom rotator wheel and shaft subassembly 256'-A to the appropriately sized gearing speed increaser 203-A. A synchronous belt drive then connects speed increaser 203-A to the induction generator 205-A. An appropriately sized holding brake 206-A is mounted on the input side of the induction generator 205-A, in order to facilitate windmill stoppage conditions in excessively high wind speed environments.

Systemic Control of the Invention

While it is desirable that the windmill be self-starting in design, this is not an essential aspect of the invention. Similarly, the heat engine does not necessarily contain any speed control elements. In the versions of the invention described here, the windmill and the heat engine do not move independently, i.e. they operate in concert with each other.

A preferred form of systemic control, although not necessarily the most economical, is through the use of a regenerative drive to control the induction generator. Regenerative drives are equipped with an active supply unit, capable of signal conditioning of the output electricity. The regenerative drive allows full power flow both in motoring and generative modes, and is available as a solution at voltages ranging from 208V to 690V, 3 phase, and at module sizes as small as 5.5 kW. An example of such a commercially available product is the ACS800-11 ABB Industrial Regenerative Drive. The regenerative drive facilitates a variable speed windmill design. The merit of a variable speed windmill design is that the windmill operating speed can be adjusted to facilitate optimal tip speed ratios and operating efficiencies at varying wind speeds; wind speed could in fact be treated as an input factor in the control of the drive in such a situation. The drive also facilitates regenerative braking in high wind speed shut down situations, offering energy savings when compared with other braking methods such as mechanical braking.

A more cost effective form of systemic control that could be used in single phase applications, is through the use of a separate industrial drive controlled induction motor and clutch unit that could be used to initiate electricity generation in the induction generator. In this situation, the induction generator would be accelerated to a speed that exceeds the synchronous speed plus slip of the motor. In the case of the typical four pole induction generator, such a speed would likely be above 1,850 rpm. While a typical induction motor operating across the line at 60 Hz would operate at its synchronous speed less the slip speed of the motor, or approximately 1750 rpm, the standard industrial drive controlling it could operate at a frequency of 64 Hz, and provide the speed necessary to initiate electricity generation. The motor and clutch unit could then be appropriately programmed to activate and engage when the speed had reached a minimum point of operation. In such a control situation, the windmill would operate as a fixed speed design, offering perhaps a lower overall operating windmill efficiency level.

Photovoltaic Solution

Referring to FIGS. 30 to 33C, a second alternative hybrid system is described that consists of a solar collection array with altitude axis control 100-B, that is supported structurally by a main mast and frame assembly 300-A. In this embodiment photovoltaic solar energy is generated by two individual rows of five photovoltaic panels 100-B, and the DC electricity generated is redirected to a DC to AC solar string inverter 590-B for conversion to AC electricity. The main mast and frame assembly 300-A, continues to provide superstructure support for the windmill arm and blade assembly 400-A and solar collection array 100-B, and eliminates the need for guide wire support. Windmill arm and blade assembly 400-A rotates on the main vertical driveshaft 600-A. Structural moment and axial support of the main mast and frame assembly 300-A is via the rotator baseplate 525-A, moment connection plates 527-A as well as a new torsional beam connection element 531-A. Vertical axis or azimuth control for the entire assembly is provided by the base rotator assembly 500-A which supports the rotator baseplate 525-A. This second alternative design shares many of the design elements of the first alternative design, and altitude axis control of the individual rows of photovoltaic panels is handled in a similar manner. There is no need for a heat engine 250-A, 250'-A in this design so these design elements have been removed.

Figure 30:
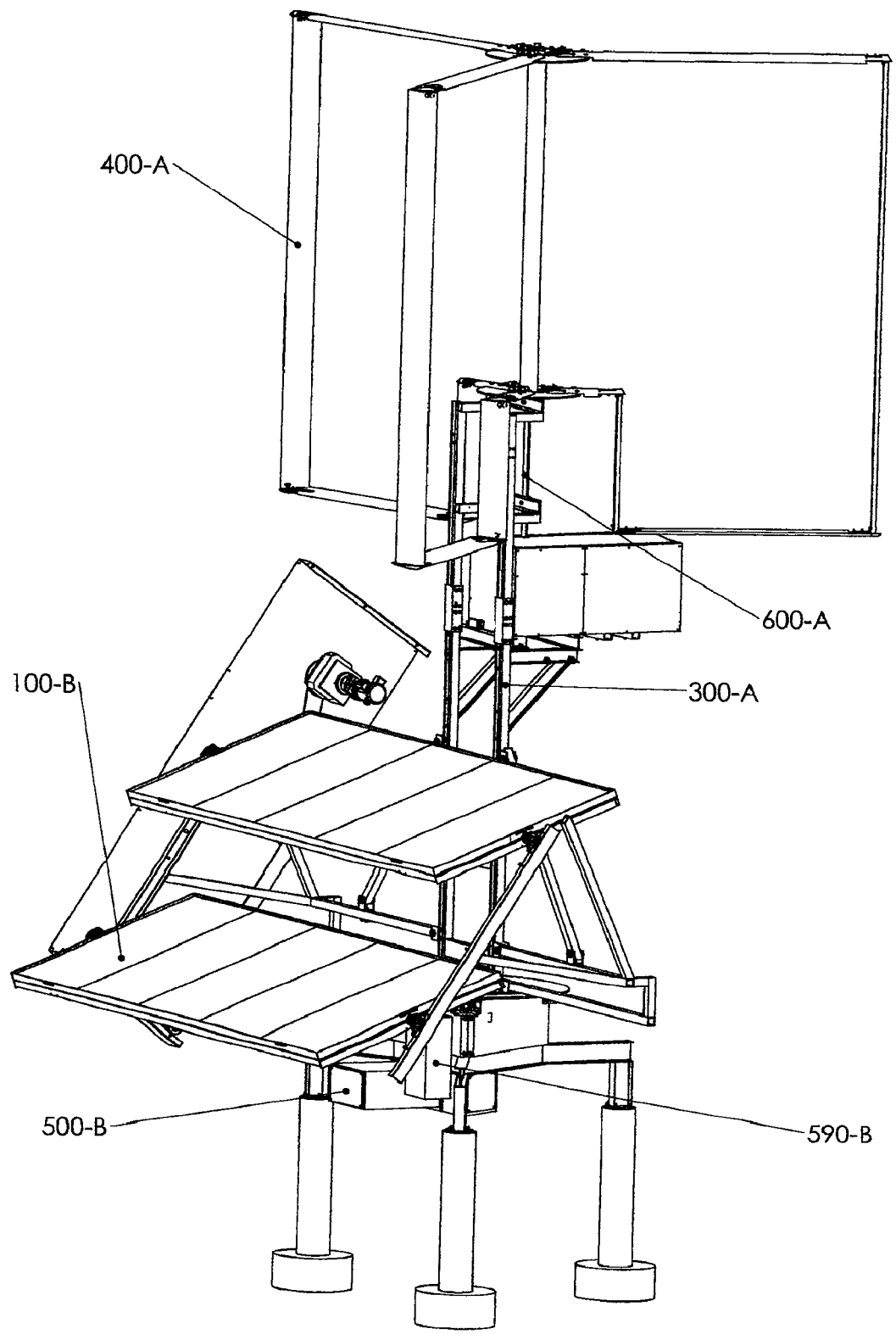
FIG. 30 is a perspective view of a variation of the invention, using a photovoltaic solar delivery system, and overhead vertical axis wind turbine combined energy delivery solution.
Figure 31:
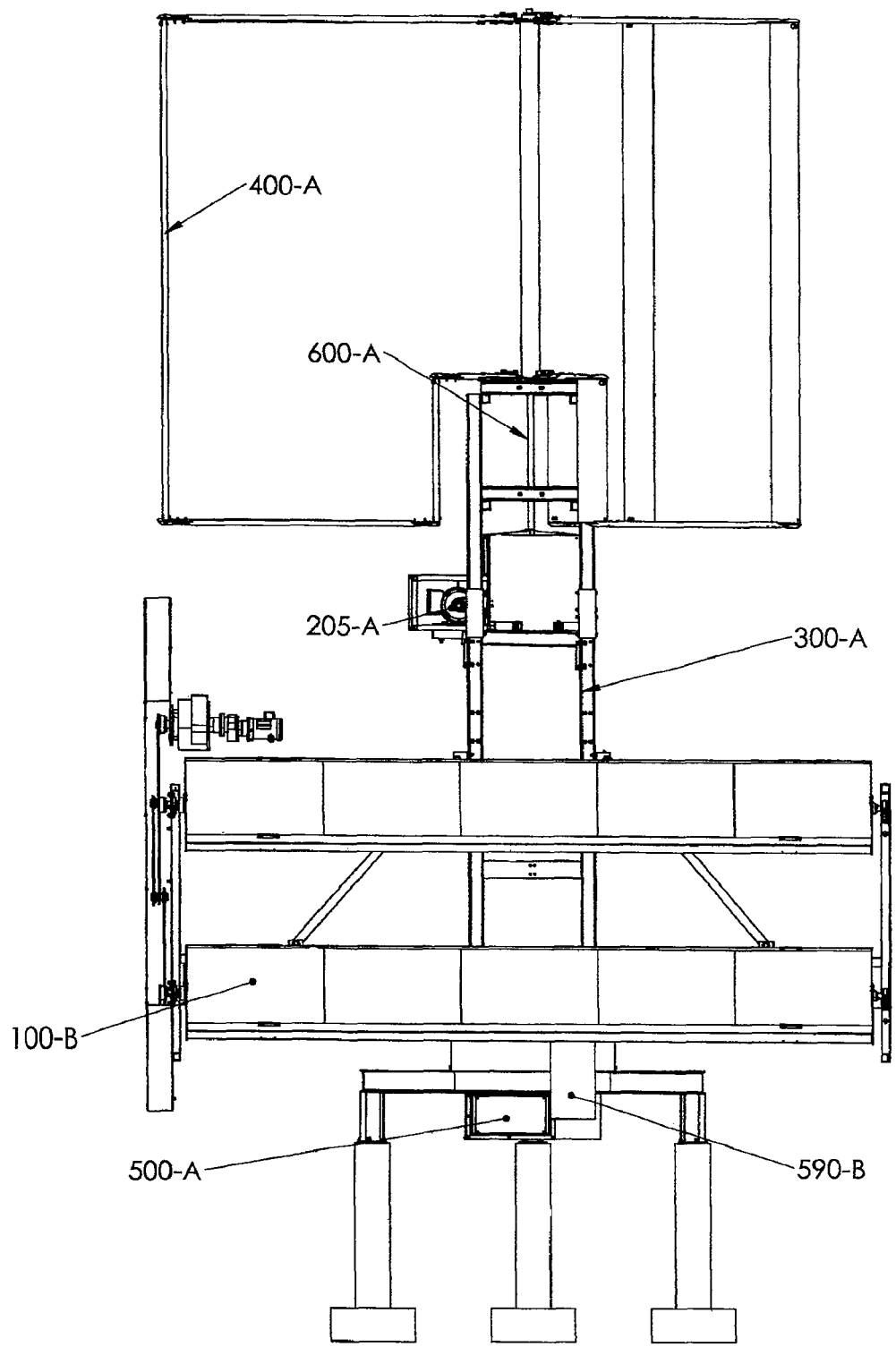
FIG. 31 is a front view of the FIG. 30 variation.
Figure 32:
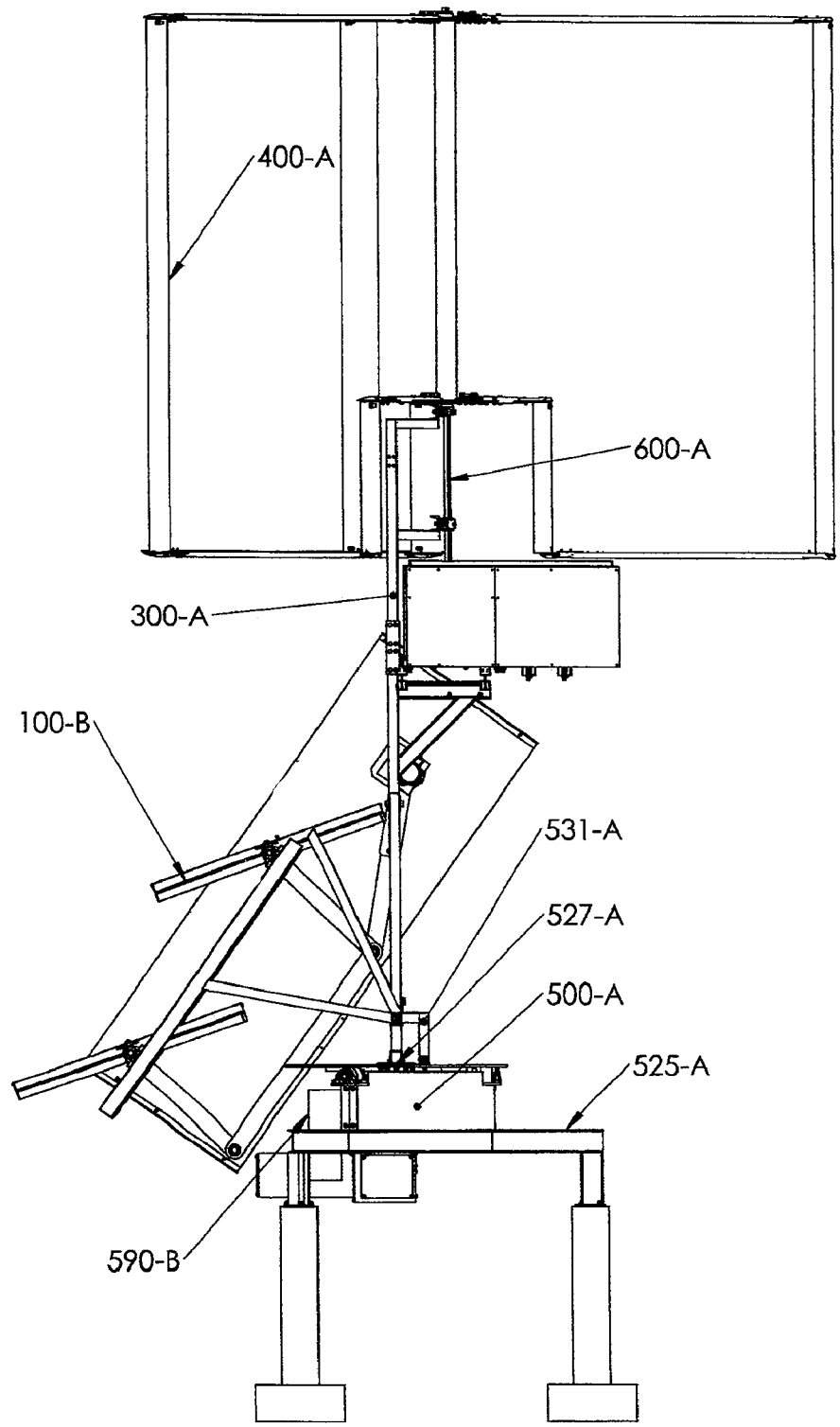
FIG. 32 is a side view of the FIG. 30 variation.
Figure 33A:
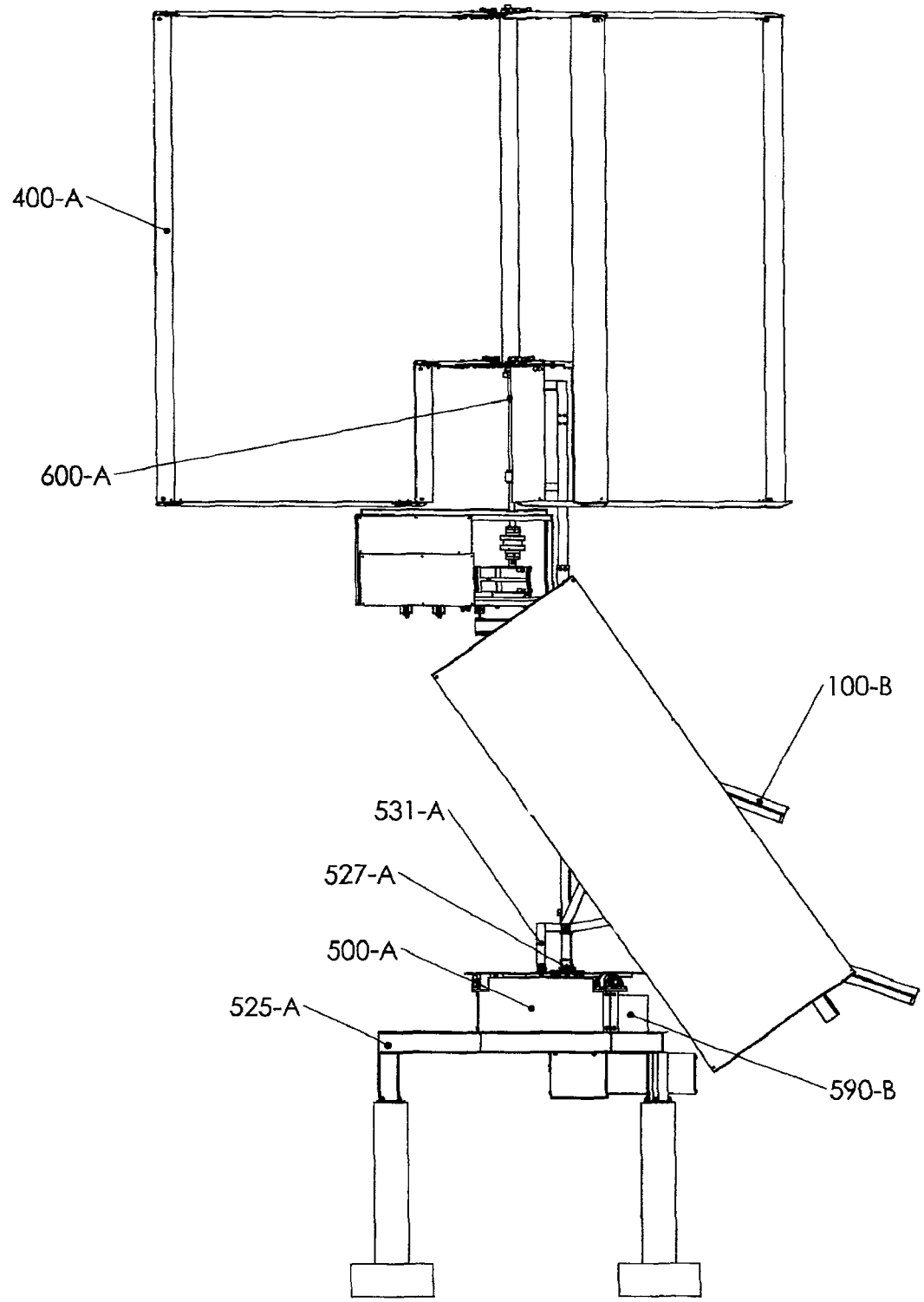
FIG. 33A is a side view of the FIG. 30 variation.
Figure 33B:
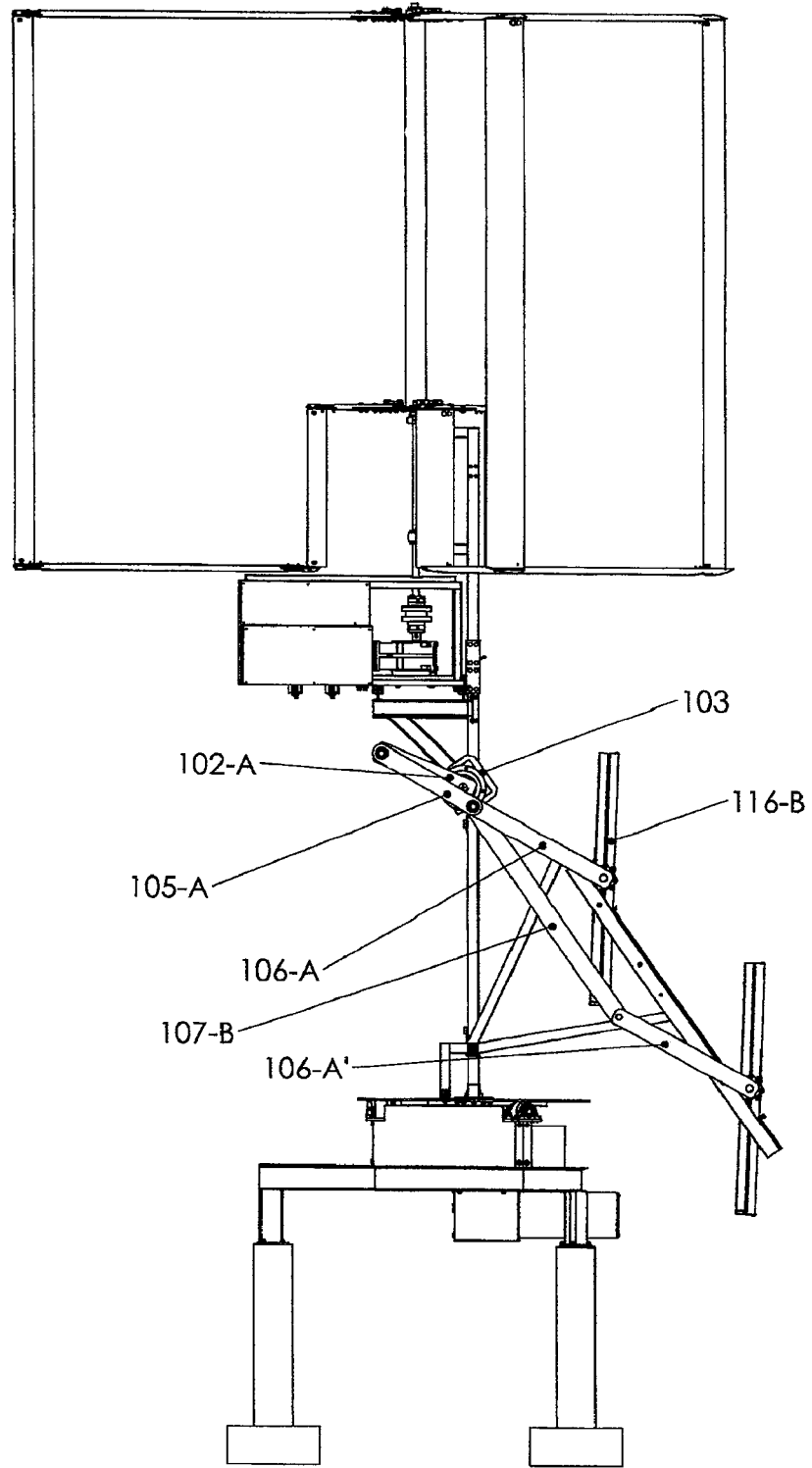
FIG. 33B is a side view of the FIG. 30 variation, with the C-channel side rail removed to show the linkage operation more clearly. The photovoltaic panels are shown in a low-angle or dawn/dusk position.
Figure 33C:
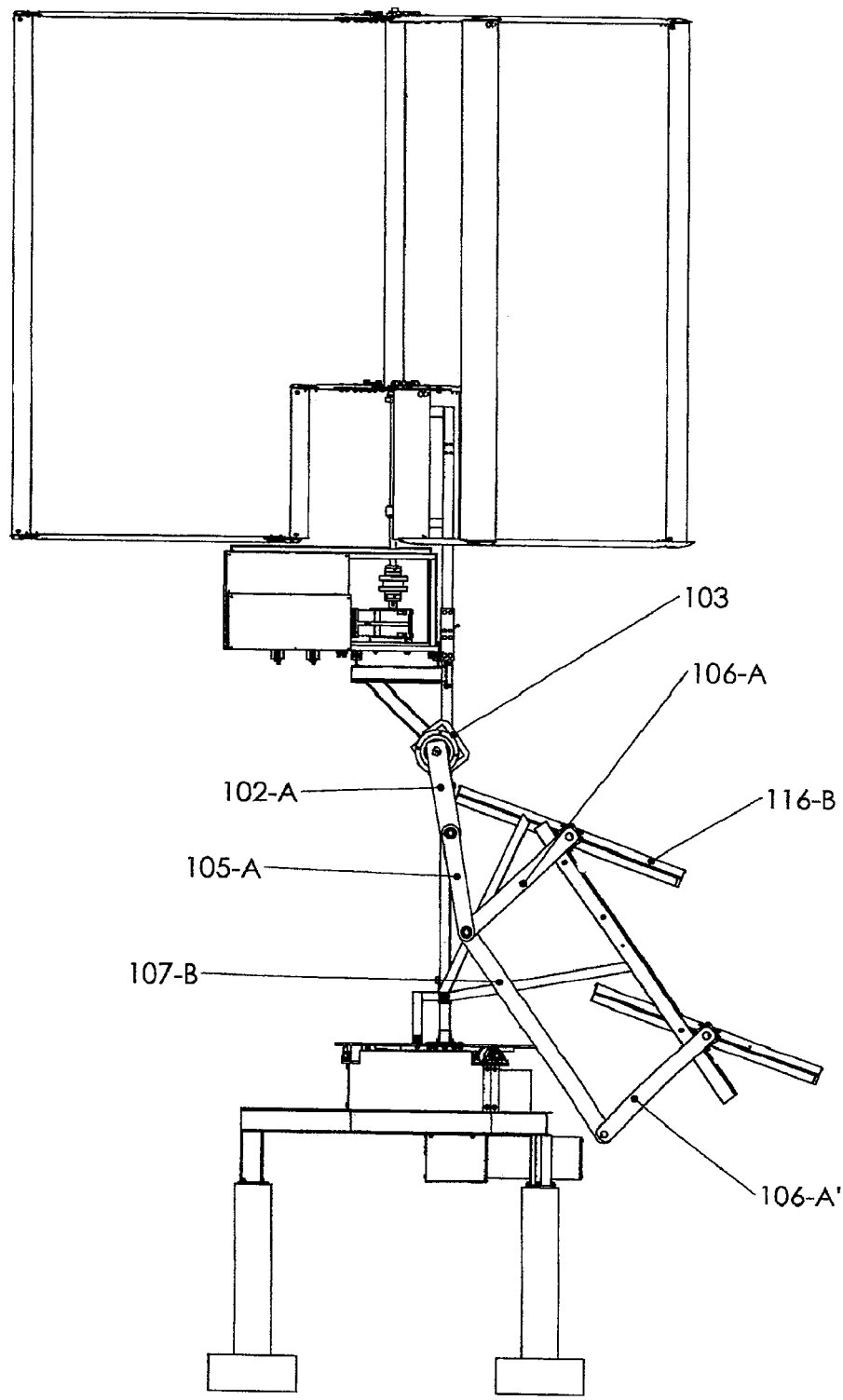
FIG. 33C is a side view corresponding to FIG. 33A, but with the photovoltaic panels in a high angle or mid-day position.

FIG. 33A is a side view of the FIG. 30 variation. FIG. 33B is a corresponding view, but with the C-channel side rail removed to show the linkage operation more clearly. The photovoltaic panels are shown in a low-angle position. FIG. 33C is a side view corresponding to FIG. 33B, but with the photovoltaic panels in a high angle position. This is essentially the same linkage arrangement and mechanism for vertical angle adjustment as in the preferred embodiment.

CONCLUSION

The above description relates to preferred and alternative embodiments of the invention. However, many variations may be apparent to those knowledgeable in the field of the invention, within the broad scope of the invention as may be discerned from the description and/or the accompanying drawings. Such variations may include, but are not limited to, the following:

a) Variations in the size and shape of various elements;
b) Variations in the number of mirrors and configuration of the mirror array;
c) Variations in the external diameter and height of the vertical axis wind turbine;
d) Variations in the speed of rotation of the vertical axis wind turbine and heat engine;
e) Variations in the length of the linear stroke of the heat engine;
f) Variations in the pressurization of the helium filled heat engine (psi);
g) Variations in the presence of a heat engine storage compartment (See FIG. 12), and in the general size of such a compartment, which impacts the amount of energy storage incorporated into the device.
h) Variation in the use of a single or dual speed increaser/induction generator in the design.

The invention claimed is:

1. An electrical generating system comprising:
at least one heat engine;
a solar energy collection assembly, comprising an array of parabolic mirrors arranged to collect and transmit solar energy to each heat engine, to drive each heat engine;
a vertical axis wind turbine mounted above the solar energy collection assembly, comprising a number of vertical windmill blades laterally displaced from and rotatable around a central axis; wherein there are both inner and outer windmill blades and the windmill blades are supported at upper and lower ends thereof by windmill support struts;
a common output driveshaft on the same axis as said central axis of said vertical axis wind turbine, connected to be driven by said vertical axis wind turbine and by each said heat engine; and
electricity generation means connected to said common output driveshaft to produce electricity; and
wherein a lower inner blade or windmill support strut is configured to facilitate airflow through heat sinks around a cold piston of the heat engine.

2. The electrical generating system as in claim 1, wherein the parabolic mirror array comprises at least one generally horizontal row, and wherein each row is rotatable about a generally horizontal axis in a frame, and wherein the frame is rotatable about a generally vertical axis, and wherein rotation about these axes is controlled and programmable so as to cause the parabolic mirrors to generally track the sun.

3. The electrical generating system as in claim 2, wherein each row being rotatable is by a linkage assembly driven by a motor connected to a crank, which in turn connects to a secondary linkage, which in turn connects to connector linkages connected to rotation linkages, which in turn are connected to said horizontal axes to produce rotation as said motor operates said crank.

4. The electrical generating system as in claim 3, wherein the ratio of crank length to secondary linkage length is in the range of 0.75 to 0.85.

5. The electrical generating system as in claim 1, wherein each parabolic mirror focuses solar energy on a respective hyperbolic mirror positioned above each parabolic mirror, the hyperbolic mirrors in turn directing the solar energy towards at least one central heat-storage element, each heat-storage element providing heat to at least one said heat engine to drive said at least one heat engine, each said heat engine driving said common output driveshaft via conversion of linear motion of a piston in each said heat engine to rotary motion of said common output driveshaft.

6. The electrical generating system as in claim 5, wherein said heat-storage element includes a storage chamber containing a salt composition.

7. The electrical generating system as in claim 1, where at least one of: (a) the windmill blades; and (b) the windmill support struts; is/are airfoil shaped.

8. The electrical generating system as in claim 1, wherein the parabolic mirrors are circular.

9. The electrical generating system as in claim 1, wherein the parabolic mirrors are rectangular or square.

* * * * *